US012809139B2

(12) United States Patent
Murakami

(10) Patent No.: US 12,809,139 B2
(45) Date of Patent: Nov. 24, 2026

(54) HIGH POWER ZOOM LENS

(71) Applicant: SIGMA CORPORATION, Kanagawa (JP)

(72) Inventor: Hitoshi Murakami, Kanagawa (JP)

(73) Assignee: SIGMA CORPORATION, Kanagawa (JP)

( * ) Notice: Subject to any disclaimer, the term of this patent is extended or adjusted under 35 U.S.C. 154(b) by 145 days.

(21) Appl. No.: 19/050,706

(22) Filed: Feb. 11, 2025

(65) Prior Publication Data

US 2025/0264702 A1 Aug. 21, 2025

(30) Foreign Application Priority Data

Feb. 15, 2024 (JP) ................................ 2024-021234

(51) Int. Cl.
*G02B 15/14* (2006.01)

(52) U.S. Cl.
CPC ............................ *G02B 15/145129* (2019.08)

(58) Field of Classification Search
CPC ............................................. G02B 15/145129
See application file for complete search history.

(56) References Cited

U.S. PATENT DOCUMENTS

2015/0168697 A1 6/2015 Ogata
2019/0196157 A1 6/2019 Kawamura et al.
2019/0317335 A1 10/2019 Kawamura
2021/0003831 A1 1/2021 Hagiwara
2023/0052696 A1* 2/2023 Ohtake ............. G02B 15/1461

FOREIGN PATENT DOCUMENTS

JP 2015-118127 A 6/2015
JP 2019-120746 A 7/2019
JP 2019-184968 A 10/2019
JP 2021-12243 A 2/2021
WO 2021/131370 A1 7/2021

* cited by examiner

*Primary Examiner* — James A Dudek

(74) *Attorney, Agent, or Firm* — Greenblum & Bernstein, P.L.C.

(57) ABSTRACT

A high power zoom lens including, in order from an object side: a first lens group that has a positive refractive power; a second lens group that has a negative refractive power; a third lens group that has a positive refractive power; a fourth lens group that has a positive refractive power; an L-th lens group that has a positive refractive power and is positioned at a position which is closest to an image side; in which, in a case of zooming from a wide-angle end to a telephoto end, a distance between the lens groups changes, the third lens group includes a lens group having a positive refractive power and a lens group having a negative refractive power, the fourth lens group includes a lens group having a positive refractive power and a lens group having a negative refractive power.

13 Claims, 50 Drawing Sheets

HIGH POWER ZOOM LENS

FIELD OF THE INVENTION

The present invention is suitable as a high power zoom lens having a zoom ratio of approximately more than 15 times among imaging lenses used in imaging devices such as a digital camera and a video camera.

BACKGROUND ART

In recent years, as a zoom lens used in an imaging apparatus, a zoom lens having a high zoom ratio, a high resolution, and a small size in entire system is required. In particular, in order to perform imaging in various scenes without changing the lens, there is a demand for a wider angle and a longer focal length even in a high power zoom lens.

In addition, particularly in the telephoto range, a mechanism for preventing an image blur caused by a vibration of the optical system due to camera shake or the like is required to be mounted.

In addition, a quick auto focus drive is required.

RELATED ART DOCUMENTS

Patent Documents

[Patent Document 1] JP 2021-12243 A1
[Patent Document 2] WO 2021/131370 A1

SUMMARY OF THE INVENTION

Problem that the Invention is to Solve

In Patent Document 1, a zoom lens that is small, has a large angle of view of about 40 degrees at a wide-angle end, and includes an image blur prevention mechanism is disclosed.

However, the zoom ratio is about 4 times, and there is a problem in increasing the focal length at the telephoto end.

In Patent Document 2, a zoom lens having a focal length of about 400 mm at a telephoto end is disclosed.

However, the zoom ratio is about 4 times, and there is a problem in increasing the angle of view at the wide-angle end. In addition, there is a problem that the total length is large.

The present invention provides a high-performance and small-sized optical system having a high zoom ratio of approximately 15 times or more and having favorable correction of various aberrations.

Means for Solving the Problem

In order to achieve the above object, the present invention provides a high power zoom lens including, in order from an object side: a first lens group G1 that has a positive refractive power; a second lens group G2 that has a negative refractive power; a third lens group G3 that has a positive refractive power; a fourth lens group G4 that has a positive refractive power; an L-th lens group GL that has a positive refractive power and is positioned at a position which is closest to an image side; in which, in a case of zooming from a wide angle end to a telephoto end, a distance between the lens groups changes, the third lens group G3 includes a 3A lens group G3A having a positive refractive power and a 3B lens group G3B having a negative refractive power, image blur correction is performed by moving the 3B lens group G3B in a direction substantially perpendicular to an optical axis, the fourth lens group G4 includes a 4A lens group G4A having a positive refractive power and a 4B lens group G4B having a negative refractive power, a focusing operation from an infinity state to a short distance is performed by moving the 4B lens group G4B from an object side to an image side in an optical axis direction, and the following conditional expressions are satisfied.

$$0.25 < f1/fT < 0.66 \tag{1}$$

$$0.35 < |ff/fr| < 0.80 \tag{2}$$

f1: focal length of first lens group G1 fT: focal length of entire system in infinity state at telephoto end ff: combined focal length of the first lens group G1 and the second lens group G2 in the infinity state at the wide angle end fr: combined focal length from the third lens group G3 to the L-th lens group GL in the infinity state at the wide-angle end

Advantage of the Invention

According to the present invention, it is possible to provide a high performance and compact optical system having a high zoom ratio of approximately 15 times or more and having favorable correction of various aberrations.

EMBODIMENTS FOR CARRYING OUT THE INVENTION

Figure 1:
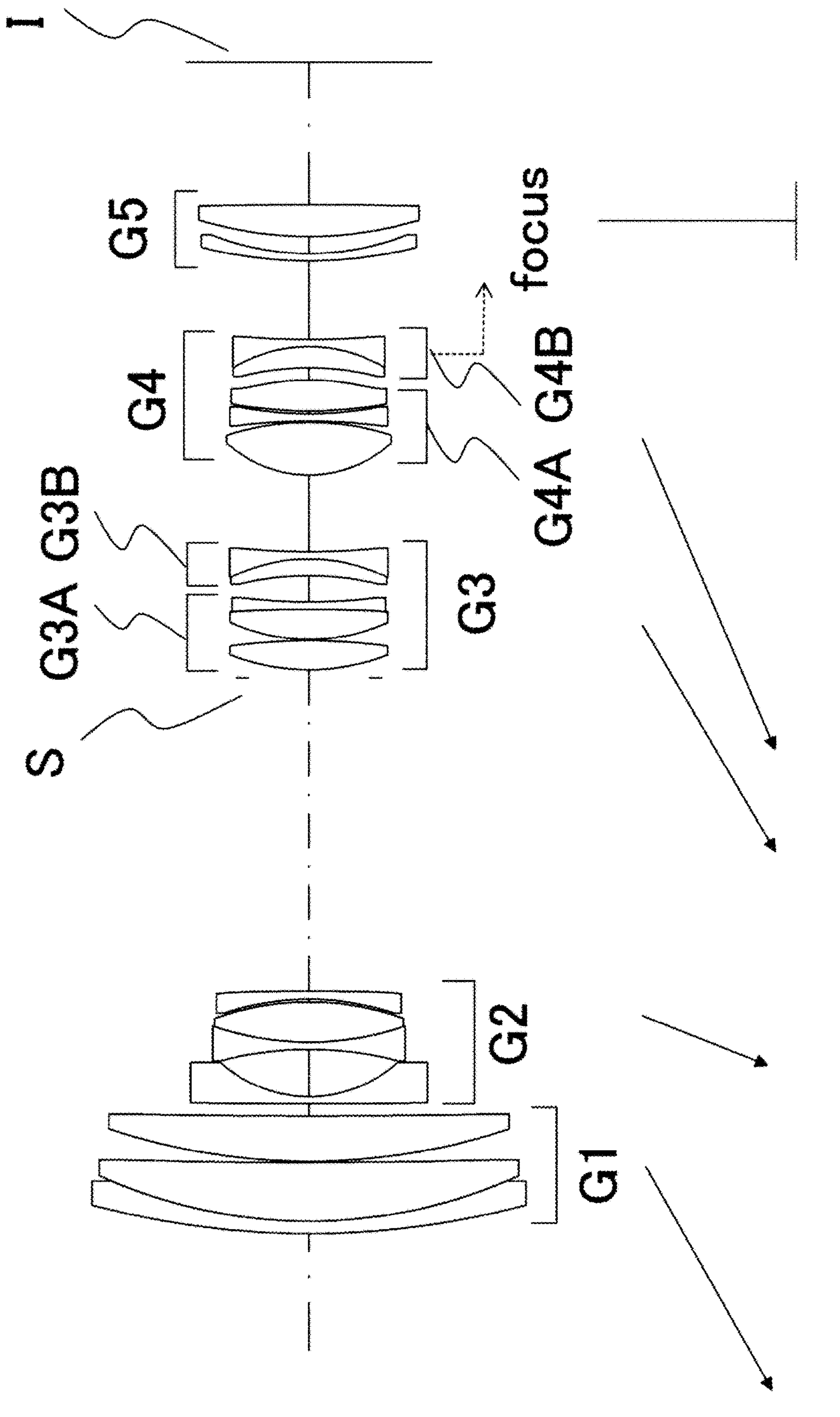
FIG. 1 is a lens configuration diagram at the wide angle end at infinity in Example 1 of a high power zoom lens of the present invention.
Figure 2:
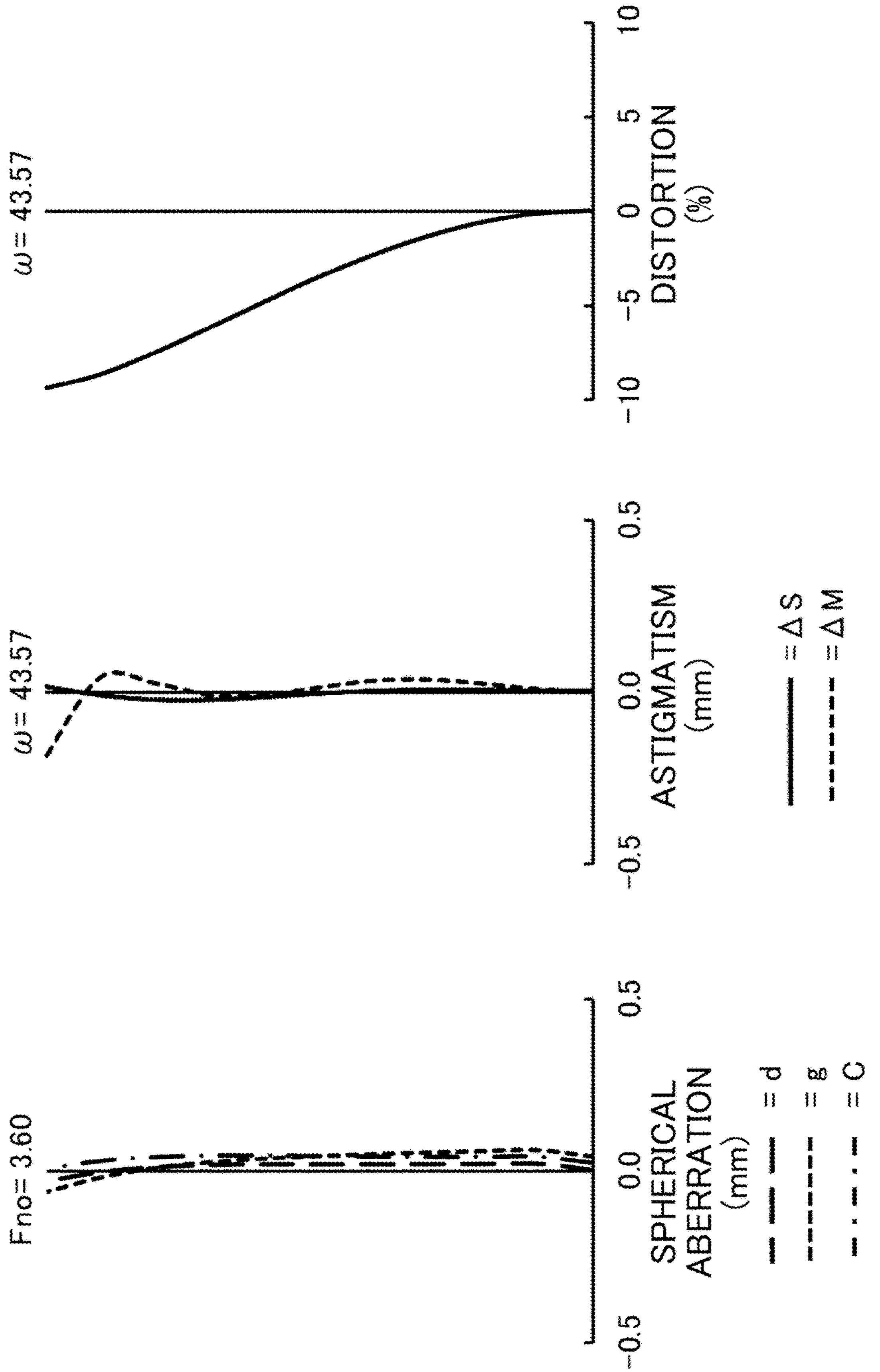
FIG. 2 is a longitudinal aberration diagram at the wide angle end of the high power zoom lens of Example 1 at infinity.
Figure 3:
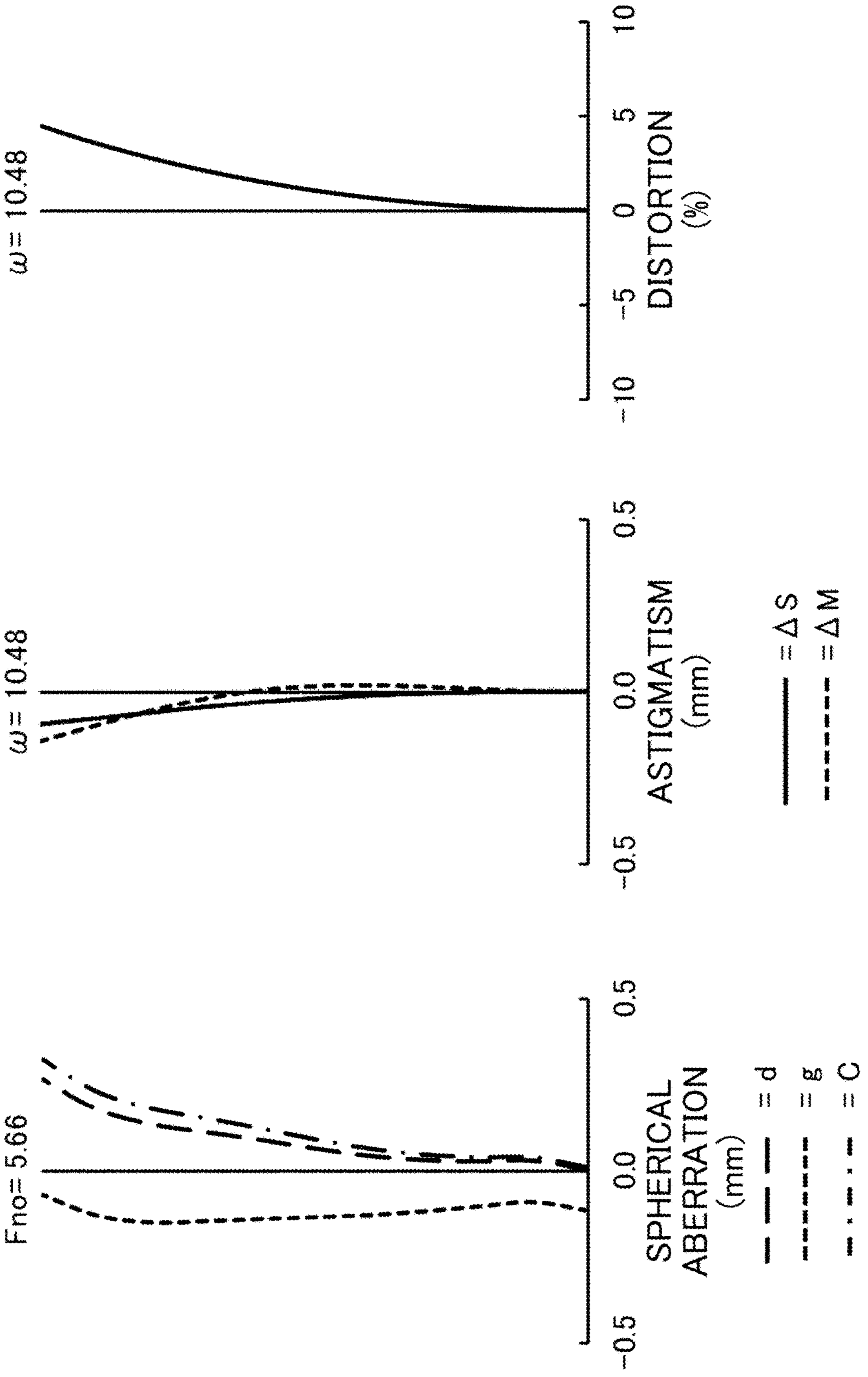
FIG. 3 is a longitudinal aberration diagram at an intermediate focal length of the high power zoom lens of Example 1 at infinity.
Figure 4:
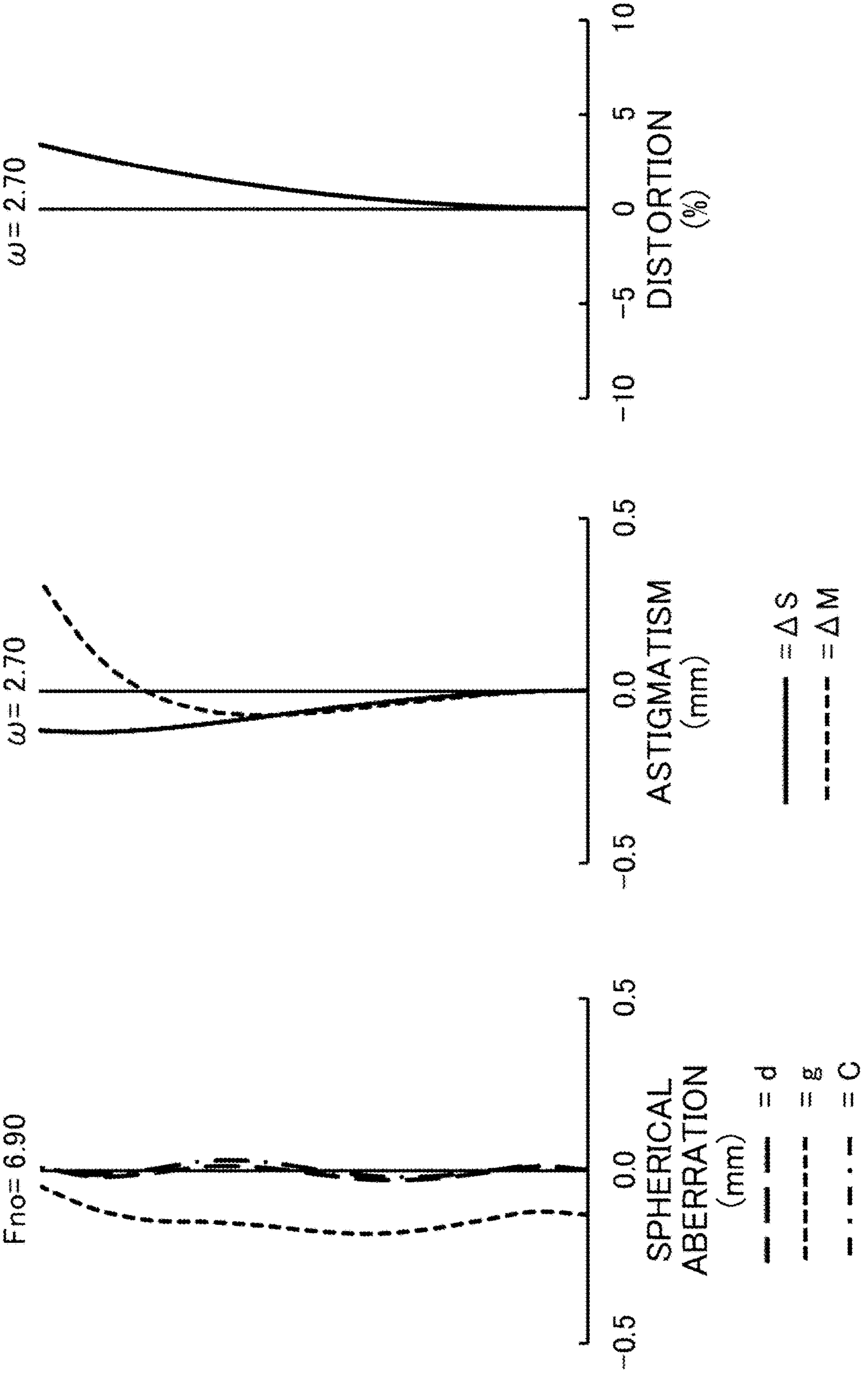
FIG. 4 is a longitudinal aberration diagram at the telephoto end of the high power zoom lens of Example 1 at infinity.
Figure 5:
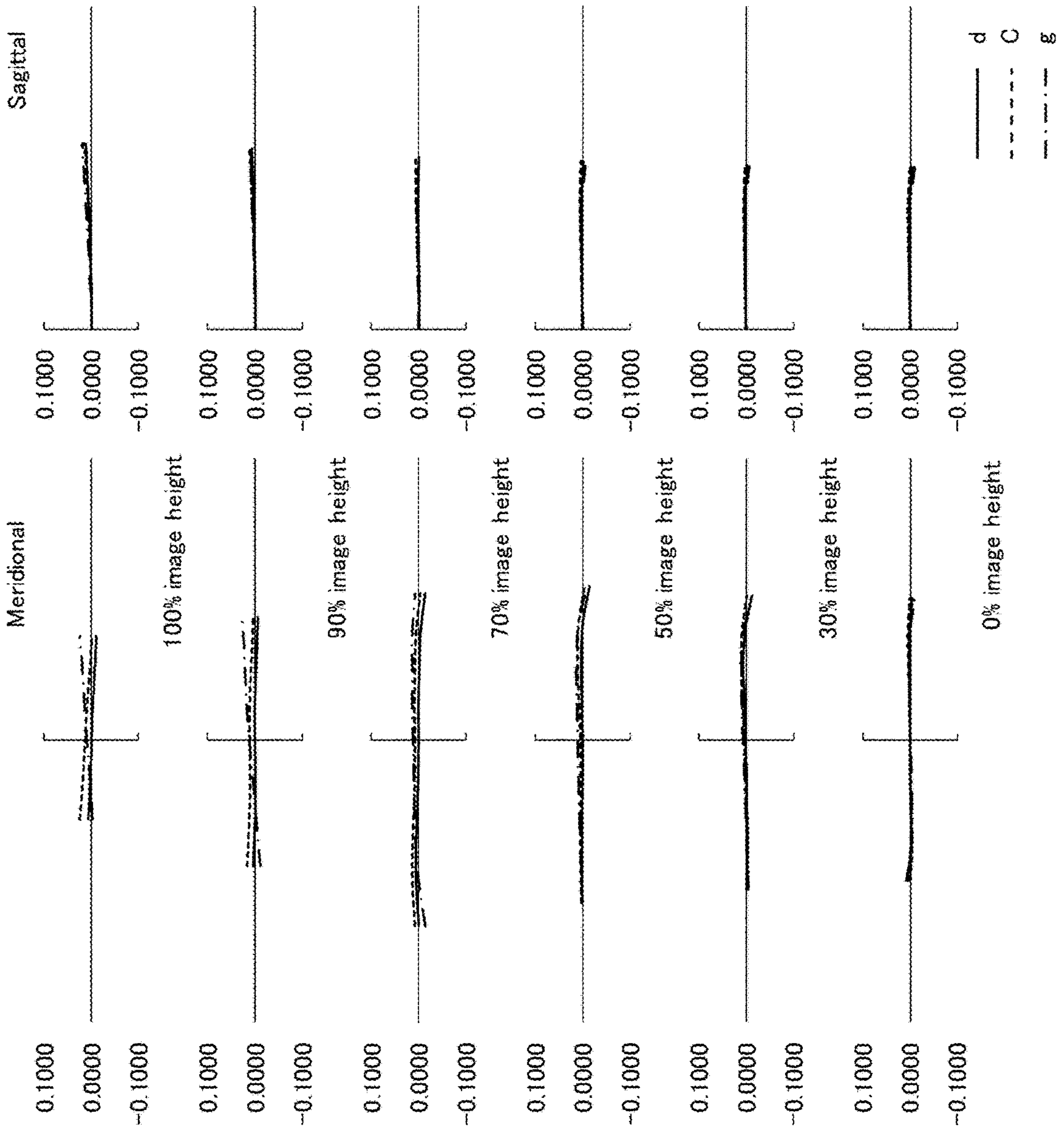
FIG. 5 is a lateral aberration diagram at the wide-angle end of the high power zoom lens of Example 1 at infinity.
Figure 6:
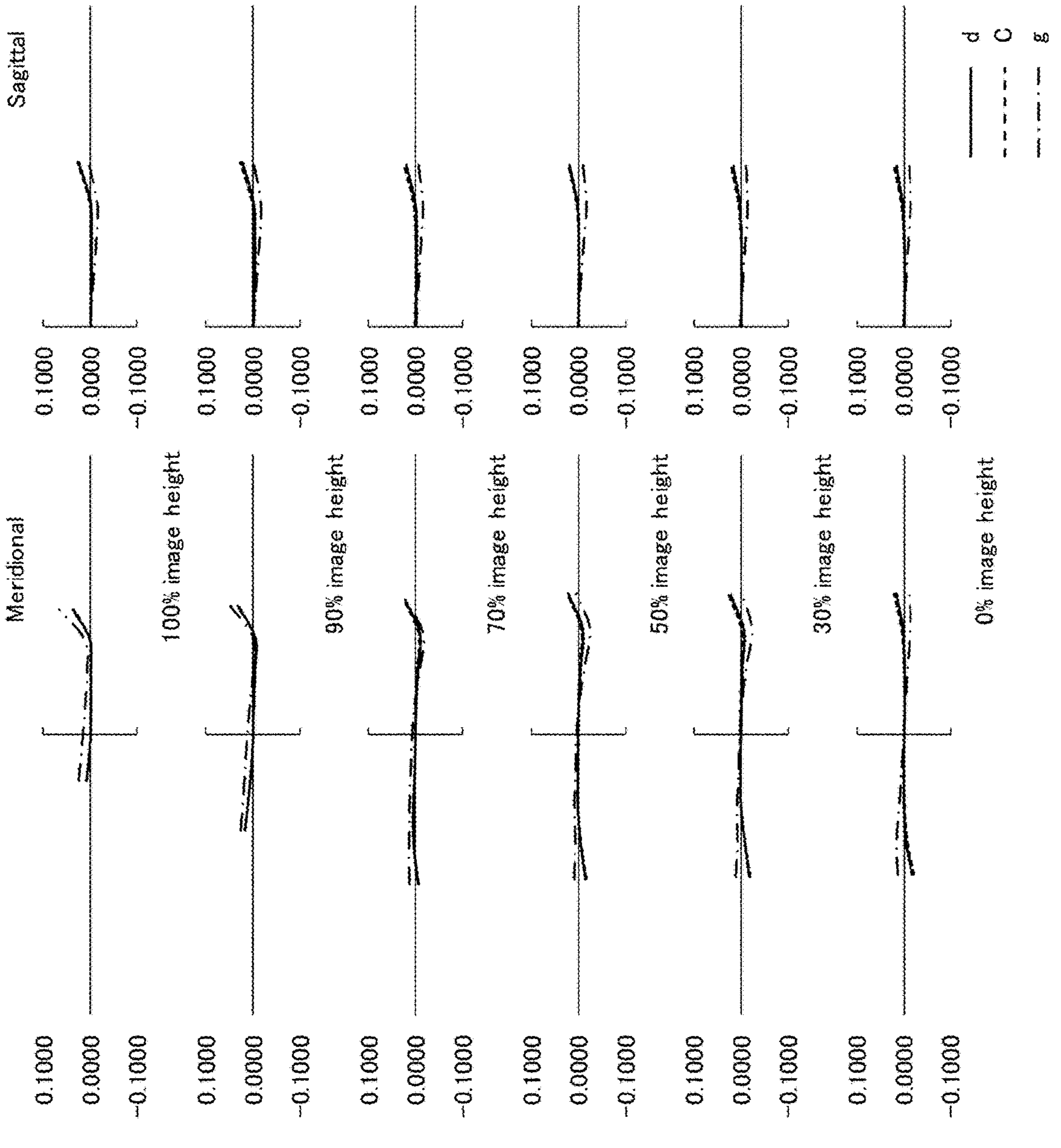
FIG. 6 is a lateral aberration diagram at an intermediate focal length of the high power zoom lens of Example 1 at infinity.
Figure 7:
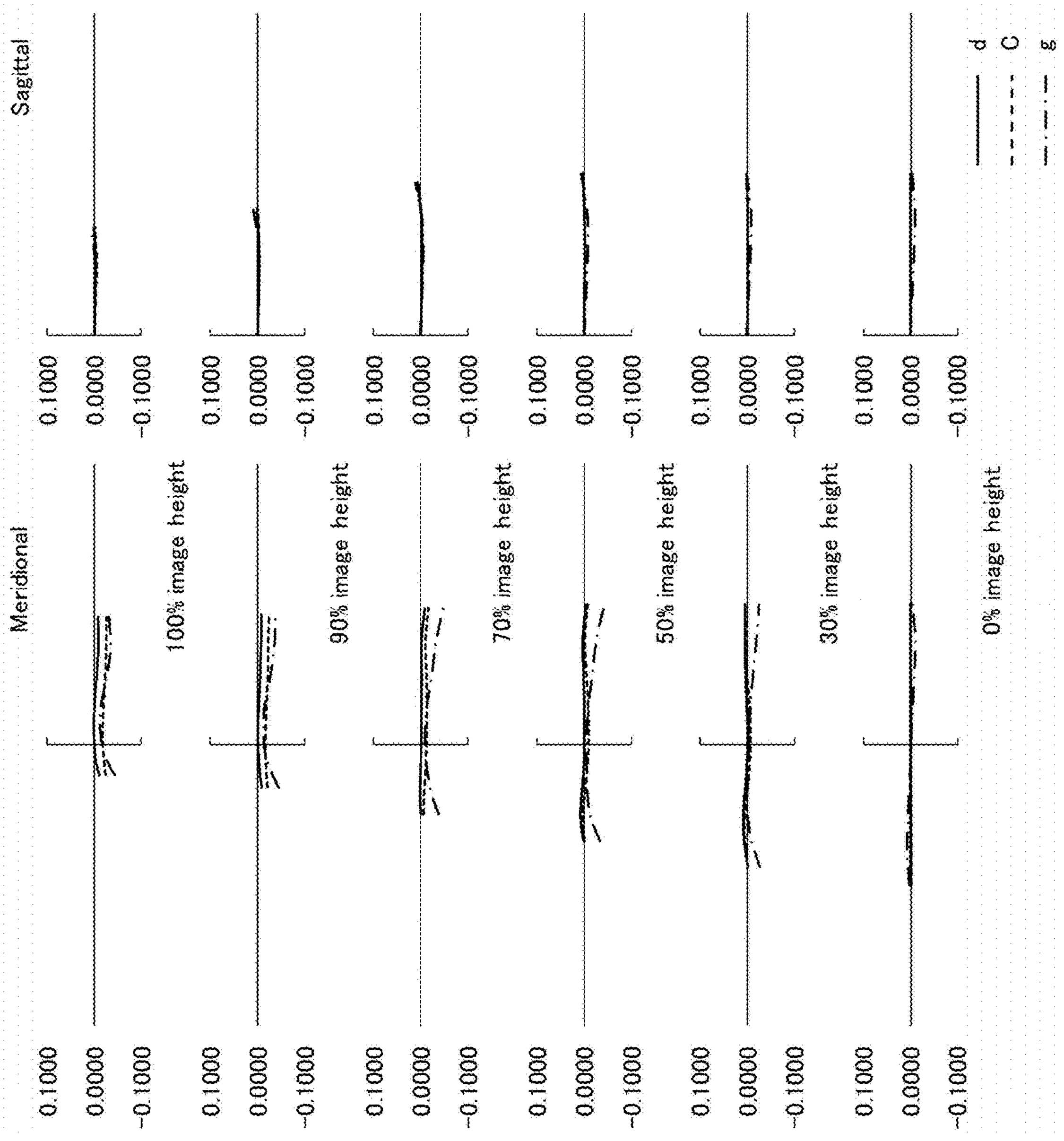
FIG. 7 is a lateral aberration diagram at the telephoto end of the high power zoom lens of Example 1 at infinity.
Figure 8:
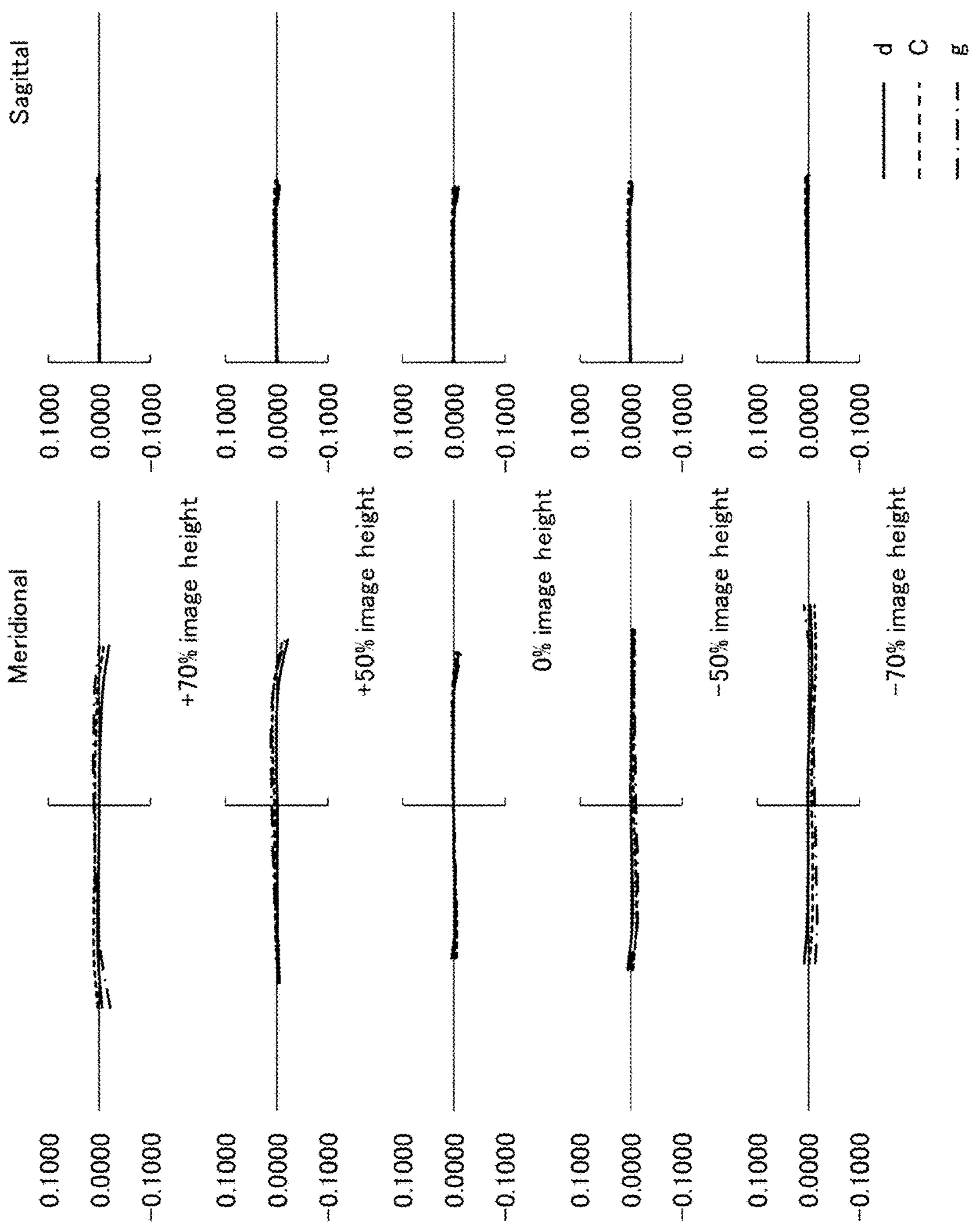
FIG. 8 is a lateral aberration diagram in a case where a deflection angle of 0.3 degrees is corrected at the wide-angle end of the high power zoom lens of Example 1 at infinity during vibration reduction.
Figure 9:
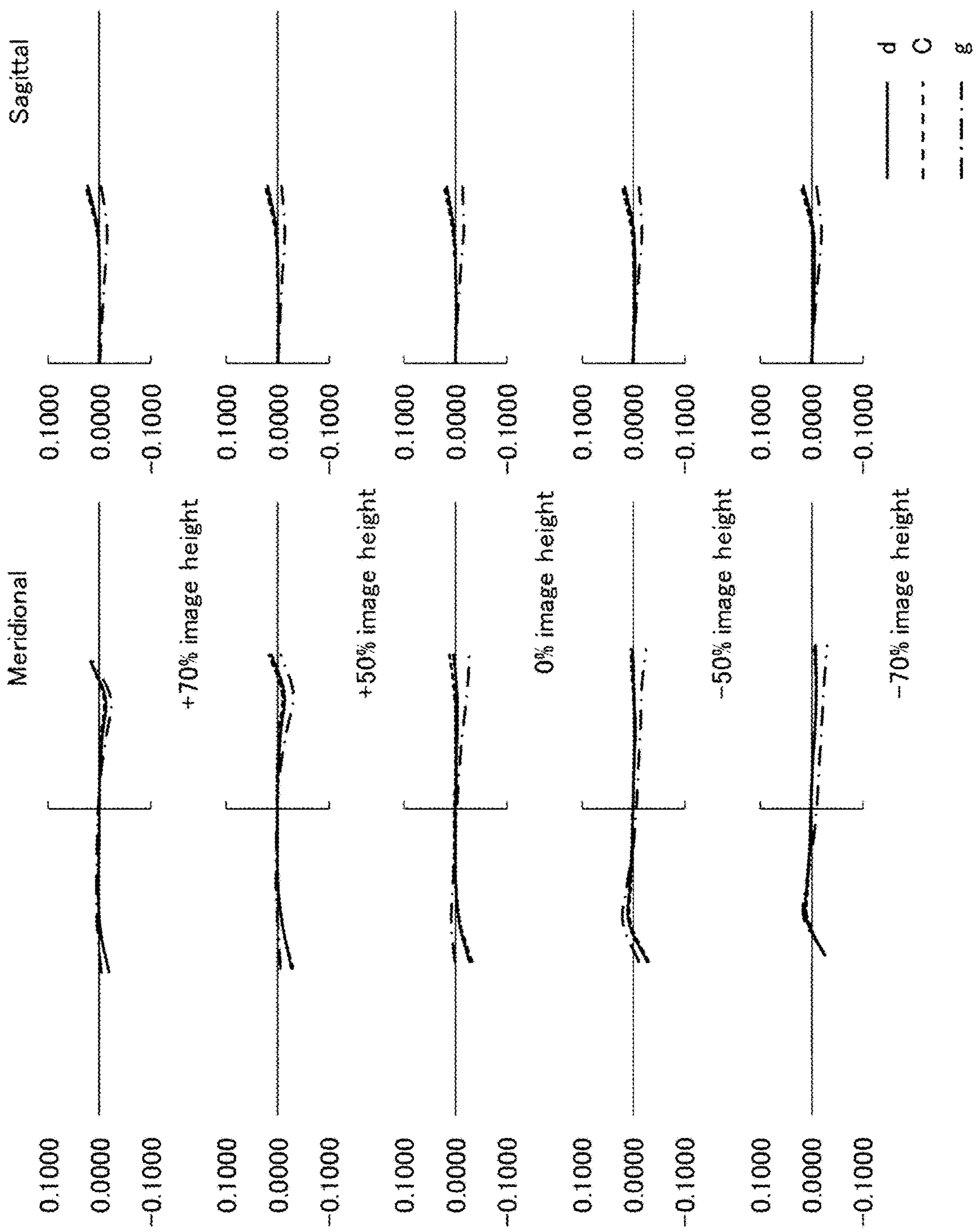
FIG. 9 is a lateral aberration diagram in a case where a deflection angle of 0.3 degrees is corrected at the intermediate focal length of the high power zoom lens of Example 1 at infinity during vibration reduction.
Figure 10:
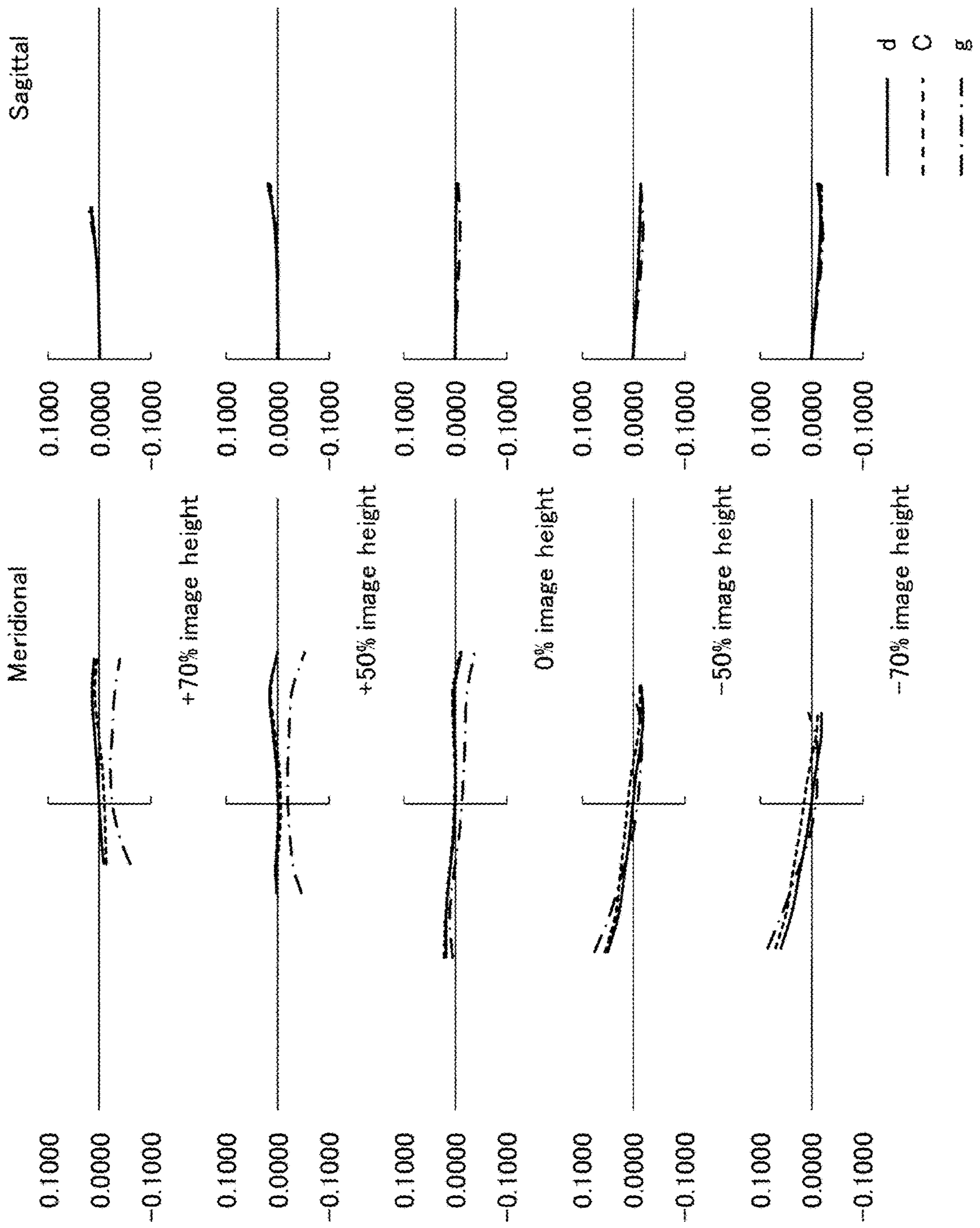
FIG. 10 is a lateral aberration diagram in a case where a deflection angle of 0.3 degrees is corrected at the telephoto end of the high power zoom lens of Example 1 at infinity during vibration reduction.

Hereinafter, examples of the high power zoom lens according to embodiments of the present invention will be described in detail. The following description of Examples describes examples of the high power zoom lens according to the embodiments of the present invention, and the present invention is not limited to the present examples within a range not departing from the gist of the present invention.

The high power zoom lens according to the embodiments of the present invention includes, in order from the object side, as shown in lens configuration diagrams such as FIG. 1, FIG. 11, FIG. 21, FIG. 31, and FIG. 41: a first lens group G1 that has a positive refractive power; a second lens group G2 that has a negative refractive power; a third lens group G3 that has a positive refractive power; a fourth lens group G4 that has a positive refractive power; an L-th lens group GL that has a positive refractive power and is positioned at a position which is closest to an image side; in which, in a case of zooming from a wide angle end to a telephoto end, a distance between the lens groups changes, the third lens group G3 includes a 3A lens group G3A having a positive refractive power and a 3B lens group G3B having a negative refractive power, image blur correction is performed by moving the 3B lens group G3B in a direction substantially perpendicular to an optical axis, the fourth lens group G4 includes a 4A lens group G4A having a positive refractive power and a 4B lens group G4B having a negative refractive power, a focusing operation from an infinity state to a short distance is performed by moving the 4B lens group G4B from an object side to an image side in an optical axis direction, and the following conditional expressions are satisfied.

$$0.25 < f1/fT < 0.66 \quad (1)$$

$$0.35 < |ff/fr| < 0.80 \quad (2)$$

f1: focal length of the first lens group G1 fT: focal length of entire system in infinity state at telephoto end ff: combined focal length of the first lens group G1 and the second lens group G2 in the infinity state at the wide-angle end fr: combined focal length from the third lens group G3 to the L-th lens group GL in the infinity state at the wide-angle end As an optical system for obtaining a high zoom ratio, a zoom lens including a first lens group having a positive refractive power, a second lens group having a negative refractive power, a third lens group having a positive refractive power, and a plurality of rear groups in order from the object side, in which the rear group has a group for focusing, is generally known. In addition, for example, a zoom lens disclosed in Patent Document 1, which has a subgroup for performing image blur correction in the third lens group and reduces the size of the optical system, is known.

In addition, in a zoom lens including a first lens group having a positive refractive power, a second lens group having a negative refractive power, a third lens group having a positive refractive power, and a plurality of rear groups in order from the object side, since an on-axis ray in the third lens group passes through a high position in the entire zoom range, large spherical aberration or comatic aberration occurs in the third lens group. Accordingly, the high power zoom lens of the present invention adopts the configuration of the third lens group G3 having a positive refractive power in which the distance changes during zooming and the fourth lens group G4 having a positive refractive power. As a result, spherical aberration and comatic aberration can be suppressed in the entire zoom range, and aberrations of the entire optical system can be suppressed.

Conditional Expression (1) stipulates a ratio of the focal length of the first lens group G1 to the focal length of the entire system in the infinity state at the telephoto end.

In a case where the upper limit of Conditional Expression (1) is exceeded and the refractive power of the first lens group G1 decreases, the convergence action of the rays emerged from the first lens group G1 decreases, and the diameter of the second lens group G2 increases. As a result, the size of the optical system increases, which is not preferable.

It is not preferable that Conditional Expression (1) is below the lower limit and the refractive power of the first lens group G1 is increased, because spherical aberration or comatic aberration increases mainly at the telephoto end.

In order to ensure the effect of Conditional Expression (1), it is preferable that the upper limit value is 0.55 and the lower limit value is 0.32.

Conditional Expression (2) stipulates a ratio of a combined focal length of the first lens group G1 and the second lens group G2 in the infinity state at the wide-angle end to a combined focal length of the third lens group G3 to the L-th lens group GL in the infinity state at the wide-angle end. In order to obtain a large angle of view at the wide-angle end while achieving reduction in size of the entire system, it is necessary to appropriately set a retro focus type power arrangement at the wide angle end.

In a case where the upper limit of Conditional Expression (2) is exceeded and the combined refractive power of the first lens group G1 and the second lens group G2 in the infinity state at the wide angle end is weak, it is difficult to increase the angle of view of the entire system while maintaining the total lens length short. In addition, in a case where the upper limit of Conditional Expression (2) is exceeded and the combined refractive power of the third lens group G3 to the L-th lens group GL in the infinity state at the wide-angle end increases, it is difficult to reduce spherical aberration and comatic aberration.

In a case where the combined refractive power of the first lens group G1 and the second lens group G2 in the infinity state at the wide-angle end is increased below the lower limit of Conditional Expression (2), it is difficult to reduce the astigmatism at the wide-angle end. Further, the effect of the oblique ray emerged from the second lens group G2 is increased, and the diameter of the third lens group G3 and subsequent lens groups is increased, which is not preferable. In addition, in a case where Conditional Expression (2) is lower than the lower limit, and the combined refractive power of the third lens group G3 to the L-th lens group GL in the infinity state at the wide angle end is decreased, the total length is increased, which is not preferable.

In Conditional Expression (2), in order to ensure the effect, it is preferable that the upper limit value is 0.70 and the lower limit value is 0.45.

The present invention is further characterized in that the distance between the 4A lens group G4A and the 4B lens group G4B in the infinity state is constant during zooming.

By making the distance between the 4A lens group G4A and the 4B lens group G4B constant during zooming, a mechanism such as a cam can be simplified, and the product can be downsized. In addition, since a state where so-called zoom tracking for continuing to focus on the subject during zooming in the infinity state is satisfied, a quick and stable focusing operation can be performed.

The present invention is further characterized in that the distance between the 3A lens group G3A and the 3B lens group G3B is constant during zooming.

By making the distance between the third A lens group G3A and the third B lens group G3B constant, a mechanism such as a cam can be simplified, and the product can be downsized.

In the present invention, it is preferable that each of the three B lens groups G3B is a cemented lens including one positive lens and one negative lens.

In a case where the weight of the lens group that is driven during the vibration reduction increases, the actuator required for the driving also increases in size, which causes the mechanism to increase in size. In order to achieve good aberration correction during vibration reduction and downsizing of the mechanism at the same time, it is necessary to minimize the number of lenses used in the 3B lens group G3B. By configuring the 3B lens group G3B with one positive lens and one negative lens, it is possible to suppress the lateral chromatic aberration occurring in a case where the 3B lens group G3B is moved in a direction substantially perpendicular to the optical axis. In addition, since it is not necessary to generate a mechanism element such as a spacer by using the cemented lens, the weight can be further reduced.

In the present invention, the 4B lens group G4B is a cemented lens including: one negative lens, or one positive lens and one negative lens.

In order to simultaneously satisfy the achievement of the rapid driving during focusing and the downsizing of the mechanism, it is necessary to reduce the weight of the lens group used for focusing. By forming the 4B lens group G4B as a cemented lens including one negative lens or one positive lens and one negative lens, the weight of the 4B lens group G4B can be suppressed.

In the present invention, the L-th lens group GL positioned closest to the image side is fixed with respect to the image surface.

By fixing the L-th lens group GL, which is positioned closest to the image side, with respect to the image surface, a mechanism such as a cam can be simplified, and the product can be downsized.

In the present invention, it is further characterized in that the first lens group G1 includes one negative lens and two positive lenses in order from the object side.

In order to achieve high imaging performance and downsizing at the same time, it is necessary to adopt an optimal configuration in which aberrations can be corrected while suppressing the number of lenses in the first lens group G1. By including the negative lens and the positive lens, it is possible to suppress the lateral chromatic aberration occurring in the first lens group G1. In addition, by using two positive lenses, it is possible to mainly reduce spherical aberration and comatic aberration occurring in the first lens group G1 at the telephoto end.

In the present invention, the 4A lens group G4A further includes at least two positive lenses and one negative lens.

Since an on-axis ray passes through a high position in the 4A lens group G4A from the wide-angle end to the telephoto end, spherical aberration or comatic aberration is largely generated in the 4A lens group G4A. Since the aberration generated in the 4A lens group G4A is magnified by the 4B lens group G4B having a negative refractive power, it is necessary to suppress the aberration generated in the 4A lens group G4A in order to satisfactorily correct various aberrations from the infinity state to the short distance. Therefore, by forming the 4A lens group G4A with at least two or more positive lenses, spherical aberration and comatic aberration in the entire system can be satisfactorily corrected. In addition, by including a positive lens and a negative lens in the 4A lens group G4A, it is possible to satisfactorily correct the longitudinal chromatic aberration in the entire system.

The present invention further satisfies the following conditional expression.

$$0.60 < |f4B/f4| < 1.80 \quad (3)$$

f4B: focal length of 4B lens group G4B f4: focal length of fourth lens group G4

Conditional Expression (3) stipulates a ratio of a focal length of the fourth B lens group G4B to a focal length of the fourth lens group G4.

It is not preferable that the refractive power of the 4B lens group G4B exceeds the upper limit of Conditional Expression (3) and the refractive power of the 4B lens group G4B decreases because the distance of movement of the 4B lens group G4B during focusing increases and a quick focusing operation cannot be performed. On the other hand, in a case where the result of Conditional Expression (3) is greater than the upper limit and the refractive power of the fourth lens group G4 increases, it is difficult to suppress the astigmatism.

It is not preferable that the value of Conditional Expression (3) is below the lower limit and the refractive power of the 4B lens group G4B increases because it is difficult to suppress the astigmatism generated in the 4B lens group G4B, and the change in astigmatism in the short range state from the infinity state is large. In addition, in a case where the value of Conditional Expression (3) is below the lower limit and the refractive power of the fourth lens group G4 is decreased, the divergence of the off-axis ray emitted from the fourth lens group G4 increases. Therefore, the diameter of the lens group closer to the image side than the fourth lens group G4 increases, and the size of the optical system increases.

In Conditional Expression (3), in order to ensure the effect, it is preferable that the upper limit value is 1.60 and the lower limit value is 0.85.

The present invention further satisfies the following conditional expression.

$$0.08 < FB/LT < 0.20 \quad (4)$$

FB: back focus in air equivalent at wide angle end

LT: total optical length at wide angle end

Conditional Expression (4) stipulates a ratio of a back focus in terms of air equivalent at the wide angle end to a total optical length at the wide-angle end. Here, the back focus is a distance on the optical axis from the lens surface vertex of the L-th lens group GL closest to the image side to the image surface. By appropriately setting the back focus, it is possible to reduce the size of the entire system.

In a case where the upper limit of Conditional Expression (4) is exceeded and the back focus at the wide-angle end increases, it is difficult to suppress the total length of the optical system to be small, which is not preferable.

It is not preferable that the value of Conditional Expression (4) is lower than the lower limit and the back focus at the wide-angle end decreases because the angle of the off-axis ray emerged from the L lens group GL to the image surface increases and peripheral illumination decreases.

In Conditional Expression (4), in order to ensure the effect, it is preferable that the upper limit value is 0.18 and the lower limit value is 0.09.

The present invention further satisfies the following conditional expression.

$$0.50 < f3/f4 < 5.00 \tag{5}$$

f3: focal length of third lens group G3 f4: focal length of fourth lens group G4

Conditional Expression (5) stipulates a ratio of the focal length of the third lens group G3 to the focal length of the fourth lens group G4.

In the third lens group G3 and the fourth lens group G4, both the on axis ray and the off-axis ray pass through a high position in the lens from the wide-angle end to the telephoto end. Therefore, in order to satisfactorily correct various aberrations such as spherical aberration, comatic aberration, and astigmatism while reducing the size of the optical system, it is important to appropriately set the refractive power of each group.

In a case where the upper limit of Conditional Expression (5) is exceeded and the refractive power of the third lens group G3 decreases, the convergence action of the rays emerged from the third lens group G3 is weakened, and the diameter of the fourth lens group G4 increases. Therefore, it is difficult to reduce the product diameter. In addition, in a case where the refractive power of the fourth lens group G4 is increased and exceeds the upper limit of Conditional Expression (5), it is difficult to suppress astigmatism.

In a case where the result of Conditional Expression (5) is lower than the lower limit and the refractive power of the third lens group G3 increases, it is difficult to satisfactorily correct spherical aberration and comatic aberration. In addition, in a case where the value of Conditional Expression (5) is lower than the lower limit and the refractive power of the fourth lens group G4 decreases, the divergence of the off-axis ray emerged from the fourth lens group G4 increases. Therefore, the diameter of the lens group on the image side from the fourth lens group G4 increases, and the size of the optical system increases.

In Conditional Expression (5), in order to ensure the effect, it is preferable that the upper limit value is 4.00 and the lower limit value is 1.00.

The present invention further satisfies the following conditional expression.

$$0.010 < \Delta PgF\_3A < 0.073 \tag{6}$$

ΔPgF_3A: largest one of anomalous dispersions of a g line and an F line of the positive lens included in the 3A lens group G3A Conditional Expression (6) stipulates the largest value of the anomalous dispersions of the g line and the F line of the positive lens included in the 3A lens group G3A.

The anomalous dispersion of each lens included in the imaging optical system according to the embodiment of the present invention is stipulated by the following expression.

$$\Delta Pgf = PgF \cdot 0.64833 + 0.00180 * vd$$

ΔPgF: anomalous dispersion of lens included in imaging optical system

PgF: partial dispersion ratio of lens included in imaging optical system between g line and F line νd: Abbe number of lens included in imaging optical system at d line It is not preferable that the anomalous dispersion of the positive lens included in the 3A lens group G3A is increased to exceed the upper limit of Conditional Expression (6) because the correction of the secondary spectrum is excessive and it is difficult to satisfactorily correct the longitudinal chromatic aberration from the wide-angle end to the telephoto end.

In a case where the result of Conditional Expression (6) is lower than the lower limit and the anomalous dispersion of the positive lens included in the 3A lens group G3A decreases, the second spectrum is insufficiently corrected, which is not preferable.

In Conditional Expression (6), in order to ensure the effect, it is preferable that the upper limit value is 0.058 and the lower limit value is 0.020.

The present invention further satisfies the following conditional expression.

$$0.010 < \Delta PgF\_1 < 0.073 \tag{7}$$

ΔPgF_1: largest one of the abnormal dispersions of a g line and an F line of the positive lens included in the first lens group G1

Conditional Expression (7) stipulates the largest value of the anomalous dispersions of the g line and the F line in the positive lenses included in the first lens group G1.

In a case where the anomalous dispersion of the positive lens included in the first lens group G1 is increased and exceeds the upper limit of Conditional Expression (7), there is no appropriate glass material in the existing glass materials.

In a case where the value of Conditional Expression (7) is lower than the lower limit and the anomalous dispersion of the positive lens included in the first lens group G1 is decreased, the second spectrum at the telephoto end is insufficiently corrected, which is not preferable.

In Conditional Expression (7), in order to ensure the effect, it is preferable that the upper limit value is 0.058 and the lower limit value is 0.020.

Next, lens configurations of examples of the high power zoom lens according to the embodiment of the present invention will be described. In the following description, the lens configuration will be described in order from the object side to the image side.

In [Surface data], the surface number is a number of a lens surface or an aperture diaphragm S counted from the object side, r is a curvature radius of each surface, d is a distance between the surfaces, nd is a refractive index with respect to the d line (wavelength of 587.56 nm), vd is an Abbe number with respect to the d line, and PgF indicates a partial dispersion ratio with respect to the g line (wavelength of 435.8 nm) and the F line (wavelength of 486.1 nm).

An asterisk (*) attached to a surface number indicates that the lens surface shape is an aspherical shape. In addition, BF represents a back focus.

The (diaphragm) attached to the surface number indicates that the aperture diaphragm S is located at that position. A curvature radius with respect to the plane or the aperture diaphragm S is denoted by ∞ (infinity).

[Aspherical surface data] shows values of each coefficient for giving the aspherical shape of the lens surface denoted by * in [Surface data]. In a case where a displacement from the optical axis in a direction perpendicular to the optical axis is y, a displacement (sag) from an intersection of the optical axis and the aspherical surface in an optical axis direction is z, a curvature radius of a reference spherical surface is r, a conic coefficient is K, and aspherical coefficients of fourth order, sixth order, . . . , and twelfth order are A4, A6, . . . , and A12, respectively, coordinates of the aspherical surface are represented by the following expression.

$$z = \frac{(1/r)y^2}{1 + \sqrt{1 - (1 + K)(y/r)^2}} + A4y^4 + A6y^6 + A8y^8 + A10y^{10} + A12y^{12}$$

[Various types of data] indicate values such as a zoom ratio and a focal length in each focal length state.

The [Variable distance data] shows the variable distance and the BF value in each focal length state.

The [Lens group data] shows the surface number closest to the object side configuring each lens group and the total focal length of the entire group.

In addition, in the aberration diagrams corresponding to the respective examples, d, g, and C represent a d line, a g line, and a C line, respectively, and ΔS and ΔM represent a sagittal image surface and a meridional image surface, respectively.

In addition, in all the values of the specifications described below, unless otherwise noted, the units of the focal length f, the curvature radius r, the lens surface distance d, and other lengths are millimeters (mm), but the present invention is not limited thereto since the same optical performance can be obtained in both the proportional magnification and the proportional reduction in the optical system.

In addition, in the lens configuration diagram of each example, the arrows indicate paths of the lens groups during zooming from the wide angle end to the telephoto end, I indicates an image surface, and a one dot chain line passing through the center indicates an optical axis.

Example 1

FIG. 1 is a lens configuration diagram of a high power zoom lens of Example 1 of the present invention.

Example 1 includes, in order from the object side, a first lens group G1 having a positive refractive power, a second lens group G2 having a negative refractive power, an aperture diaphragm S, a third lens group G3 having a positive refractive power, a fourth lens group G4 having a positive refractive power, and a fifth lens group G5 having a positive refractive power. Further, the third lens group G3 includes a 3A lens group G3A having a positive refractive power and a 3B lens group G3B having a negative refractive power, in order from the object side. Further, the fourth lens group G4 includes a 4A lens group G4A having a positive refractive power and a 4B lens group G4B having a negative refractive power, in order from the object side. In addition, during the image blur correction during the vibration reduction, the 3B lens group G3B moves in a direction substantially perpendicular to the optical axis. Further, during focusing from the infinity to the short distance, the 4B lens group G4B moves to the image surface side. The fifth lens group G5 corresponds to the L-th lens group GL positioned closest to the image side.

The first lens group G1 includes, in order from the object side, a negative meniscus lens having a surface convex toward the object side, a positive meniscus lens having a surface convex toward the object side, and a positive meniscus lens having a surface convex toward the object side.

The second lens group G2 includes, in order from the object side, a negative meniscus lens having a surface convex toward the object side, a cemented lens including a biconcave lens and a biconvex lens, and a negative meniscus lens having a surface convex toward the image side.

The third lens group G3 includes, in order from the object side: a 3A lens group G3A including a biconvex lens, and a cemented lens including a biconvex lens and a biconcave lens; and a 3B lens group G3B including a cemented lens including a positive meniscus lens having a surface convex toward the image side and a biconcave lens.

The fourth lens group G4 includes, in order from the object side: a 4A lens group 4A including a biconvex lens, a biconcave lens, and a biconvex lens; and a lens group 4B including a cemented lens including a positive meniscus lens having a surface convex toward the image side and a biconcave lens.

The fifth lens group G5 includes, in order from the object side, a negative meniscus lens having a surface convex toward the object side, and a biconvex lens.

In addition, in the high power zoom lens of Example 1, during zooming from the wide-angle end to the telephoto end, the distance between the first lens group G1 and the second lens group G2 increases, the distance between the second lens group G2 and the third lens group G3 decreases, the distance between the third lens group G3 and the fourth lens group G4 decreases, and the distance between the fourth lens group G4 and the fifth lens group G5 increases. Further, the fifth lens group G5 remains stationary with respect to the image surface during zooming.

The specification values of the high power zoom lens of Example 1 are shown below.

Numerical Example 1

Unit: mm
[Surface data]

| Surface number | r | d | nd | vd | PgF |
|---|---|---|---|---|---|
| Object surface | ∞ | (d0) | | | |
| 1 | 109.3687 | 1.5500 | 1.80610 | 33.27 | 0.5884 |
| 2 | 66.0813 | 7.3019 | 1.43700 | 95.10 | 0.5336 |
| 3 | 917.2712 | 0.1500 | | | |
| 4 | 82.8968 | 5.6553 | 1.59282 | 68.62 | 0.5440 |
| 5 | 1226.6732 | (d5) | | | |
| 6 | 843.3064 | 0.9000 | 1.95375 | 32.32 | |
| 7 | 17.1873 | 5.8777 | | | |

-continued

| Unit: mm [Surface data] | | | | | |
|---|---|---|---|---|---|
| 8 | −45.3866 | 0.9000 | 1.59282 | 68.62 | |
| 9 | 38.8278 | 5.0211 | 1.80809 | 22.76 | |
| 10 | −36.1920 | 0.3622 | | | |
| 11* | −31.2704 | 1.0000 | 1.76450 | 49.09 | |
| 12* | −229.1745 | (d12) | | | |
| 13 (diaphragm) | ∞ | 1.0001 | | | |
| 14 | 28.4864 | 3.6144 | 1.57135 | 52.95 | 0.5553 |
| 15 | −74.0294 | 0.1500 | | | |
| 16 | 24.8293 | 3.7720 | 1.49700 | 81.61 | 0.5389 |
| 17 | −153.8358 | 0.9000 | 2.00100 | 29.13 | 0.5995 |
| 18 | 74.5606 | 3.2487 | | | |
| 19 | −37.9845 | 2.1147 | 1.67270 | 32.17 | |
| 20 | −22.6649 | 0.9000 | 1.59201 | 67.02 | |
| 21* | 83.3308 | (d21) | | | |
| 22 | 15.8733 | 6.5868 | 1.43700 | 95.10 | |
| 23 | −34.9701 | 0.1501 | | | |
| 24 | −71.3746 | 0.9000 | 2.00100 | 29.13 | |
| 25 | 47.4713 | 0.3441 | | | |
| 26* | 41.9483 | 3.8875 | 1.59201 | 67.02 | |
| 27* | −28.4619 | (d27) | | | |
| 28 | −35.2496 | 2.6194 | 1.75211 | 25.05 | |
| 29 | −19.1229 | 0.9000 | 1.61881 | 63.85 | |
| 30* | 100.5407 | (d30) | | | |
| 31 | 58.0854 | 0.9000 | 2.00100 | 29.13 | |
| 32 | 34.6895 | 2.1291 | | | |
| 33 | 49.4291 | 3.9521 | 1.51742 | 52.15 | |
| 34 | −537.8400 | (BF) | | | |
| image surface | ∞ | | | | |

[Aspherical surface data]

| | Surface 11 | Surface 12 | Surface 21 | Surface 26 | Surface 27 | Surface 30 |
|---|---|---|---|---|---|---|
| K | 0.00000 | 0.00000 | 0.00000 | 0.00000 | 0.00000 | 0.00000 |
| A4 | 3.52436E−05 | 2.39096E−05 | −6.52626E−06 | −6.03584E−05 | 2.01084E−05 | −2.94084E−06 |
| A6 | −2.46569E−07 | −2.67116E−07 | −1.29238E−08 | −7.07509E−08 | 9.24124E−08 | −5.49183E−08 |
| A8 | 5.14679E−10 | 5.57472E−10 | 1.65231E−10 | 4.54929E−09 | 3.77026E−09 | 6.47510E−10 |
| A10 | 0.00000E+00 | 0.00000E+00 | −9.71037E−13 | −7.71649E−12 | 0.00000E+00 | 1.74859E−12 |

Zoom ratio: 17.66

| | Wide angle | Middle | Telephoto |
|---|---|---|---|
| [Various types of data] | | | |
| Focal length | 16.48 | 73.48 | 291.00 |
| F number | 3.60 | 5.66 | 6.90 |
| Total angle of view 2ω | 87.13 | 20.95 | 5.41 |
| Image height Y | 14.20 | 14.20 | |
| Total length of lens | 145.77 | 198.45 | 243.83 |
| [Variable distance data] | | | |
| d0 | ∞ | ∞ | ∞ |
| d5 | 1.5000 | 45.2944 | 83.4890 |
| d12 | 38.9747 | 13.8131 | 2.0000 |
| d21 | 9.5180 | 4.1882 | 2.0000 |
| d27 | 1.5000 | 1.5000 | 1.5000 |
| d30 | 9.7861 | 49.0921 | 70.3574 |
| BF | 17.7003 | 17.7003 | 17.7003 |

[Lens group data]

| Group | Starting surface | Focal length |
|---|---|---|
| G1 | 1 | 126.13 |
| G2 | 6 | −16.06 |
| G3 | 13 | 55.71 |
| G4 | 22 | 46.10 |
| G5 | 31 | 4514.46 |
| G3A | 13 | 30.50 |
| G3B | 19 | −46.75 |
| G4A | 22 | 27.04 |
| G4B | 28 | −48.68 |

Example 2

Figure 11:
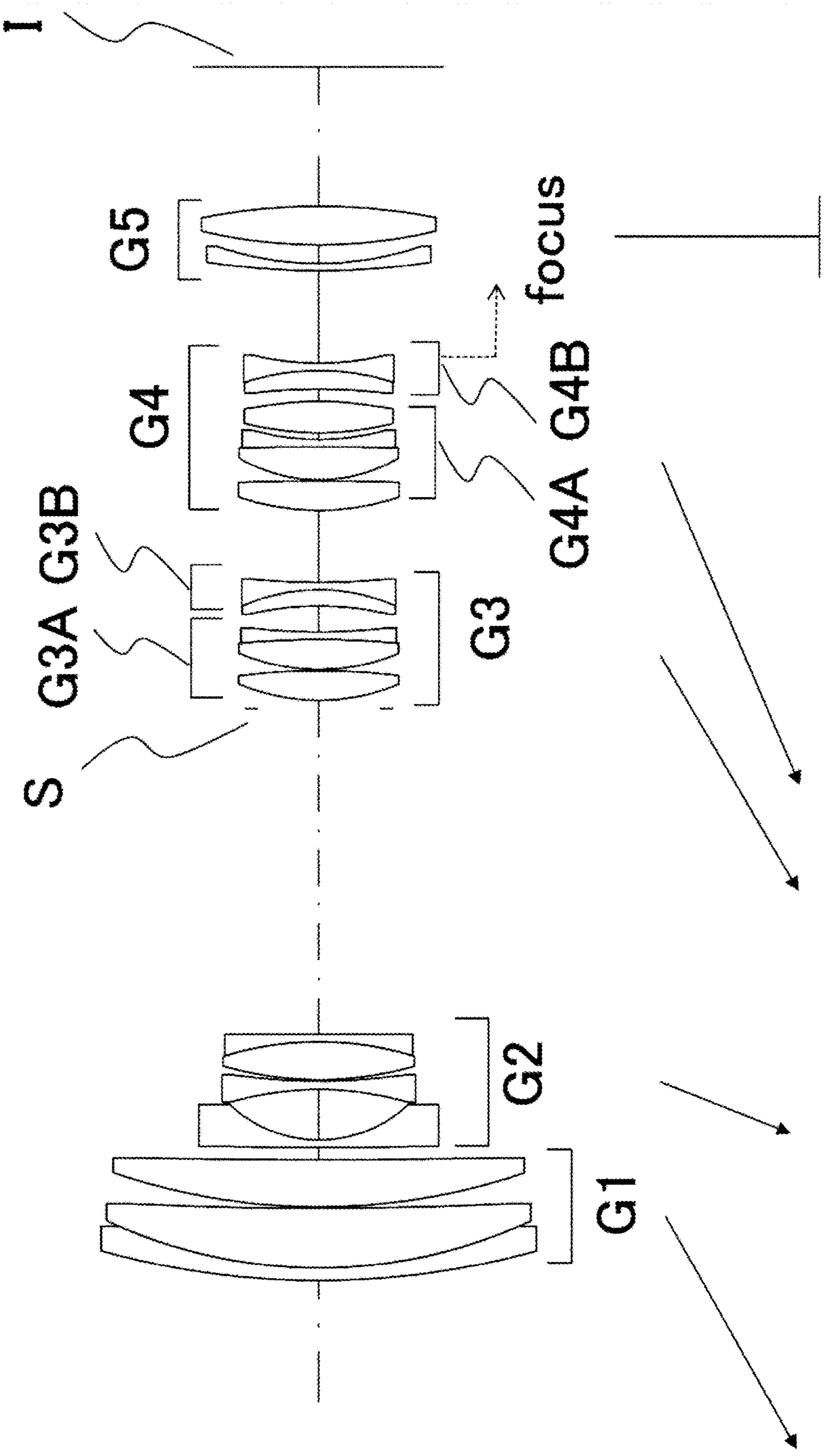
FIG. 11 is a lens configuration diagram at the wide-angle end at infinity according to Example 2 of the high power zoom lens of the present invention.
Figure 12:
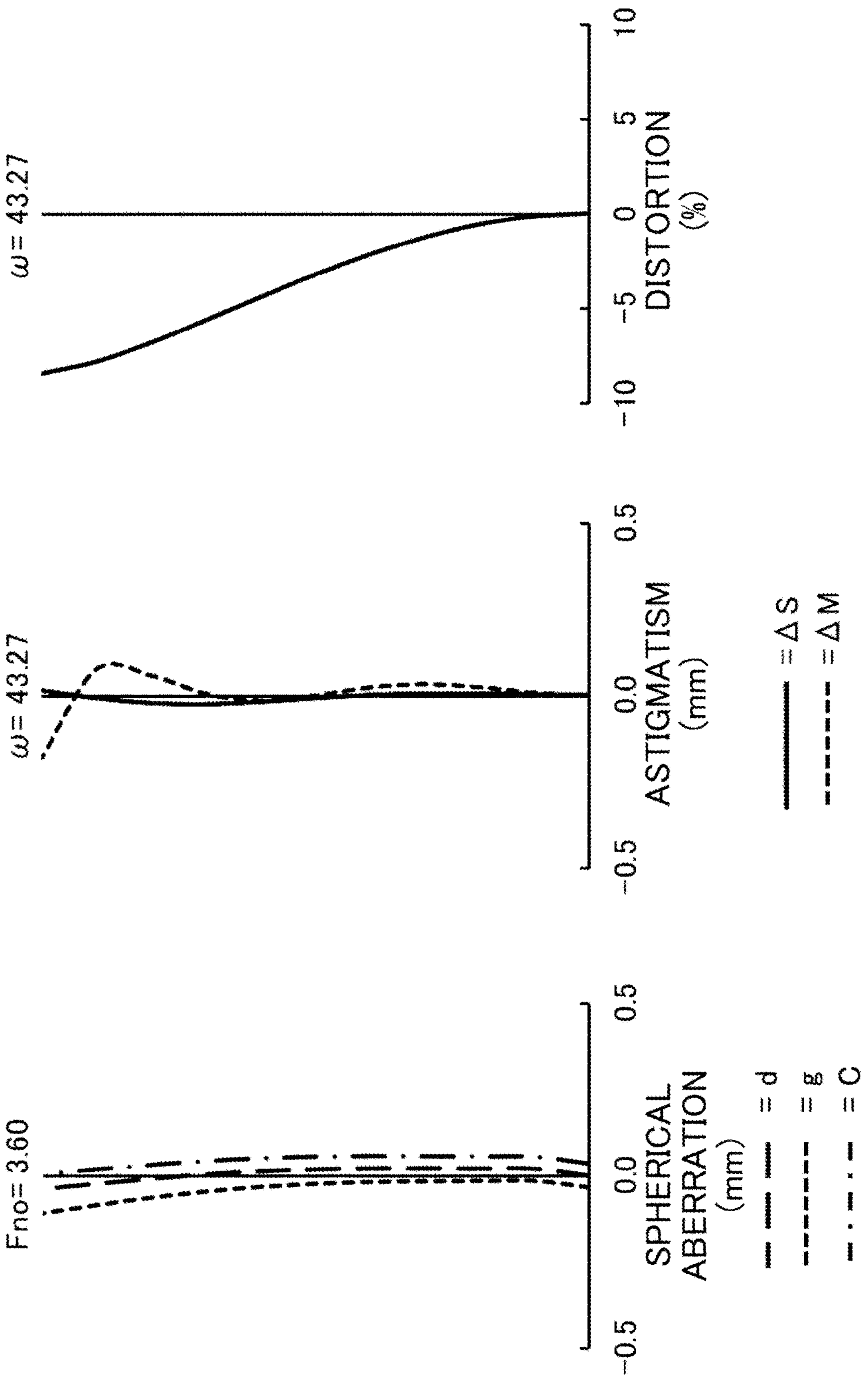
FIG. 12 is a longitudinal aberration diagram at the wide-angle end of the high power zoom lens of Example 2 at infinity.
Figure 13:
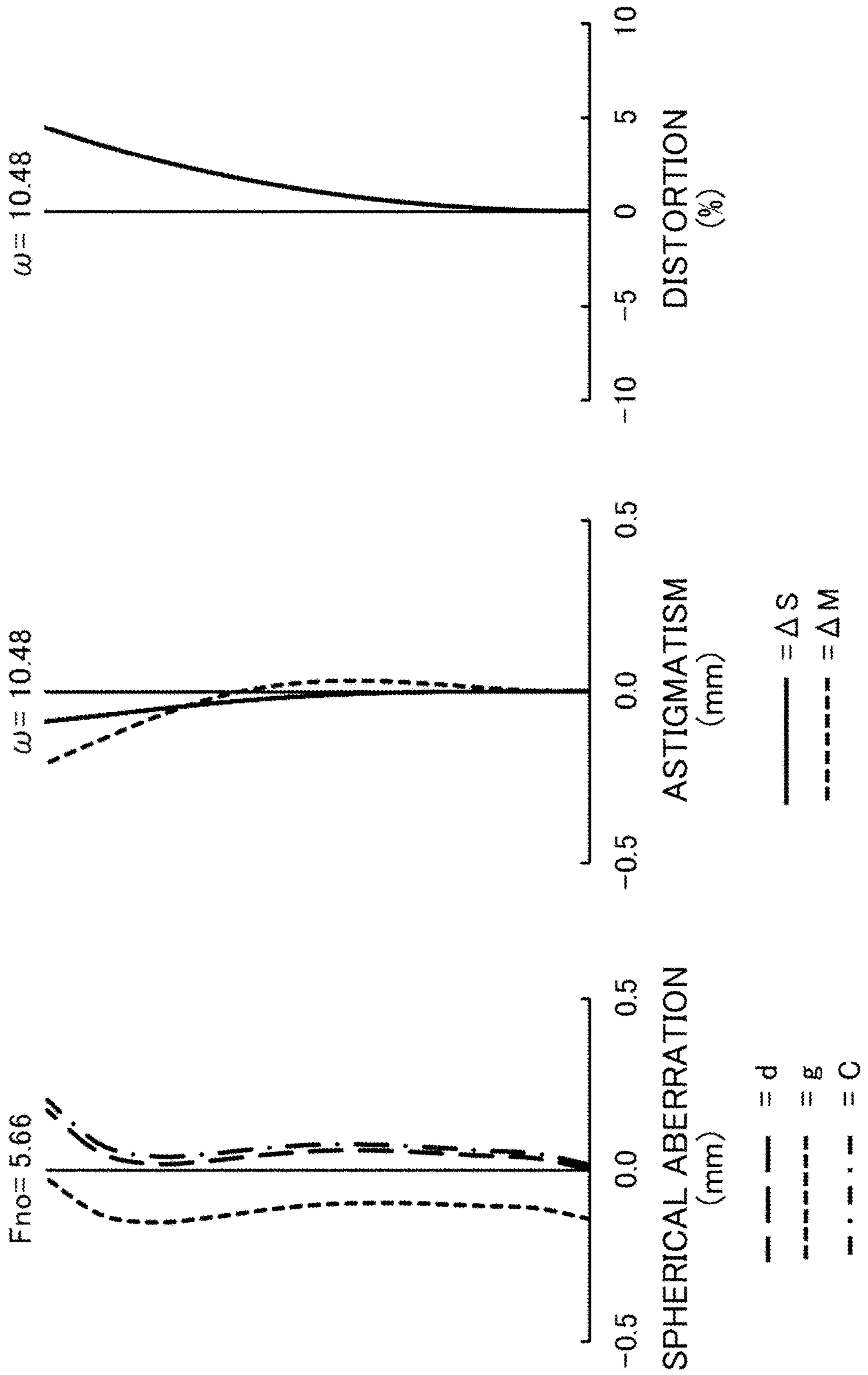
FIG. 13 is a longitudinal aberration diagram at an intermediate focal length of the high power zoom lens of Example 2 at infinity.
Figure 14:
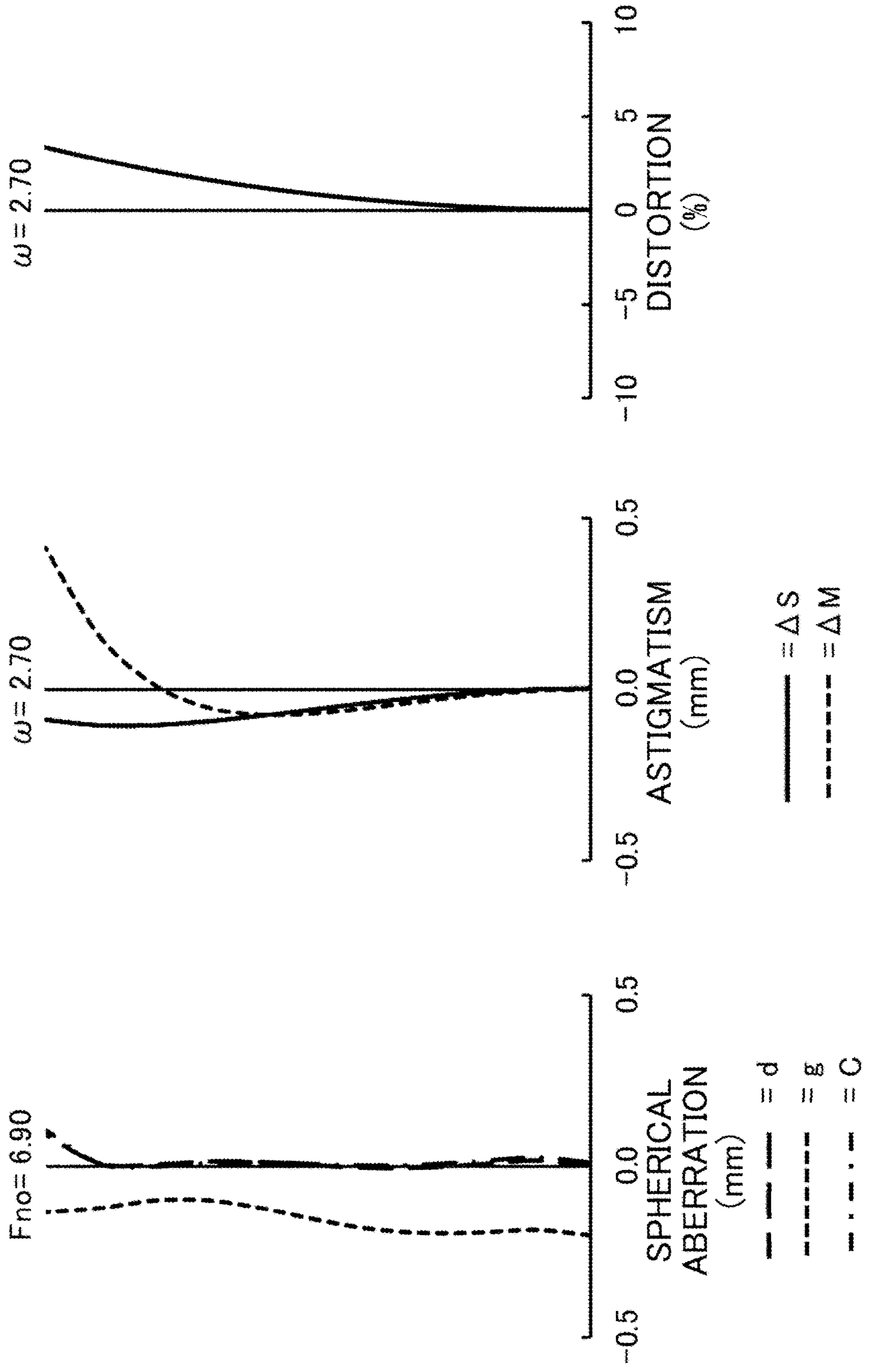
FIG. 14 is a longitudinal aberration diagram at the telephoto end of the high power zoom lens of Example 2 at infinity.
Figure 15:
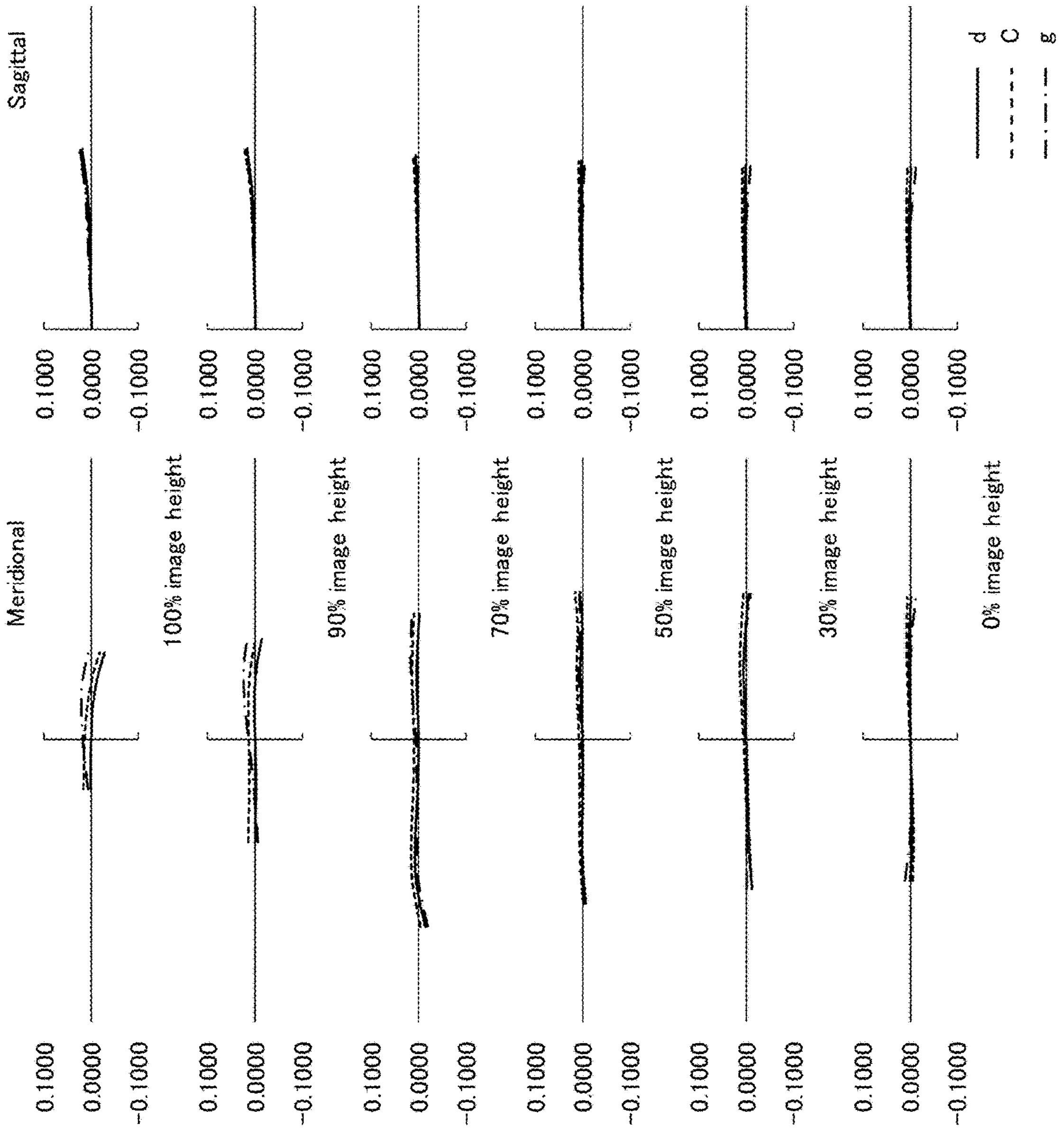
FIG. 15 is a lateral aberration diagram at the wide-angle end of the high power zoom lens of Example 2 at infinity.
Figure 16:
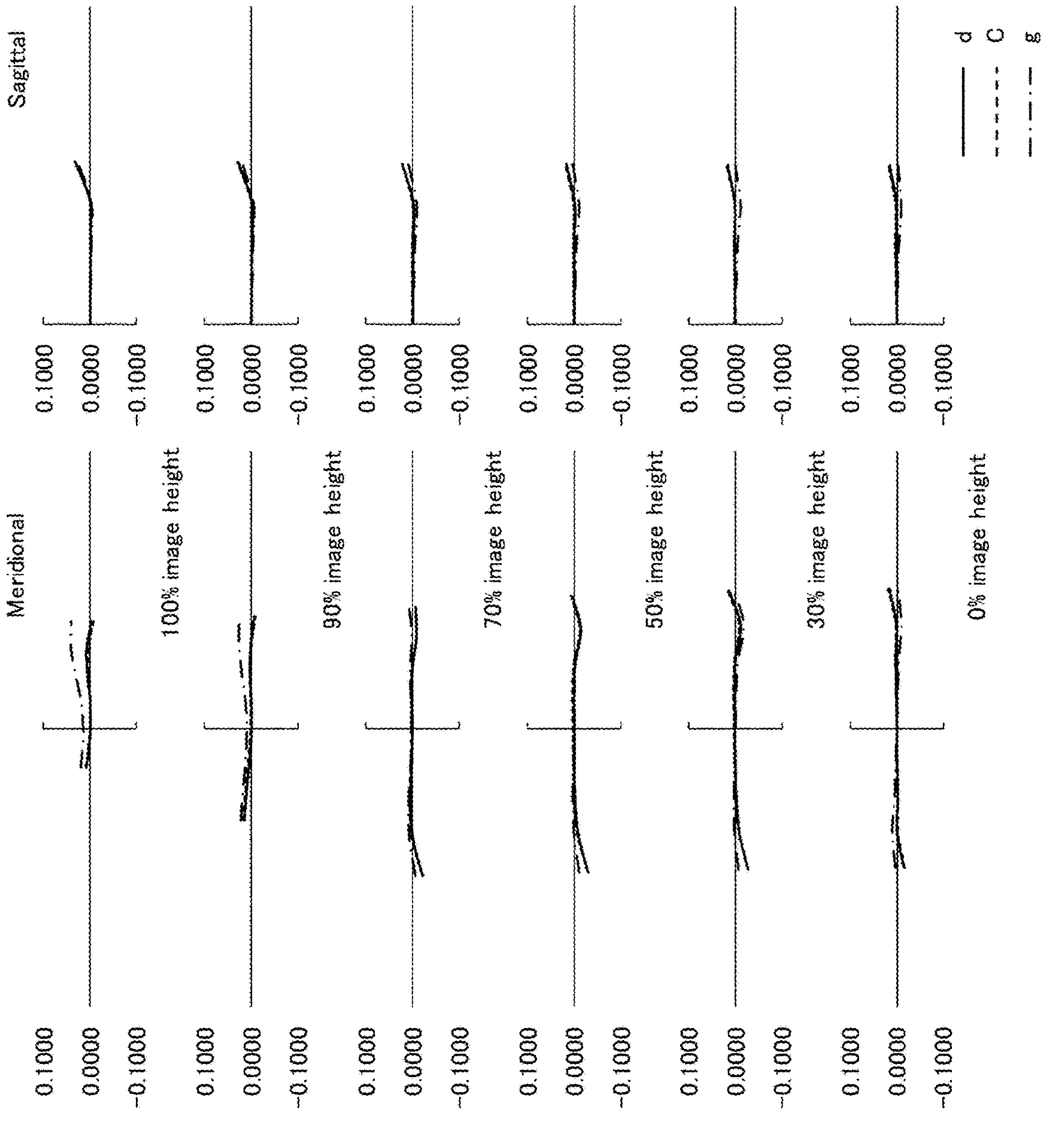
FIG. 16 is a lateral aberration diagram at an intermediate focal length of the high power zoom lens of Example 2 at infinity.
Figure 17:
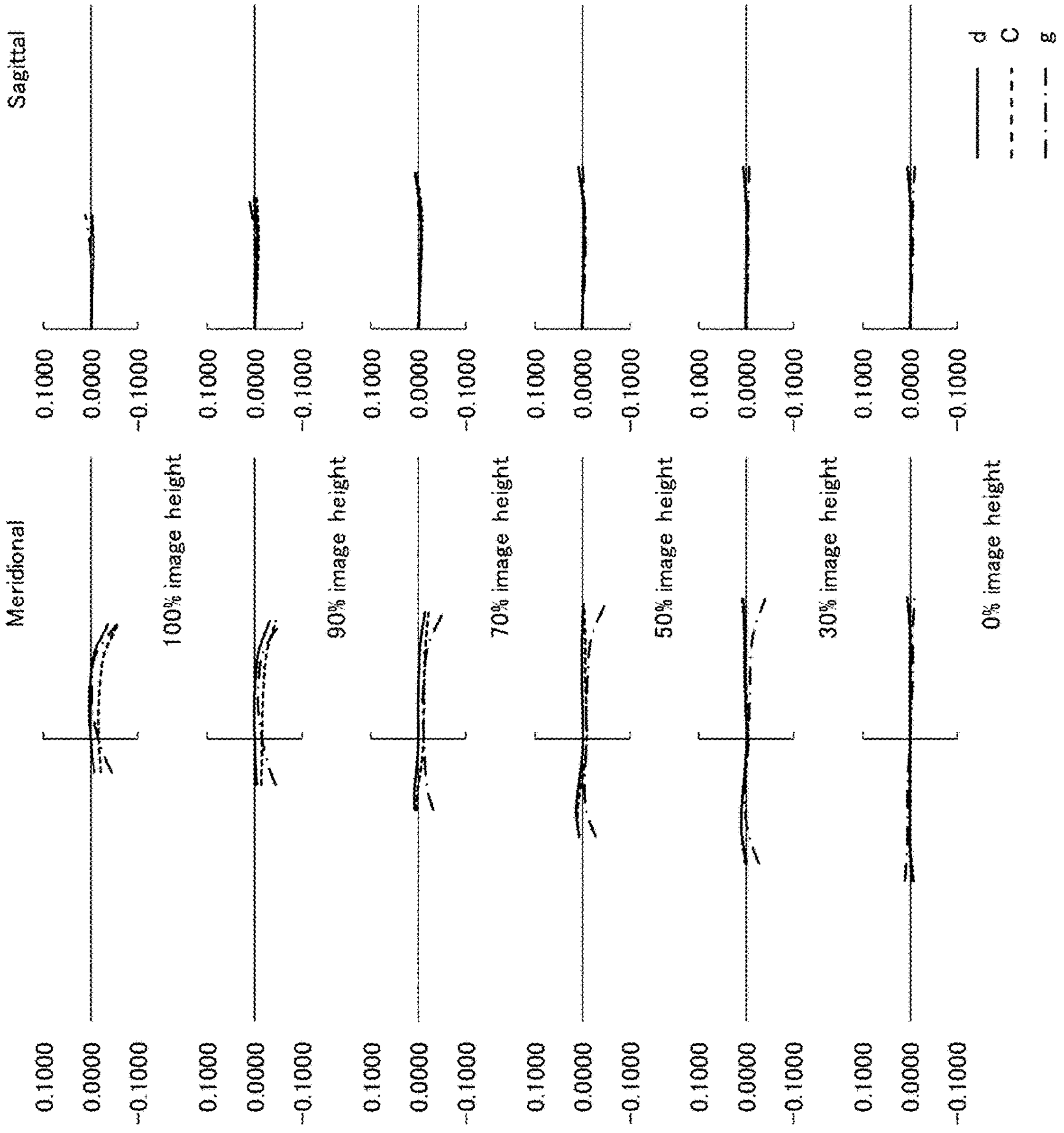
FIG. 17 is a lateral aberration diagram at the telephoto end of the high power zoom lens of Example 2 at infinity.
Figure 18:
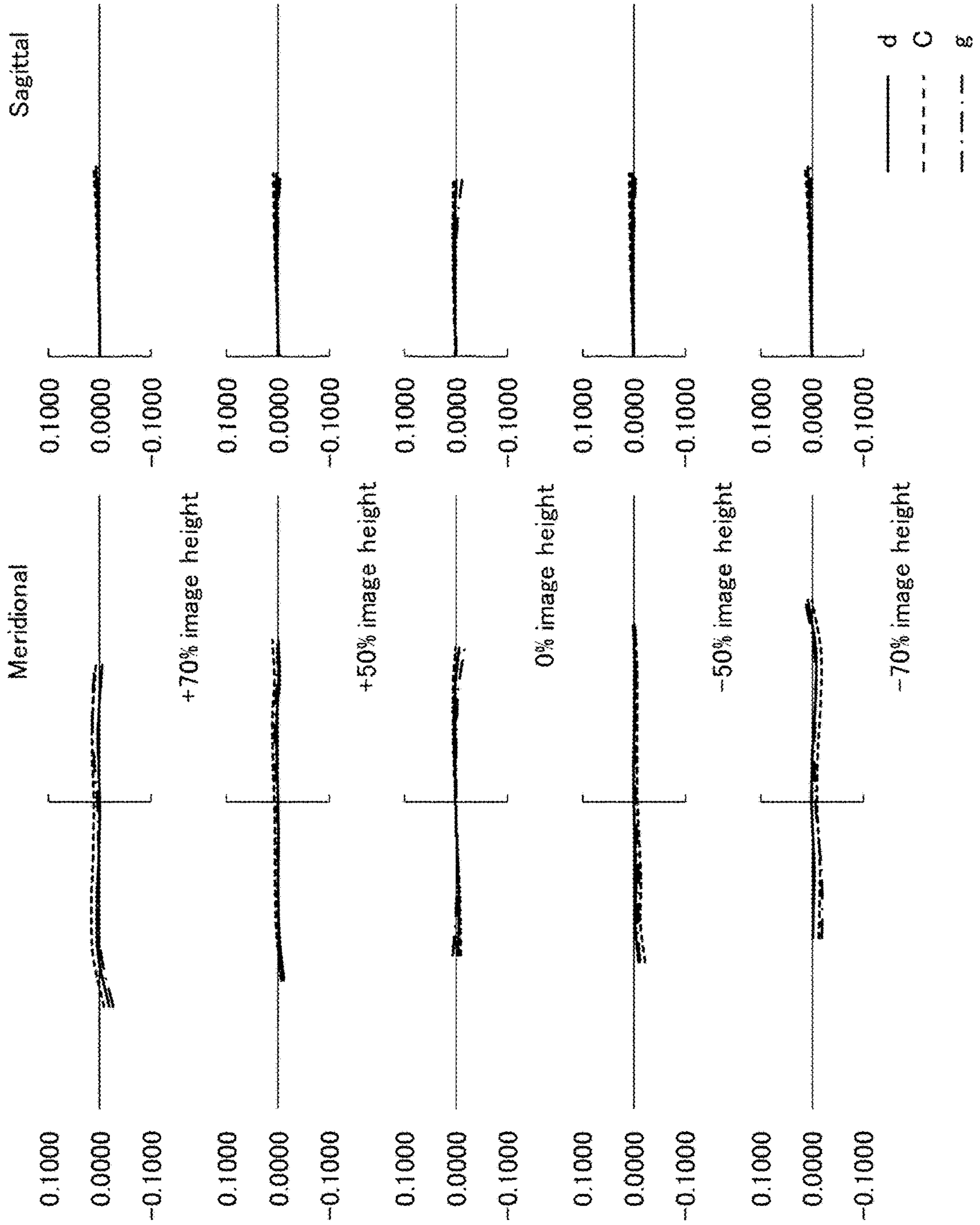
FIG. 18 is a lateral aberration diagram in a case where a deflection angle of 0.3 degrees is corrected at the wide-angle end of the high power zoom lens of Example 2 at infinity during vibration reduction.
Figure 19:
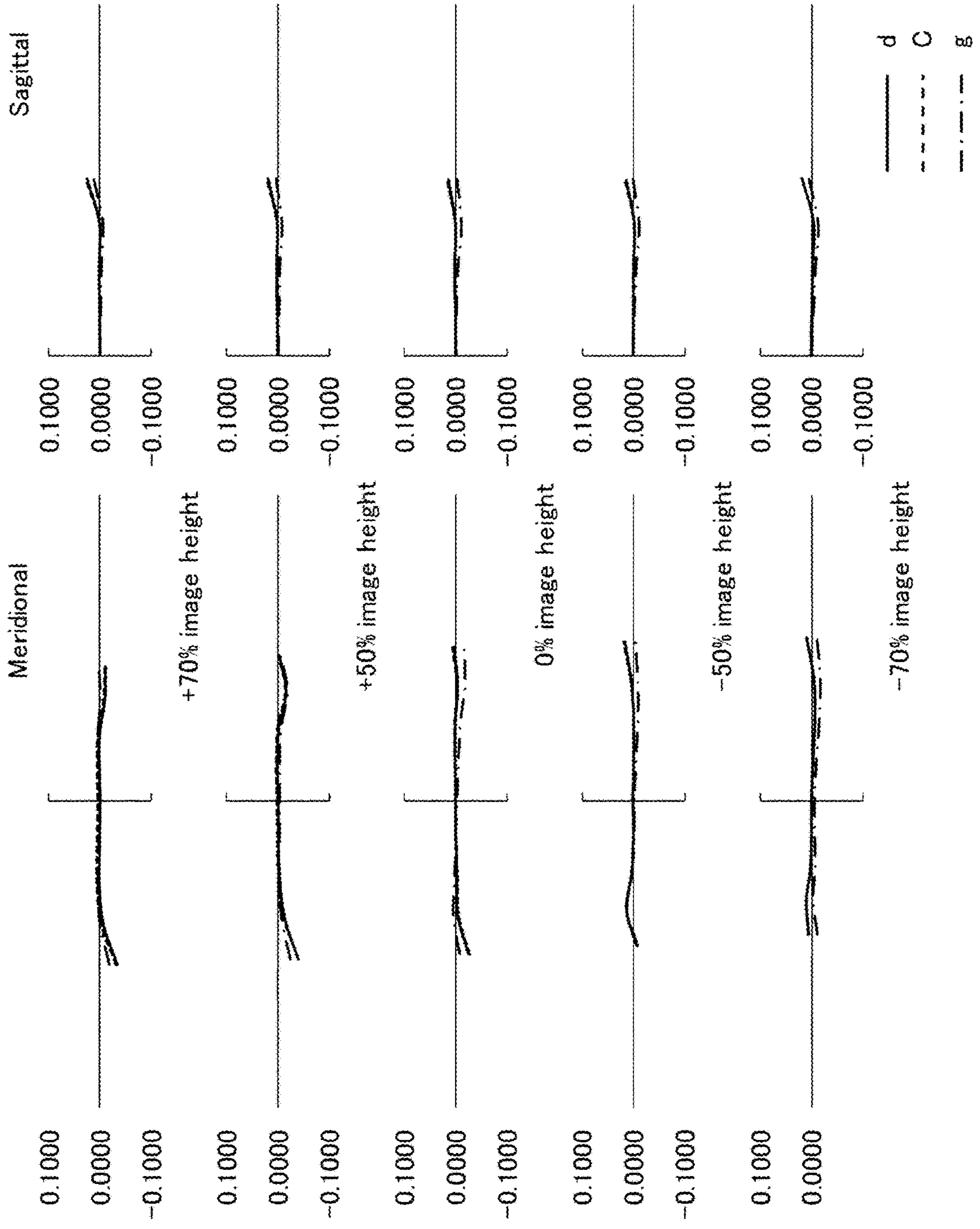
FIG. 19 is a lateral aberration diagram in a case where a deflection angle of 0.3 degrees is corrected at the intermediate focal length of the high power zoom lens of Example 2 at infinity during vibration reduction.
Figure 20:
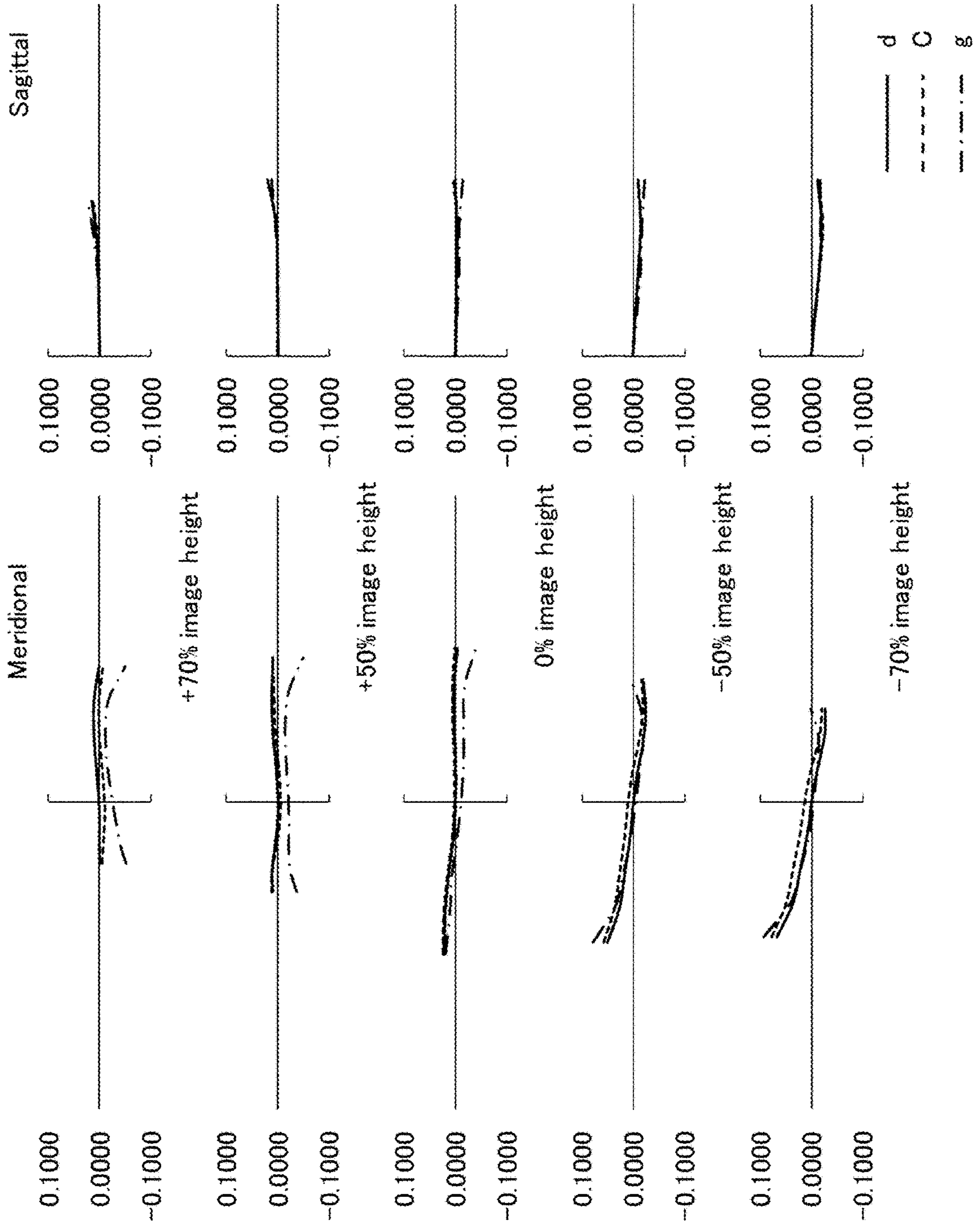
FIG. 20 is a lateral aberration diagram in a case where a deflection angle of 0.3 degrees is corrected at the telephoto end of the high power zoom lens of Example 2 at infinity during vibration reduction.

FIG. 11 is a lens configuration diagram of a high power zoom lens of Example 2 of the invention.

Example 2 includes, in order from the object side, a first lens group G1 that has a positive refractive power, a second lens group G2 that has a negative refractive power, an aperture diaphragm S, a third lens group G3 that has a positive refractive power, a fourth lens group G4 that has a positive refractive power, and a fifth lens group G5 that has a positive refractive power. Further, the third lens group G3 includes a 3A lens group G3A having a positive refractive power, and a 3B lens group G3B having a negative refractive power, in order from the object side. Further, the fourth lens group G4 includes a 4A lens group G4A having a positive refractive power, and a 4B lens group G4B having a negative refractive power, in order from the object side. In addition, during the image blur correction during the vibration reduction, the 3B lens group G3B moves in a direction substantially perpendicular to the optical axis. Further, during focusing from the infinity to the short distance, the 4B lens group G4B moves to the image surface side. The fifth lens group G5 corresponds to the L-th lens group GL positioned closest to the image side.

The first lens group G1 includes, in order from the object side, a negative meniscus lens having a surface convex toward the object side, a positive meniscus lens having a surface convex toward the object side, and a positive meniscus lens having a surface convex toward the object side.

The second lens group G2 includes: a negative meniscus lens having a surface convex toward the object side; a biconcave lens; and a cemented lens including a biconvex lens and a negative meniscus lens having a surface convex toward the image side, in order from the object side.

The third lens group G3 includes, in order from the object side: a 3A lens group G3A including a biconvex lens, and a cemented lens including a biconvex lens and a biconcave lens; and a 3B lens group G3B including a cemented lens including a positive meniscus lens having a surface convex toward the image side and a biconcave lens.

The fourth lens group G4 includes, in order from the object side: a 4A lens group G4A including a biconvex lens, and a cemented lens including a biconvex lens, and a biconcave lens; and a 4B lens group G4B including a cemented lens including a positive meniscus lens having a surface convex toward the image side, and a biconcave lens.

The fifth lens group G5 includes, in order from the object side, a negative meniscus lens having a surface convex toward the object side, and a biconvex lens.

In the high power zoom lens of Example 2, during zooming from the wide-angle end to the telephoto end, the distance between the first lens group G1 and the second lens group G2 increases, the distance between the second lens group G2 and the third lens group G3 decreases, the distance between the third lens group G3 and the fourth lens group G4 decreases, and the distance between the fourth lens group G4 and the fifth lens group G5 increases. Further, the fifth lens group G5 remains stationary with respect to the image surface during zooming.

The specification values of the high power zoom lens of Example 2 are shown below.

Numerical Example 2

Unit: mm
[Surface data]

| Surface number | r | d | nd | vd | PgF |
|---|---|---|---|---|---|
| Object surface | ∞ | (d0) | | | |
| 1 | 103.2436 | 1.5500 | 1.80610 | 33.27 | 0.5884 |
| 2 | 63.7486 | 7.2211 | 1.43700 | 95.10 | 0.5336 |
| 3 | 538.7114 | 0.1500 | | | |
| 4 | 81.4412 | 5.6792 | 1.59282 | 68.62 | 0.5440 |
| 5 | 1115.1717 | (d5) | | | |
| 6 | 775.2282 | 0.9000 | 1.91082 | 35.25 | |
| 7 | 16.4132 | 6.1565 | | | |
| 8* | −33.7624 | 1.0000 | 1.59201 | 67.02 | |
| 9* | 86.4689 | 0.1500 | | | |
| 10 | 43.9493 | 4.5837 | 1.80809 | 22.76 | |
| 11 | −40.6567 | 0.9000 | 1.77250 | 49.63 | |
| 12 | 5318.2571 | (d12) | | | |
| 13 (diaphragm) | ∞ | 1.0000 | | | |
| 14 | 26.2071 | 3.5822 | 1.54072 | 47.20 | 0.5678 |
| 15 | −78.5508 | 0.1500 | | | |
| 16 | 26.0109 | 3.6387 | 1.49700 | 81.61 | 0.5389 |
| 17 | −102.4775 | 0.9000 | 2.00100 | 29.13 | 0.5995 |
| 18 | 79.2722 | 3.0937 | | | |
| 19 | 38.2212 | 2.0136 | 1.68893 | 31.16 | |
| 20 | −23.4974 | 0.9000 | 1.59201 | 67.02 | |
| 21* | 82.1288 | (d21) | | | |
| 22 | 32.0342 | 3.4958 | 1.43700 | 95.10 | |
| 23 | −329.5864 | 0.1500 | | | |
| 24 | 19.8715 | 4.0085 | 1.49700 | 81.61 | |
| 25 | −392.2178 | 0.9000 | 2.00100 | 29.13 | |
| 26 | 31.4569 | 0.8176 | | | |
| 27* | 34.7403 | 3.8014 | 1.59201 | 67.02 | |
| 28* | −37.1102 | (d28) | | | |
| 29 | −72.8134 | 2.2165 | 1.75211 | 25.05 | |
| 30 | −30.8578 | 0.9000 | 1.59201 | 67.02 | |
| 31* | 36.0524 | (d31) | | | |

-continued

Unit: mm
[Surface data]

| | | | | |
|---|---|---|---|---|
| 32 | 93.8380 | 0.9000 | 2.00100 | 29.13 |
| 33 | 40.1321 | 2.2375 | | |
| 34 | 65.3460 | 4.6222 | 1.60342 | 38.01 |
| 35 | −77.0648 | (BF) | | |
| Image surface | ∞ | | | |

[Aspherical surface data]

| | Surface 8 | Surface 9 | Surface 21 | Surface 27 | Surface 28 | Surface 31 |
|---|---|---|---|---|---|---|
| K | 0.00000 | 0.00000 | 0.00000 | 0.00000 | 0.00000 | 0.00000 |
| A4 | 5.39139E−05 | 4.06945E−05 | −6.52360E−06 | −3.31668E−05 | 2.06783E−05 | −1.46682E−08 |
| A6 | −4.56671E−07 | −5.16111E−07 | −1.42896E−08 | 6.37360E−08 | 1.12194E−07 | −8.98716E−08 |
| A8 | 1.84445E−09 | 2.18662E−09 | 2.29825E−10 | 1.50461E−09 | 6.89367E−10 | 1.83802E−09 |
| A10 | −3.30429E−12 | −4.02770E−12 | −1.40717E−12 | −4.52047E−12 | 0.00000E+00 | −9.63256E−12 |

Zoom ratio: 17.66

| | Wide angle | Middle | Telephoto |
|---|---|---|---|
| [Various types of data] | | | |
| Focal length | 16.48 | 73.48 | 291.00 |
| F number | 3.60 | 5.66 | 6.90 |
| Total angle of view 2ω | 86.56 | 20.96 | 5.41 |
| Image height Y | 14.20 | 14.20 | |
| Total length of lens | 146.79 | 200.14 | 245.06 |
| [Variable distance data] | | | |
| d0 | ∞ | ∞ | ∞ |
| d5 | 1.5000 | 45.1776 | 83.4412 |
| d12 | 39.4231 | 14.3069 | 2.0059 |
| d21 | 8.7171 | 4.1048 | 2.0000 |
| d28 | 1.5000 | 1.5000 | 1.5000 |
| d31 | 11.1829 | 50.5497 | 71.6024 |
| BF | 16.8781 | 16.8781 | 16.8781 |

[Lens group data]

| Group | Starting surface | Focal length |
|---|---|---|
| G1 | 1 | 126.48 |
| G2 | 6 | −16.57 |
| G3 | 13 | 63.69 |
| G4 | 22 | 43.57 |
| G5 | 32 | 287.96 |
| G3A | 13 | 32.43 |
| G3B | 19 | −47.10 |
| G4A | 22 | 26.55 |
| G4B | 28 | −45.96 |

Example 3

Figure 21:
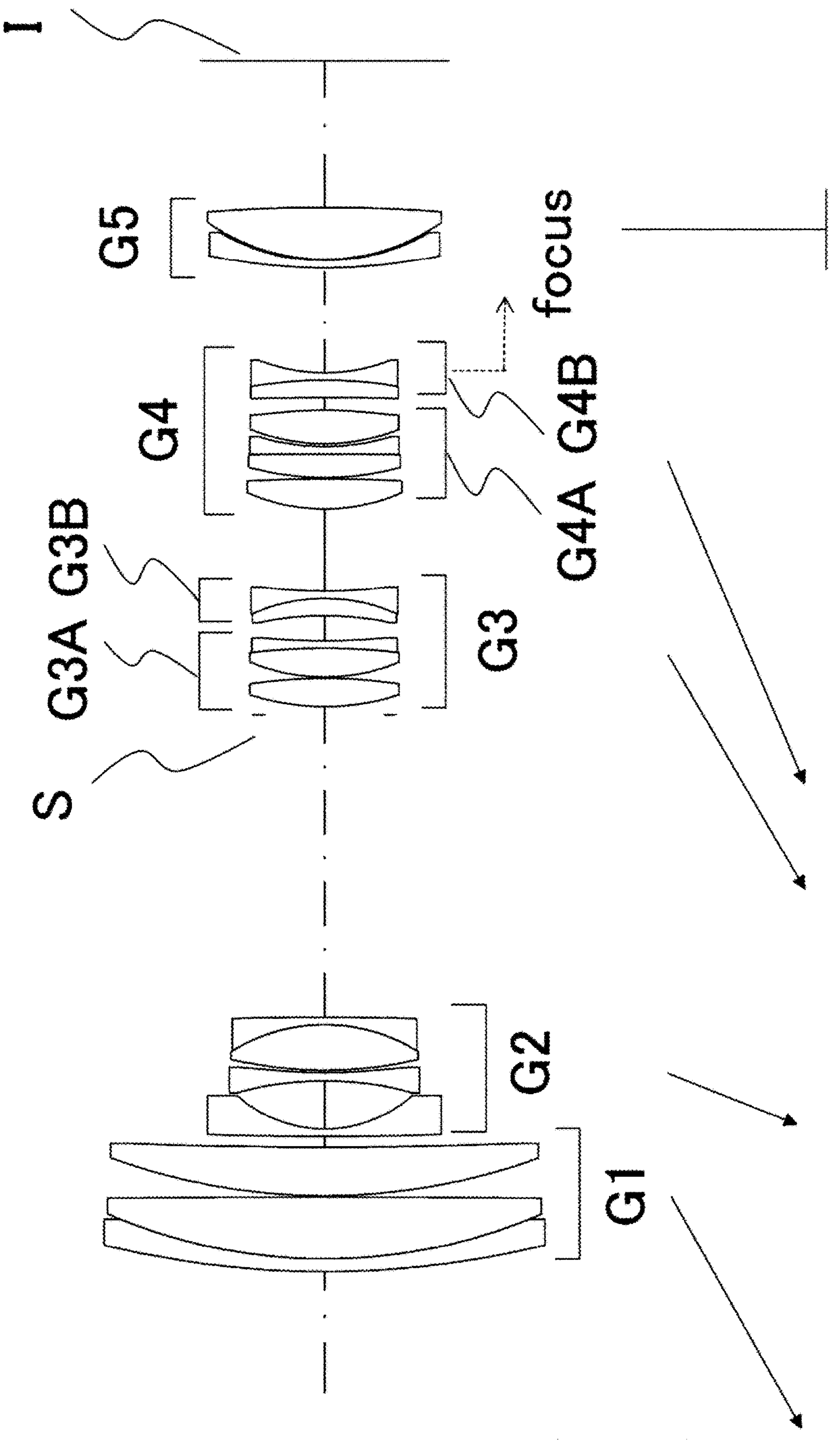
FIG. 21 is a lens configuration diagram at the wide-angle end at infinity according to Example 3 of the high power zoom lens of the present invention.
Figure 22:
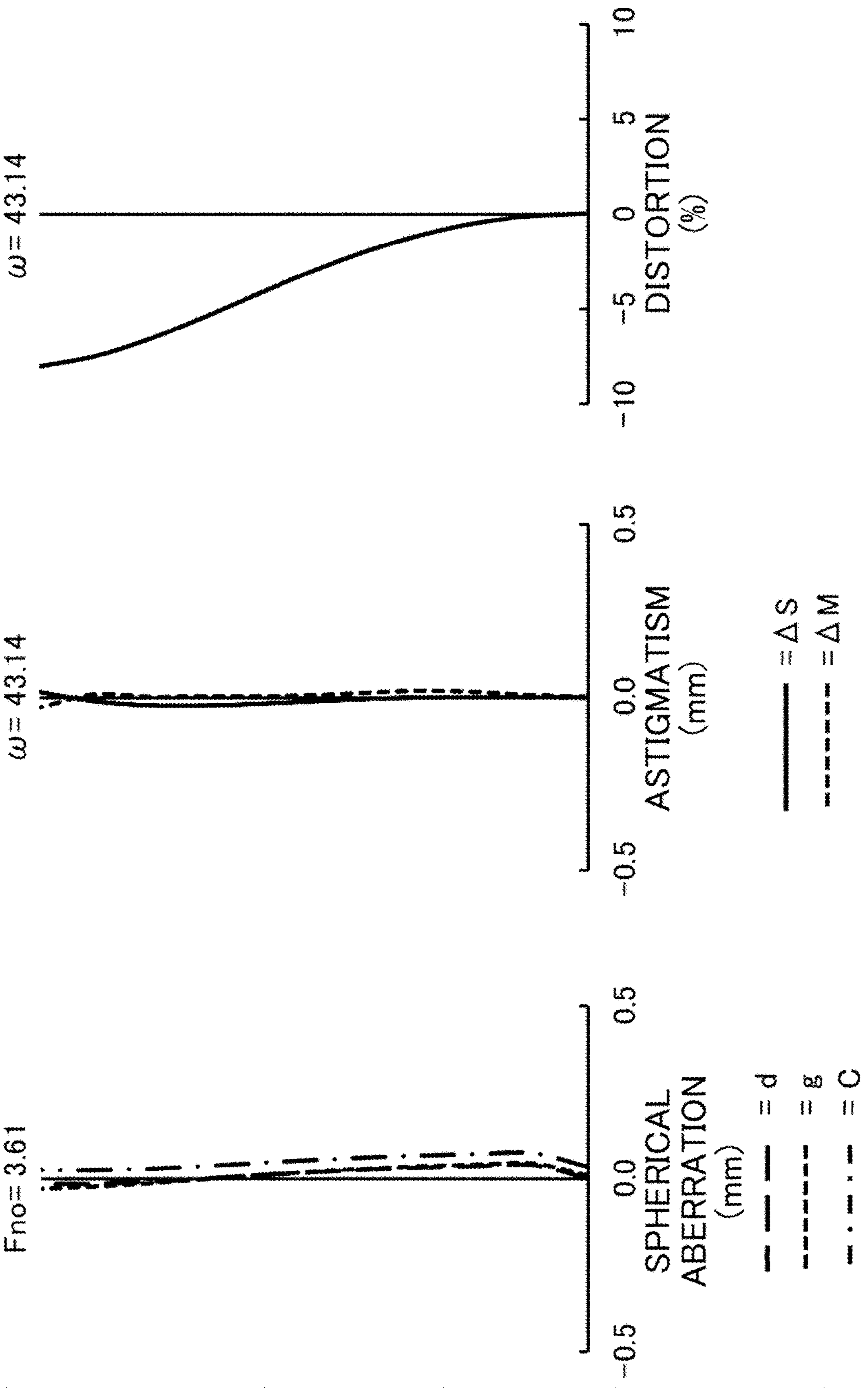
FIG. 22 is a longitudinal aberration diagram at the wide-angle end of the high power zoom lens of Example 3 in the infinity.
Figure 23:
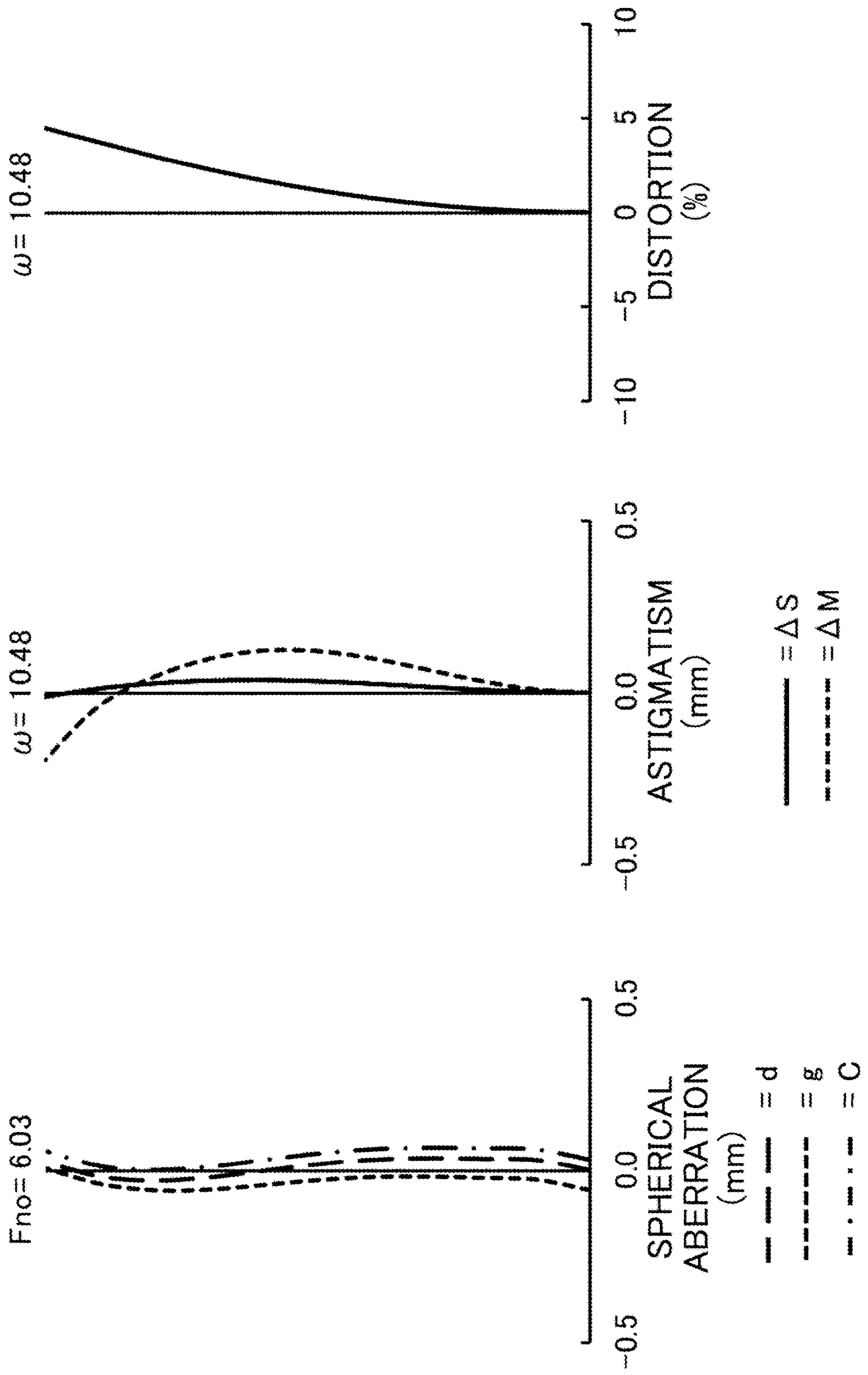
FIG. 23 is a longitudinal aberration diagram at an intermediate focal length of the high power zoom lens of Example 3 at infinity.
Figure 24:
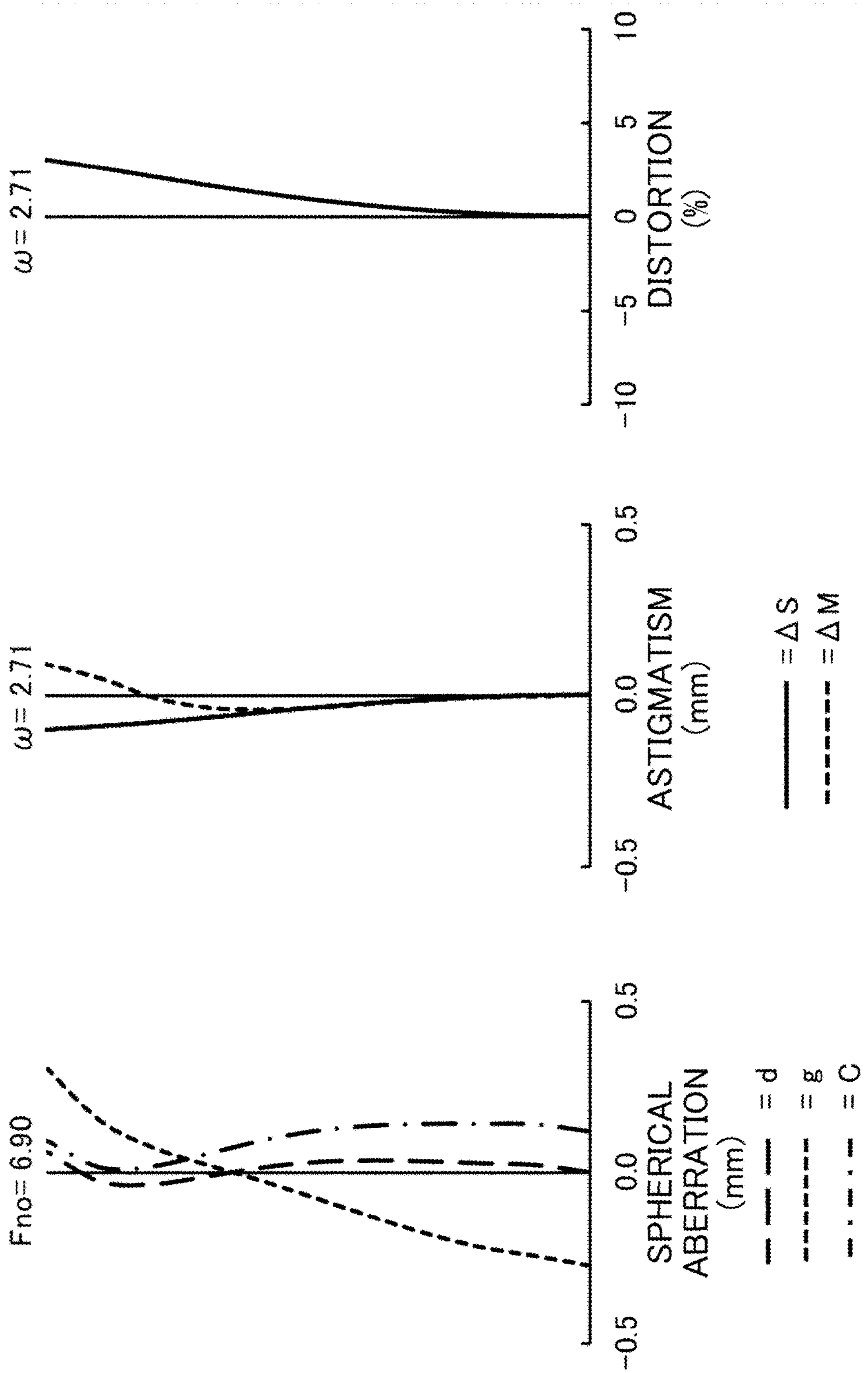
FIG. 24 is a longitudinal aberration diagram at the telephoto end of the high power zoom lens of Example 3 at infinity.
Figure 25:
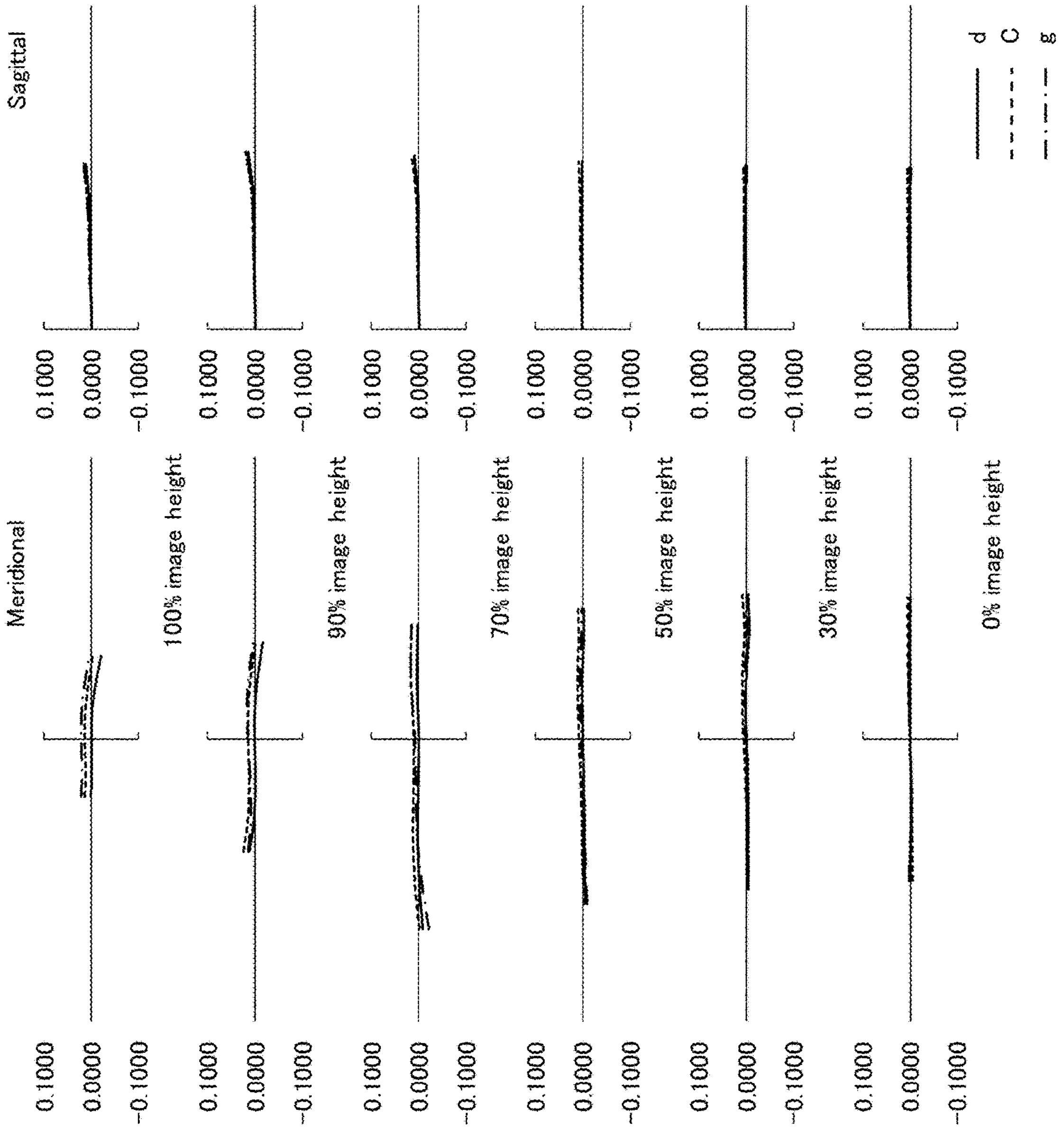
FIG. 25 is a lateral aberration diagram at the wide-angle end of the high power zoom lens of Example 3 at infinity.
Figure 26:
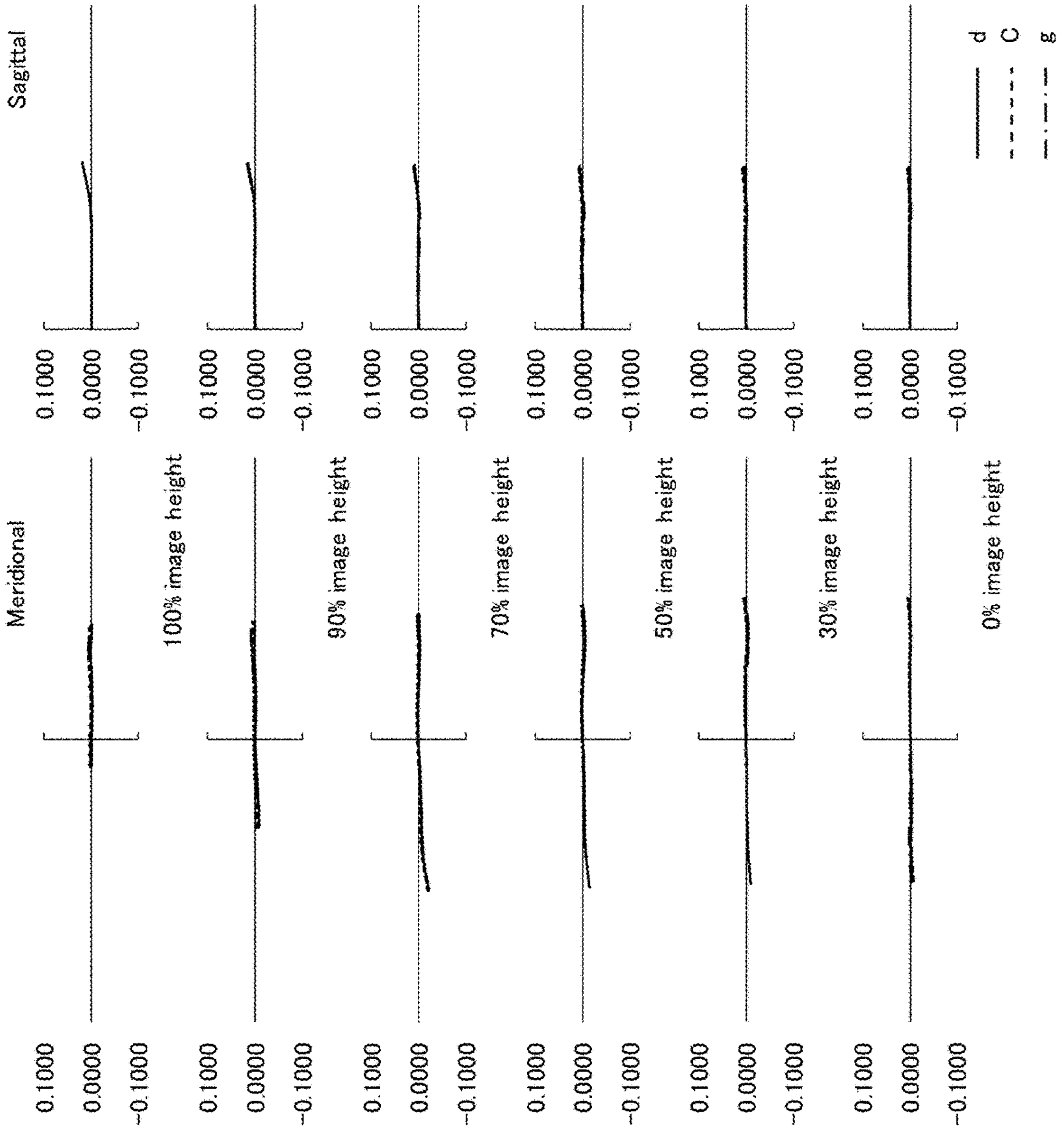
FIG. 26 is a lateral aberration diagram at an intermediate focal length of the high power zoom lens of Example 3 at infinity.
Figure 27:
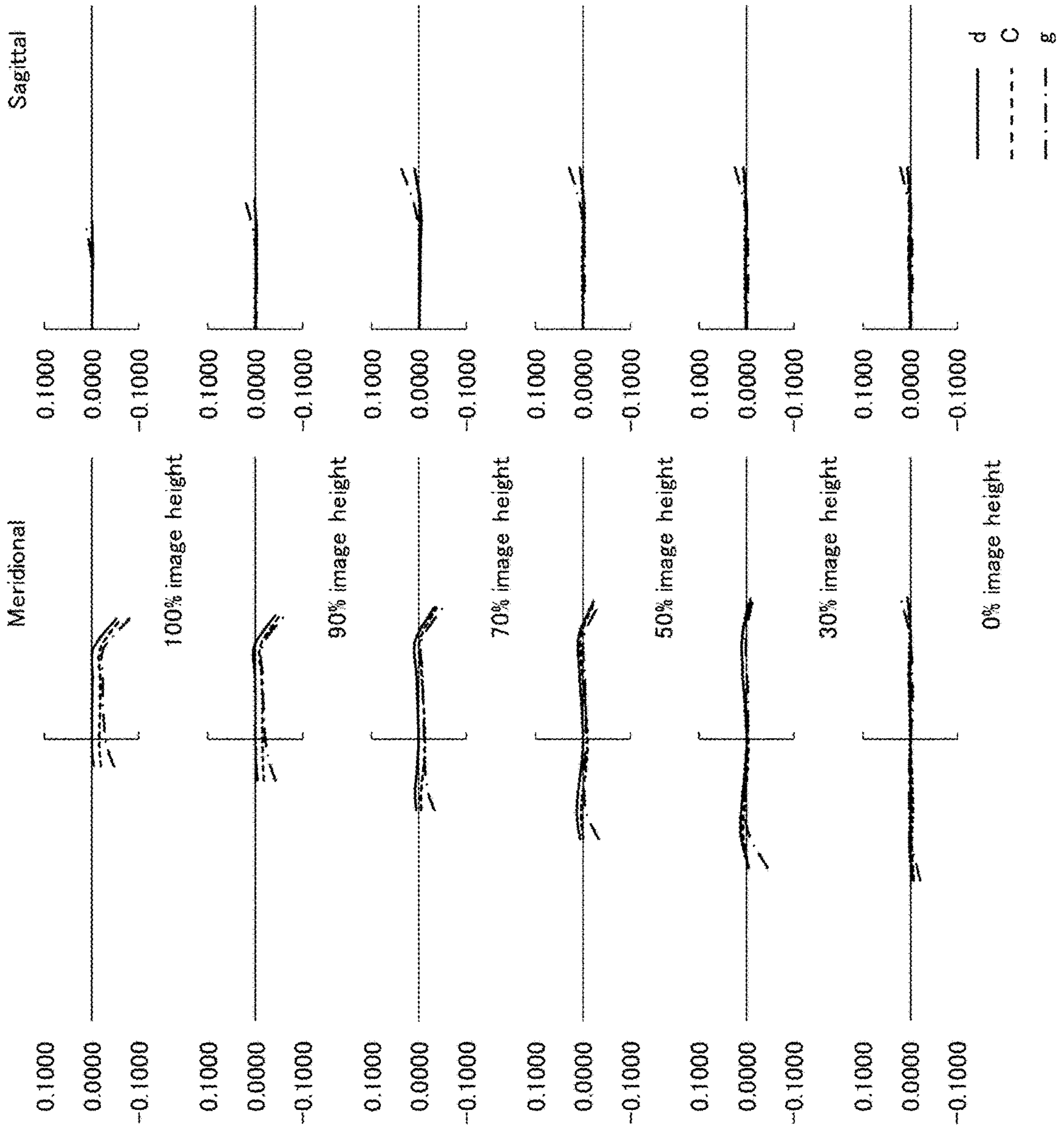
FIG. 27 is a lateral aberration diagram at the telephoto end of the high power zoom lens of Example 3 at infinity.
Figure 28:
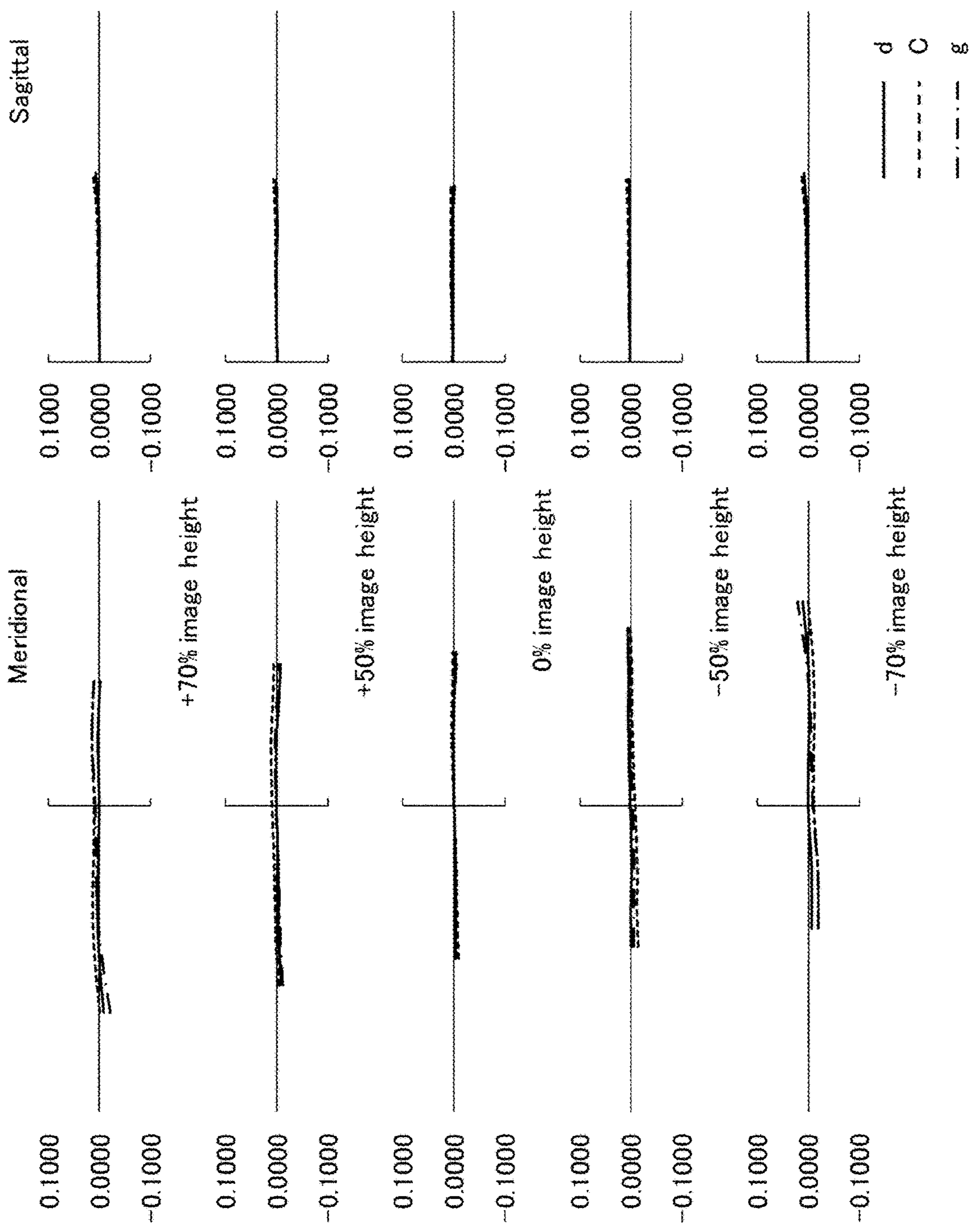
FIG. 28 is a lateral aberration diagram in a case where a deflection angle of 0.3 degrees is corrected at the wide angle end of the high power zoom lens of Example 3 at infinity during vibration reduction.
Figure 29:
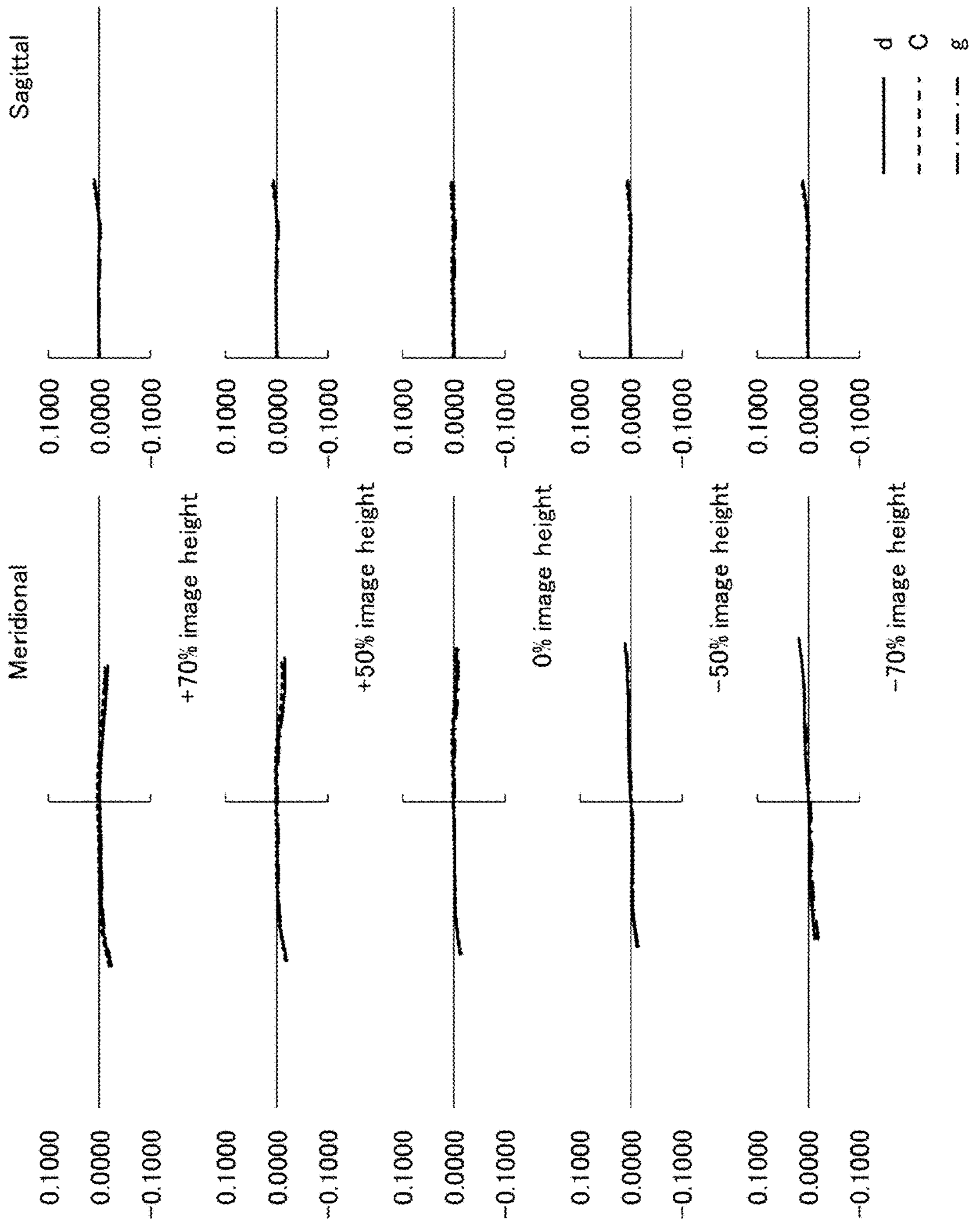
FIG. 29 is a lateral aberration diagram in a case where a deflection angle of 0.3 degrees is corrected at the intermediate focal length of the high power zoom lens of Example 3 at infinity during vibration reduction.
Figure 30:
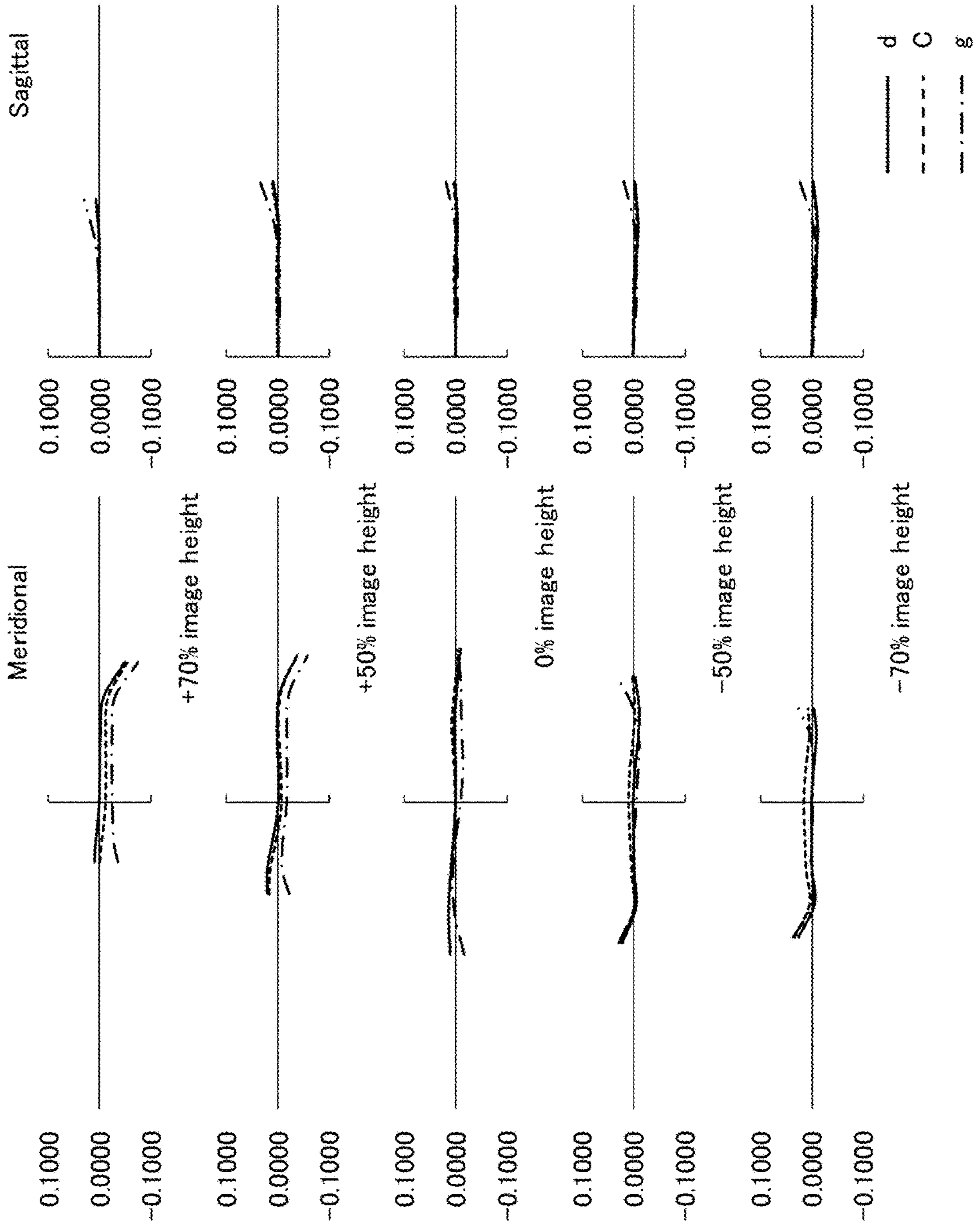
FIG. 30 is a lateral aberration diagram in a case where a deflection angle of 0.3 degrees is corrected at the telephoto end of the high power zoom lens of Example 3 at infinity during vibration reduction.

FIG. 21 is a lens configuration diagram of a high power zoom lens of Example 3 of the invention.

Example 3 includes, in order from the object side, a first lens group G1 having a positive refractive power, a second lens group G2 having a negative refractive power, an aperture diaphragm S, a third lens group G3 having a positive refractive power, a fourth lens group G4 having a positive refractive power, and a fifth lens group G5 having a positive refractive power. Further, the third lens group G3 includes a 3A lens group G3A having a positive refractive power and a 3B lens group G3B having a negative refractive power, in order from the object side. Further, the fourth lens group G4 includes a 4A lens group G4A having a positive refractive power and a 4B lens group G4B having a negative refractive power, in order from the object side. In addition, during the image blur correction during the vibration reduction, the 3B lens group G3B moves in a direction substantially perpendicular to the optical axis. Further, during focusing from the infinity to the short distance, the 4B lens group G4B moves to the image surface side. The fifth lens group G5 corresponds to the L-th lens group GL positioned closest to the image side.

The first lens group G1 includes, in order from the object side, a negative meniscus lens having a surface convex toward the object side, a biconvex lens, and a positive meniscus lens having a surface having a surface convex toward the object side.

The second lens group G2 includes: a negative meniscus lens having a surface convex toward the object side; a biconcave lens; and a cemented lens including a biconvex lens and a negative meniscus lens having a surface convex toward the image side, in order from the object side.

The third lens group G3 includes, in order from the object side: a 3A lens group G3A including a biconvex lens and a cemented lens including a biconvex lens and a biconcave lens; and a 3B lens group G3B including a cemented lens including a positive meniscus lens having a surface convex toward the image side, and a biconcave lens.

The fourth lens group G4 includes, in order from the object side: a 4A lens group G4A including a biconvex lens, a cemented lens including a biconvex lens and a biconcave lens; and a 4B lens group G4B including a cemented lens including a positive meniscus lens having a surface convex toward the image side and a biconcave lens.

The fifth lens group G5 includes, in order from the object side, a negative meniscus lens having a surface convex toward the object side, and a biconvex lens.

In the high power zoom lens of Example 3, during zooming from the wide-angle end to the telephoto end, the distance between the first lens group G1 and the second lens group G2 increases, the distance between the second lens group G2 and the third lens group G3 decreases, the distance between the third lens group G3 and the fourth lens group G4 decreases, and the distance between the fourth lens group G4 and the fifth lens group G5 increases. Further, the fifth lens group remains stationary with respect to the image surface during zooming.

The specification values of the high power zoom lens of Example 3 are shown below.

Numerical Example 3

Unit: mm

[Surface data]

| Surface number | r | d | nd | vd | PgF |
|---|---|---|---|---|---|
| Object surface | ∞ | (d0) | | | |
| 1 | 118.8841 | 1.5500 | 1.80610 | 33.27 | 0.5884 |
| 2 | 70.0228 | 7.4863 | 1.43700 | 95.10 | 0.5336 |
| 3 | −2402.5913 | 0.1500 | | | |
| 4 | 80.3410 | 5.8476 | 1.59282 | 68.62 | 0.5440 |
| 5 | 675.7919 | (d5) | | | |
| 6 | 485.6242 | 0.9000 | 1.95375 | 32.32 | |
| 7 | 16.7430 | 5.8285 | | | |
| 8* | −43.1161 | 1.0000 | 1.59201 | 67.02 | |
| 9* | 64.4976 | 0.2815 | | | |
| 10 | 52.7306 | 5.4828 | 1.75211 | 25.05 | |
| 11 | −22.5163 | 0.9000 | 1.72916 | 54.67 | |
| 12 | −408.4979 | (d12) | | | |
| 13 (diaphragm) | ∞ | 1.0000 | | | |
| 14 | 30.9666 | 3.4000 | 1.54072 | 47.20 | 0.5678 |
| 15 | −63.5513 | 0.1517 | | | |
| 16 | 25.0482 | 3.5271 | 1.49700 | 81.61 | 0.5389 |
| 17 | −79.0529 | 0.9000 | 2.00100 | 29.13 | 0.5995 |
| 18 | 92.9187 | 2.9833 | | | |
| 19 | −40.5363 | 2.0695 | 1.69895 | 30.05 | |
| 20 | −22.8952 | 0.9000 | 1.59201 | 67.02 | |
| 21* | 60.7550 | (d21) | | | |
| 22 | 24.9347 | 3.5949 | 1.55032 | 75.50 | |
| 23 | −174.0996 | 0.1500 | | | |
| 24 | 37.0230 | 2.8841 | 1.59282 | 68.62 | |
| 25 | −445.9978 | 0.9000 | 2.00100 | 29.13 | |
| 26 | 29.5861 | 0.3434 | | | |
| 27* | 24.7835 | 4.0436 | 1.59201 | 67.02 | |
| 28* | −48.7516 | (d28) | | | |
| 29 | −410.3724 | 2.0910 | 1.76182 | 26.61 | |
| 30 | −54.9954 | 0.9000 | 1.59201 | 67.02 | |
| 31* | 23.0380 | (d31) | | | |
| 32 | 70.2250 | 0.9000 | 1.95375 | 32.32 | |
| 33 | 26.9449 | 0.1500 | | | |
| 34 | 26.0345 | 6.2541 | 1.58144 | 40.89 | |
| 35 | −194.4494 | (BF) | | | |
| Image surface | ∞ | | | | |

[Aspherical surface data]

| | Surface 8 | Surface 9 | Surface 21 | Surface 27 | Surface 28 | Surface 31 |
|---|---|---|---|---|---|---|
| K | 0.00000 | 0.00000 | 0.00000 | 0.00000 | 0.00000 | 0.00000 |
| A4 | 2.23406E−05 | 5.87171E−06 | −7.05642E−06 | −2.34043E−05 | 2.38348E−05 | 1.44502E−06 |
| A6 | −5.92061E−07 | −5.76131E−07 | 5.82547E−09 | 2.41225E−08 | 9.84370E−08 | −2.10702E−07 |
| A8 | 4.90497E−09 | 4.84268E−09 | 9.78902E−11 | 1.51538E−09 | 9.01072E−10 | 4.22508E−09 |
| A10 | −1.50741E−11 | −1.50530E−11 | −1.20622E−12 | −2.49357E−12 | 0.00000E+00 | −3.95449E−11 |
| A12 | 0.00000E+00 | 0.00000E+00 | 0.00000E+00 | 0.00000E+00 | 0.00000E+00 | 1.65036E−13 |

Zoom ratio 17.65

[Various types of data]

| | Wide angle | Middle | Telephoto |
|---|---|---|---|
| Focal length | 16.48 | 73.48 | 291.00 |
| F number | 3.61 | 6.03 | 6.90 |
| Total angle of view 2ω | 86.28 | 20.96 | 5.43 |
| Image height Y | 14.20 | 14.20 | 14.20 |
| Total length of lens | 146.31 | 202.49 | 238.32 |

-continued

| Unit: mm [Surface data] | | | |
|---|---|---|---|
| [Variable distance data] | | | |
| d0 | ∞ | ∞ | ∞ |
| d5 | 1.3000 | 45.3108 | 82.8571 |
| d12 | 36.5543 | 14.0107 | 1.8000 |
| d21 | 9.9515 | 4.8856 | 1.8000 |
| d28 | 1.5000 | 1.5000 | 1.5000 |
| d31 | 12.6529 | 52.4418 | 65.9970 |
| BF | 17.8001 | 17.8001 | 17.8001 |

[Lens group data]

| Group | Starting surface | Focal length |
|---|---|---|
| G1 | 1 | 122.57 |
| G2 | 6 | −16.33 |
| G3 | 13 | 72.36 |
| G4 | 22 | 40.97 |
| G5 | 32 | 274.29 |
| G3A | 13 | 33.10 |
| G3B | 19 | −44.46 |
| G4A | 22 | 24.87 |
| G4B | 28 | −40.82 |

Example 4

Figure 31:
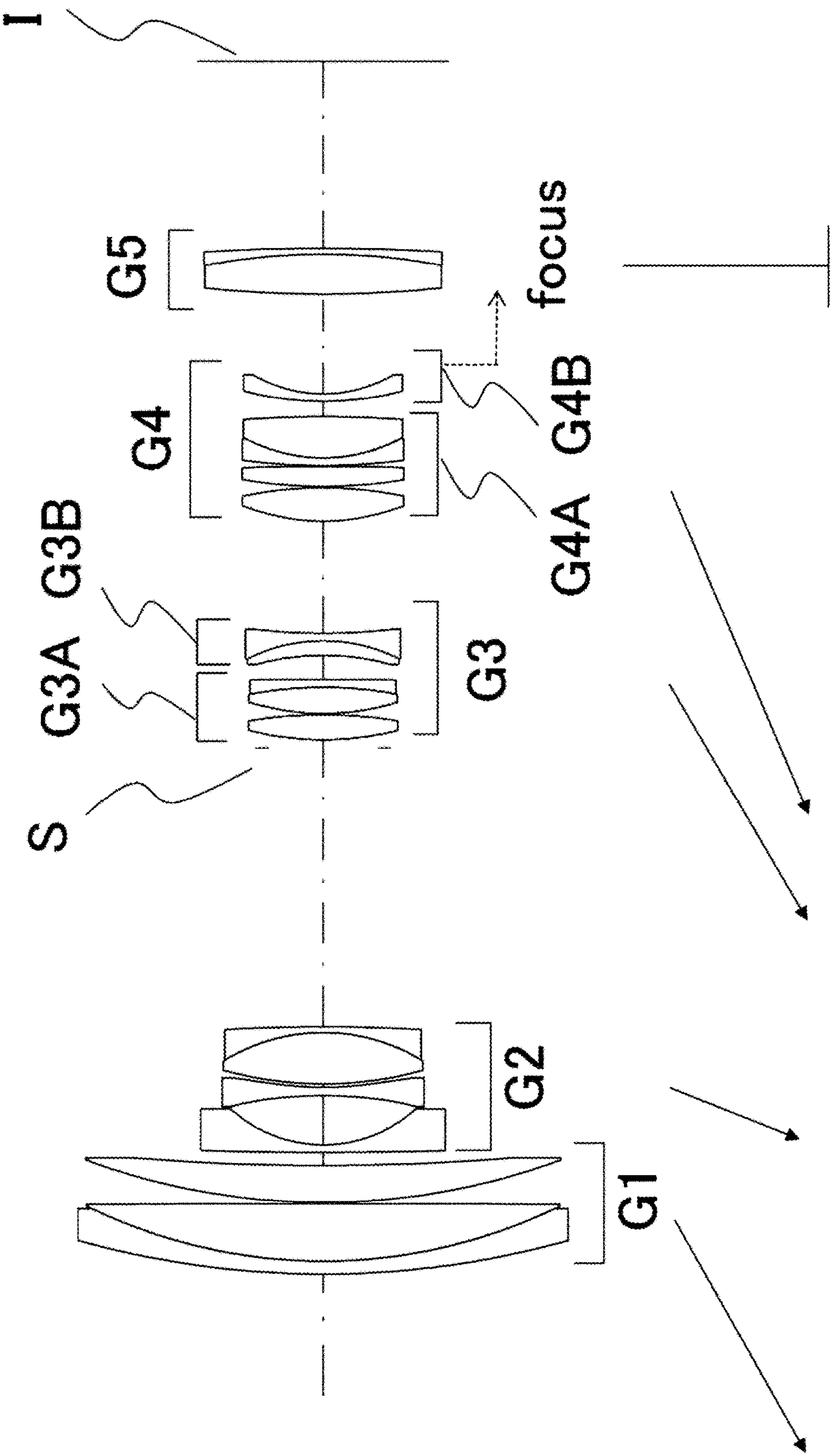
FIG. 31 is a lens configuration diagram at the wide angle end at infinity according to Example 4 of the high power zoom lens of the present invention.
Figure 32:
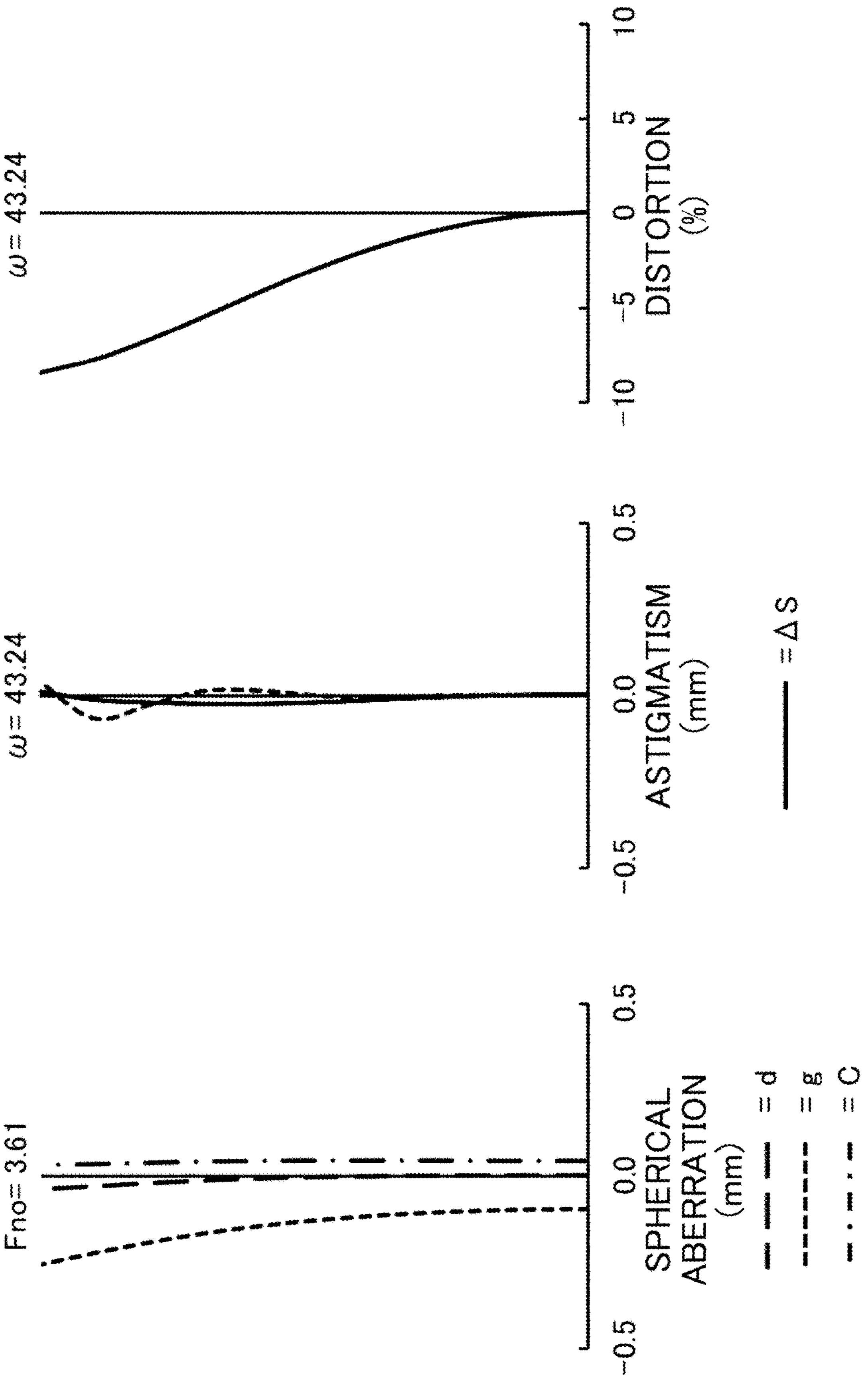
FIG. 32 is a longitudinal aberration diagram at the wide-angle end of the high power zoom lens of Example 4 at infinity.
Figure 33:
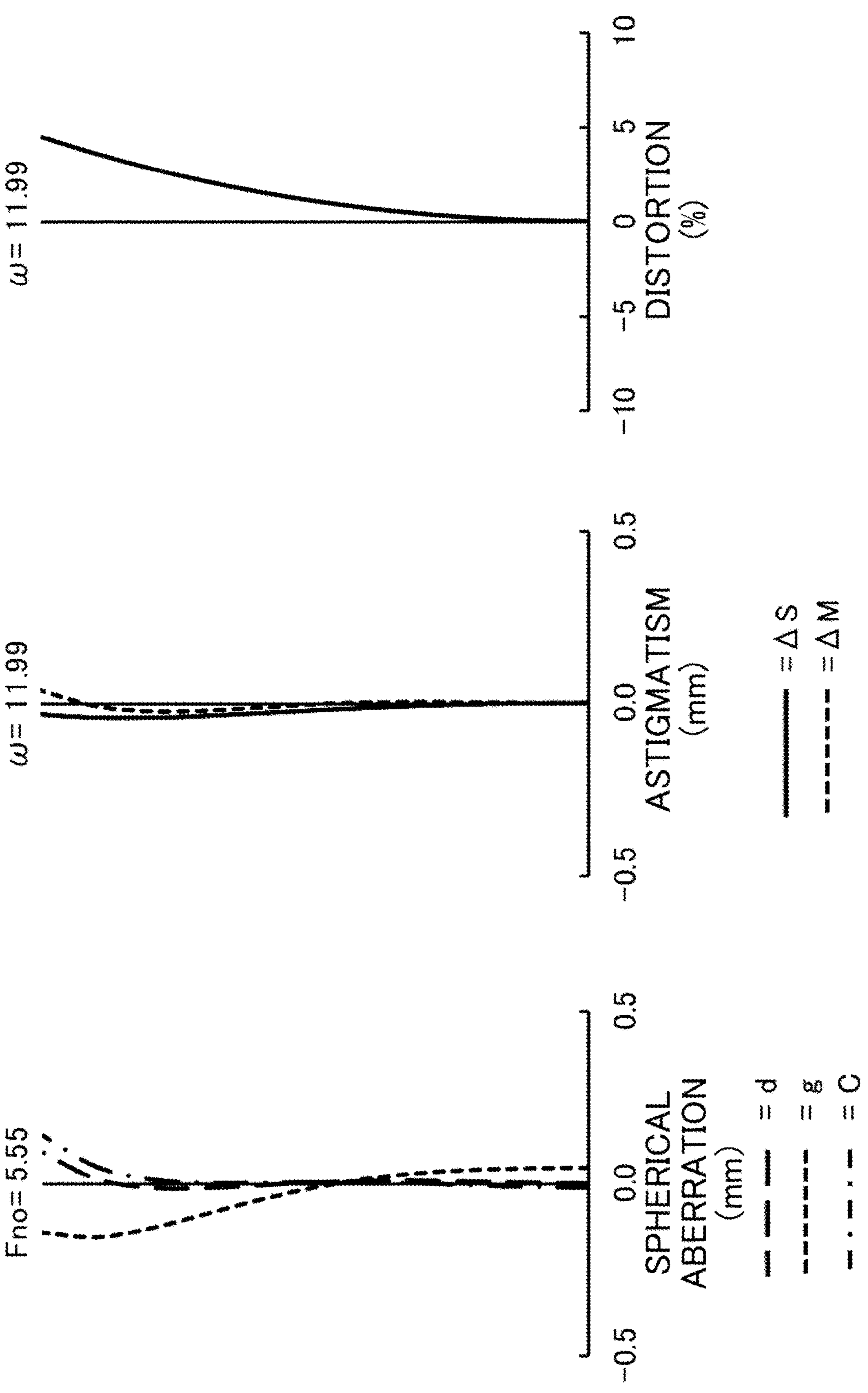
FIG. 33 is a longitudinal aberration diagram at an intermediate focal length of the high power zoom lens of Example 4 at infinity.
Figure 34:
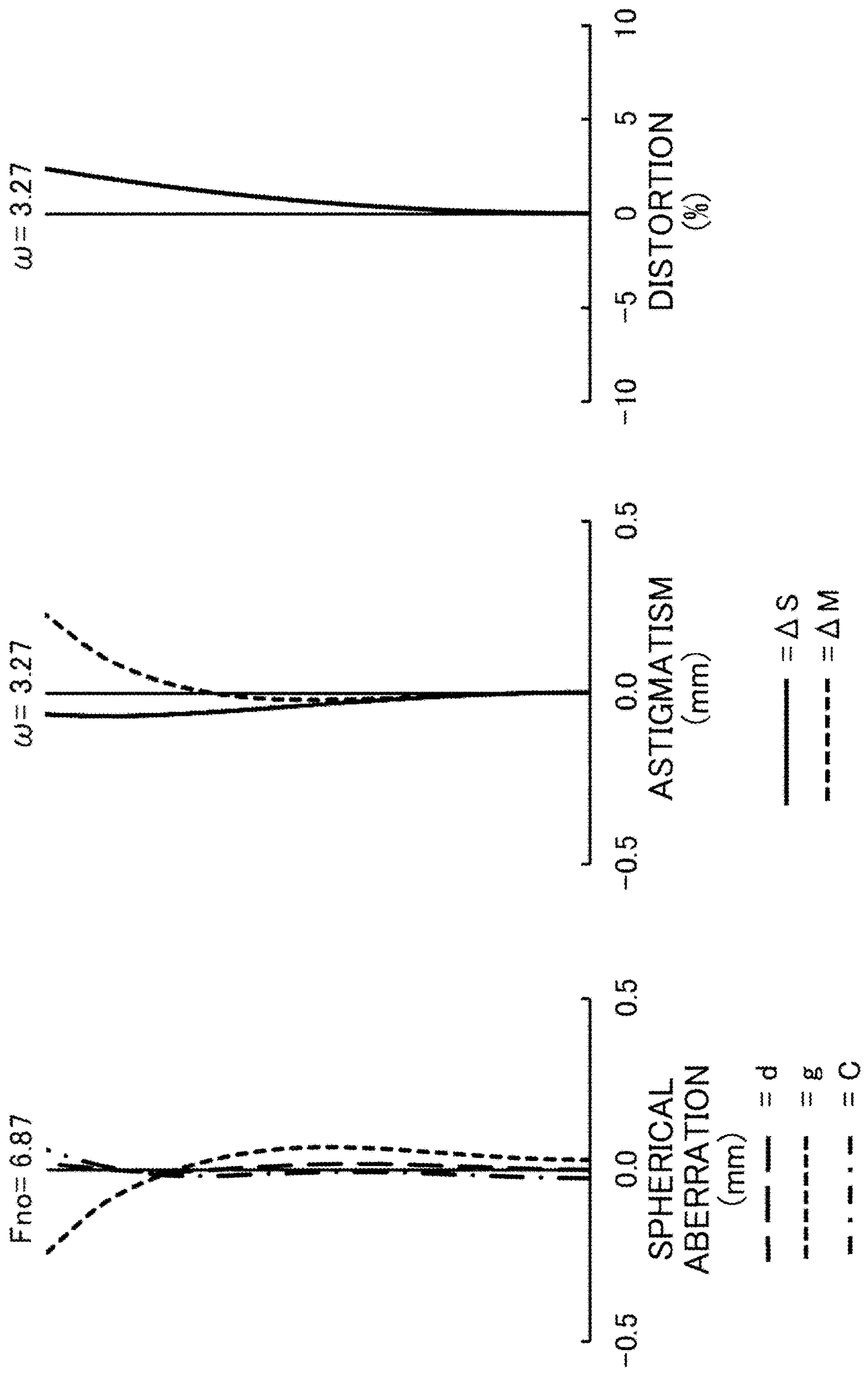
FIG. 34 is a longitudinal aberration diagram at the telephoto end of the high power zoom lens of Example 4 at infinity.
Figure 35:
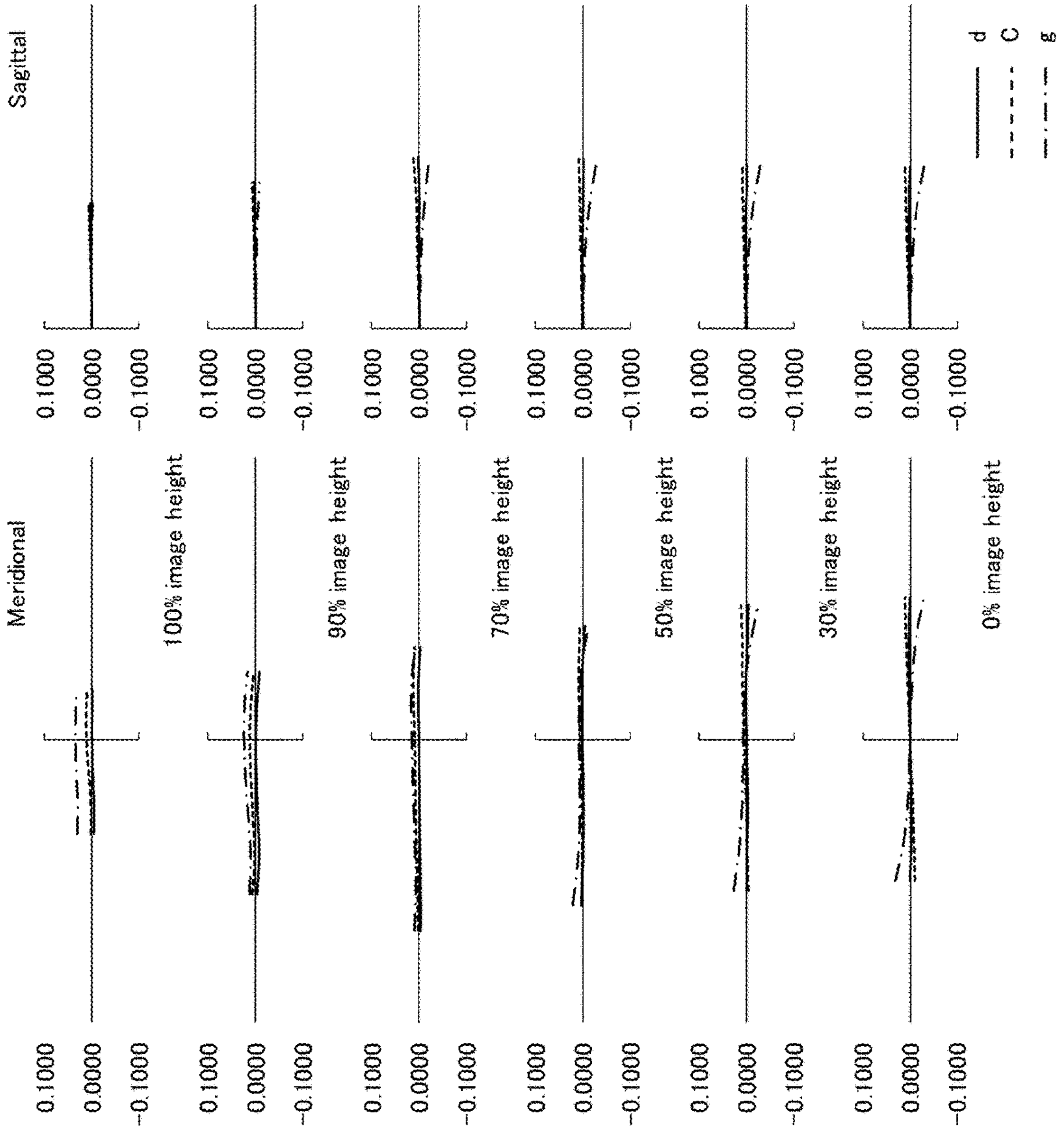
FIG. 35 is a lateral aberration diagram at the wide-angle end of the high power zoom lens of Example 4 at infinity.
Figure 36:
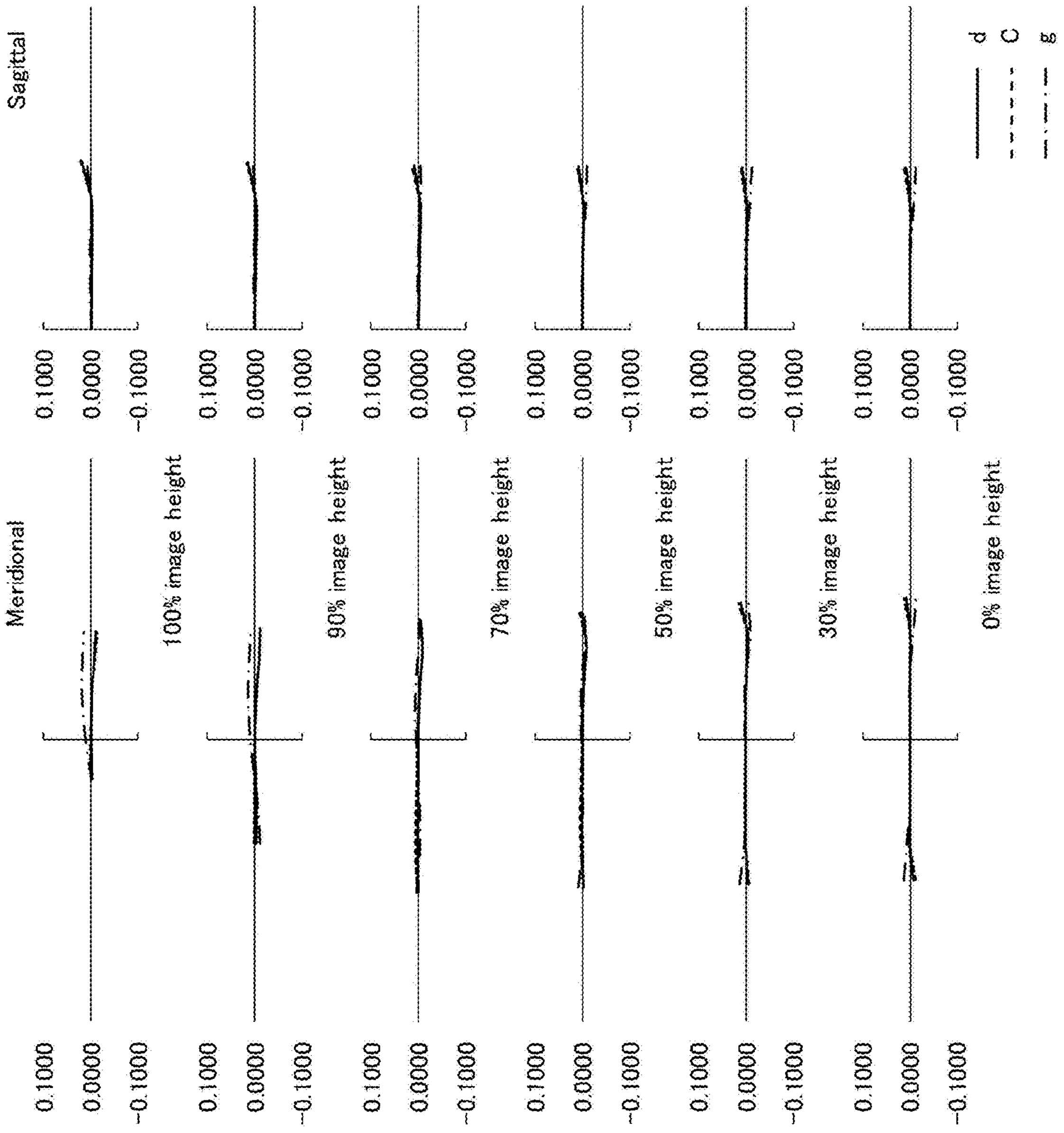
FIG. 36 is a lateral aberration diagram at an intermediate focal length of the high power zoom lens of Example 4 at infinity.
Figure 37:
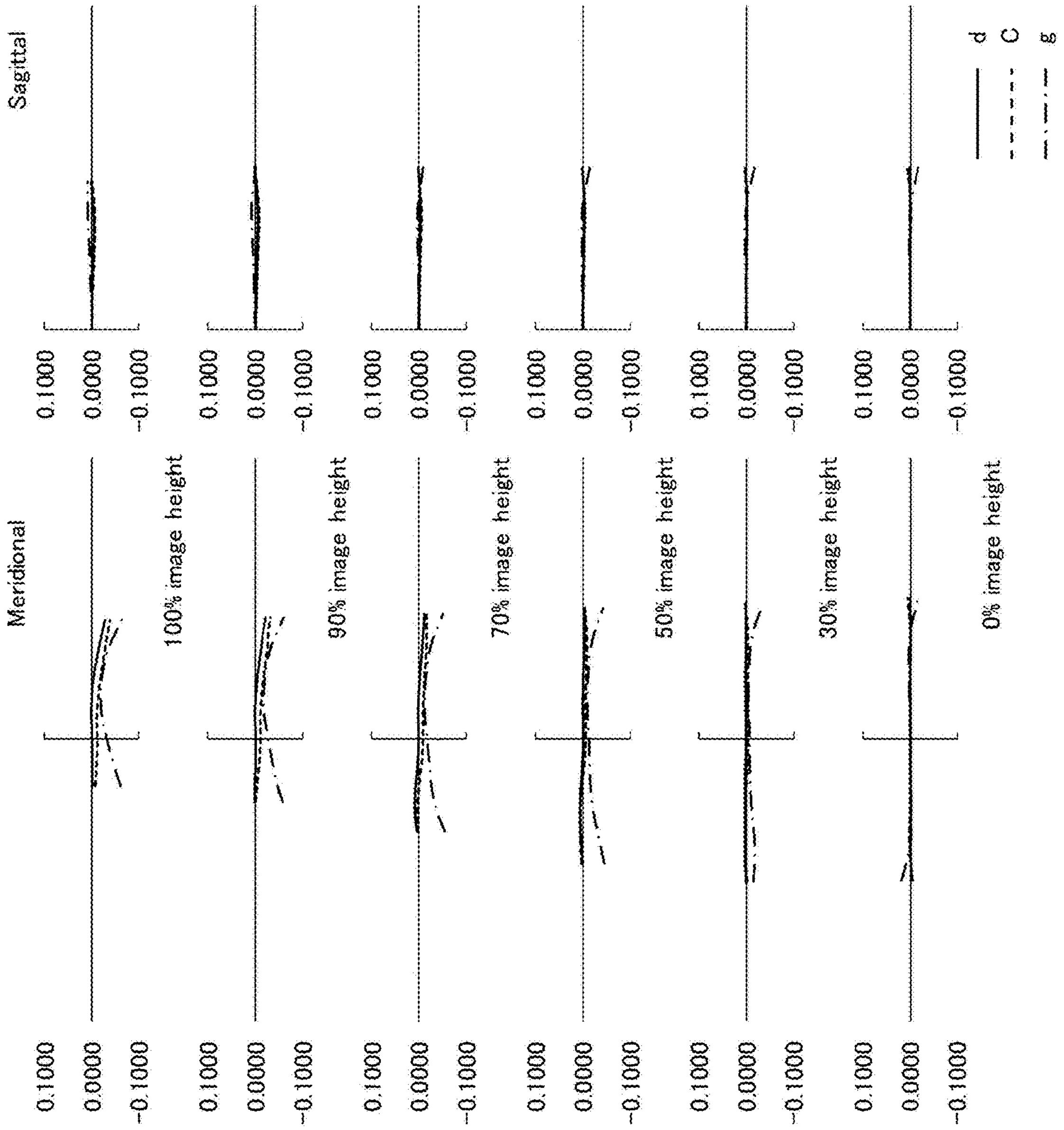
FIG. 37 is a lateral aberration diagram at the telephoto end of the high power zoom lens of Example 4 at infinity.
Figure 38:
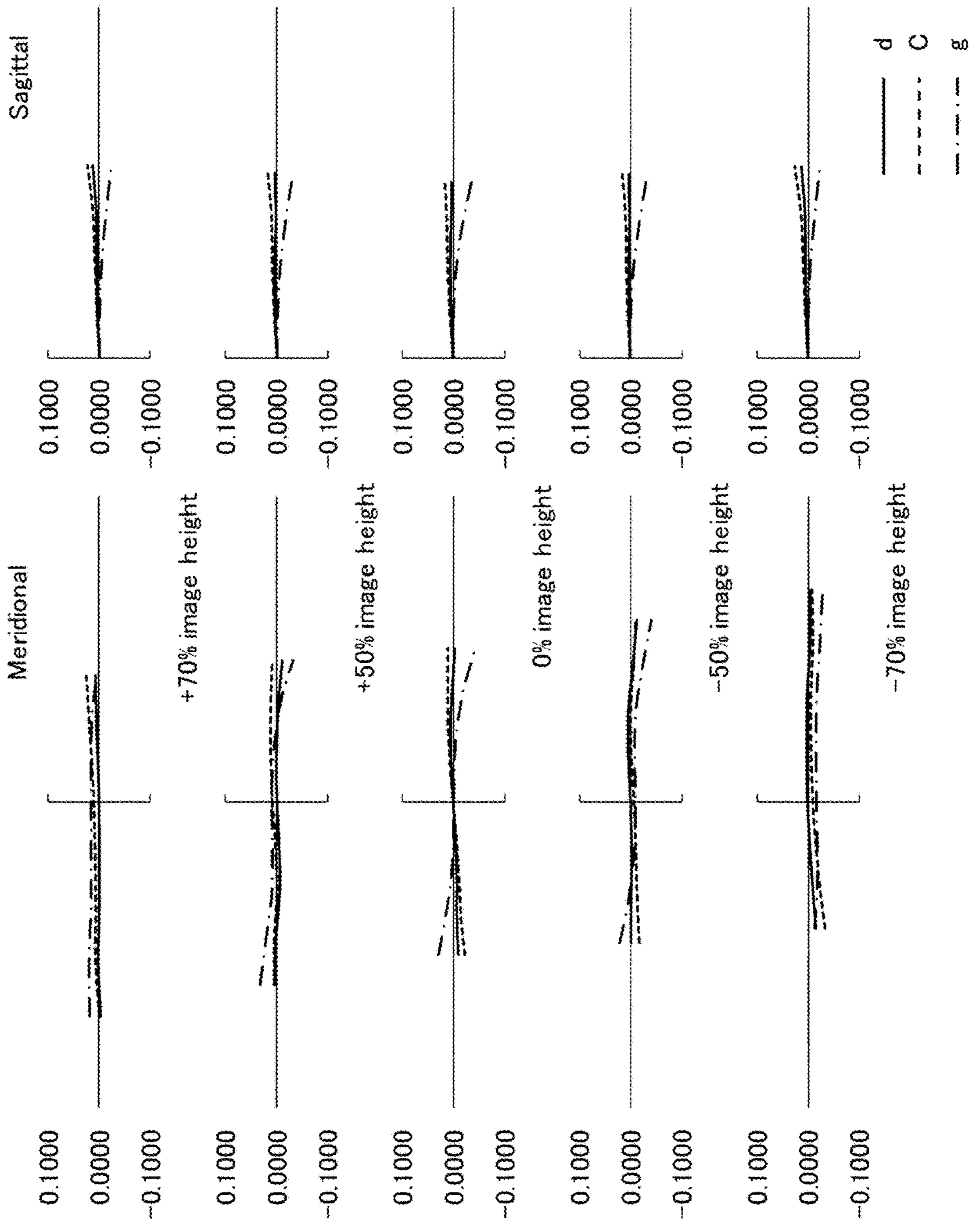
FIG. 38 is a lateral aberration diagram in a case where a deflection angle of 0.3 degrees is corrected at the wide-angle end of the high power zoom lens of Example 4 at infinity during vibration reduction.
Figure 39:
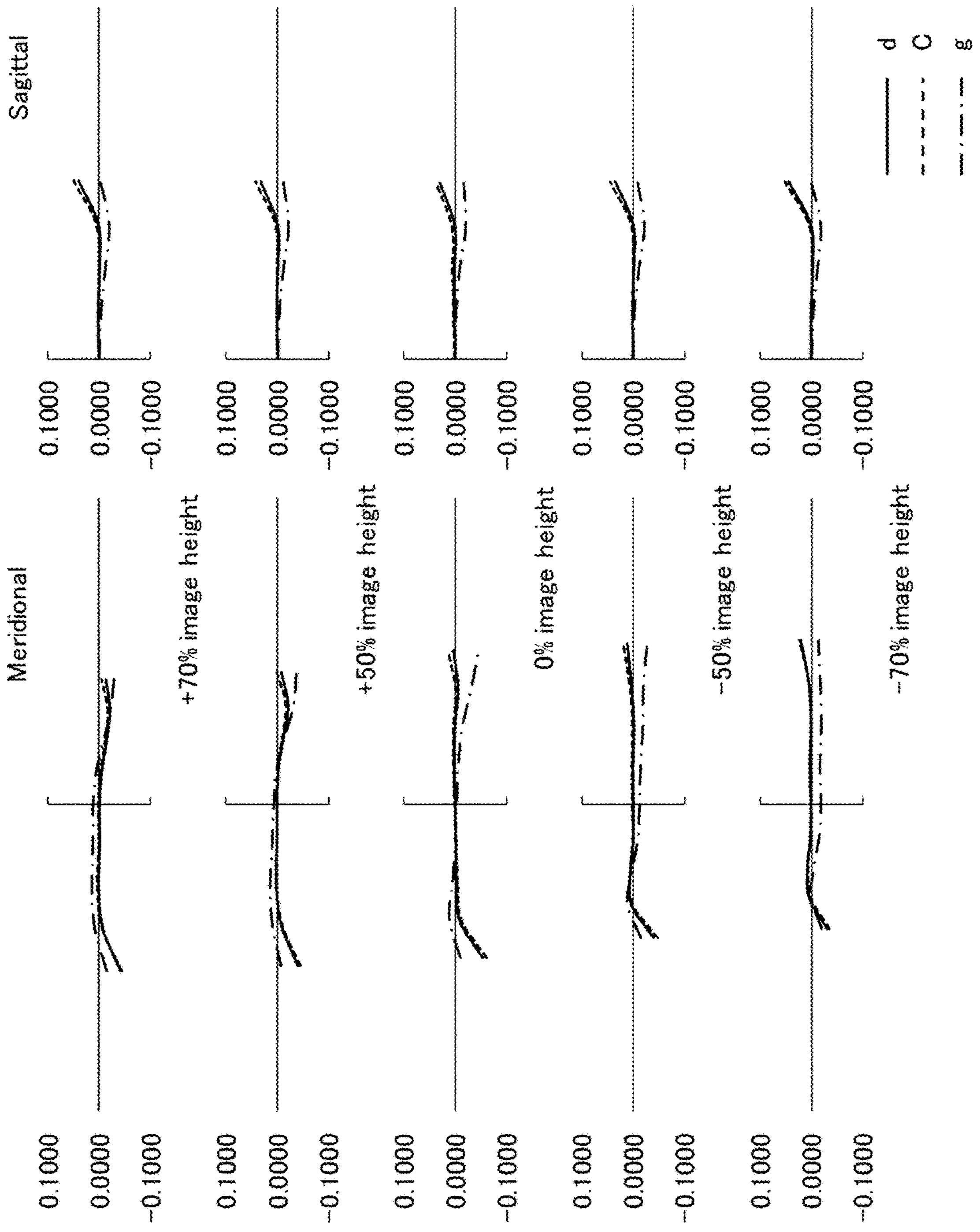
FIG. 39 is a lateral aberration diagram in a case where a deflection angle of 0.3 degrees is corrected at the intermediate focal length of the high power zoom lens of Example 4 at infinity during the vibration reduction.
Figure 40:
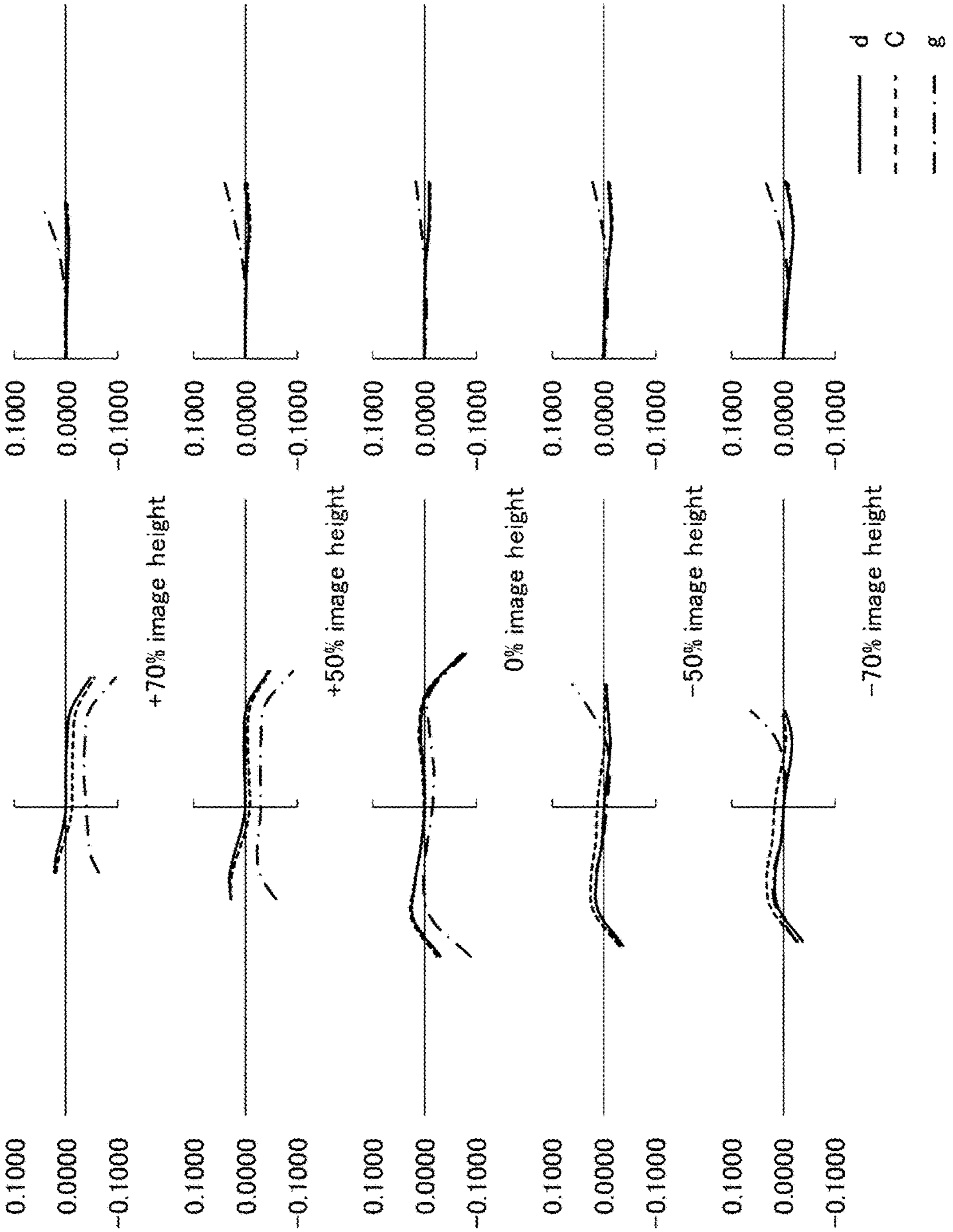
FIG. 40 is a lateral aberration diagram in a case where a deflection angle of 0.3 degrees is corrected at the telephoto end of the high power zoom lens of Example 4 at infinity during vibration reduction.

FIG. 31 is a lens configuration diagram of a high power zoom lens of Example 4 of the invention.

Example 4 includes, in order from the object side, the first lens group G1 having a positive refractive power, the second lens group G2 having a negative refractive power, the aperture diaphragm S, the third lens group G3 having a positive refractive power, the fourth lens group G4 having a positive refractive power, and the fifth lens group G5 having a positive refractive power. Further, the third lens group G3 includes a 3A lens group G3A having a positive refractive power and a 3B lens group G3B having a negative refractive power, in order from the object side. Further, the fourth lens group G4 includes a 4A lens group G4A having a positive refractive power and a 4B lens group G4B having a negative refractive power, in order from the object side. In addition, during the image blur correction during the vibration reduction, the 3B lens group G3B moves in a direction substantially perpendicular to the optical axis. Further, during focusing from the infinity to the short distance, the 4B lens group G4B moves to the image surface side. The fifth lens group G5 corresponds to the L-th lens group GL positioned closest to the image side.

The first lens group G1 includes, in order from the object side, a negative meniscus lens having a surface convex toward the object side, a biconvex lens, and a positive meniscus lens having a surface having a surface convex toward the object side.

The second lens group G2 includes: a negative meniscus lens having a surface convex toward the object side; a biconcave lens; and a cemented lens including a biconvex lens, and a negative meniscus lens having a surface convex toward the image side, in order from the object side.

The third lens group G3 includes, in order from the object side: a 3A lens group G3A including a biconvex lens, and cemented lens including a biconvex lens and a negative meniscus lens having a surface convex toward the image side; and a 3B lens group G3B including a cemented lens including a positive meniscus lens having a surface convex toward the image side, and a biconcave lens.

The fourth lens group G4 includes, in order from the object side: a fourth A lens group G4A including a biconvex lens, a biconvex lens, and a cemented lens including a negative meniscus lens having a surface convex toward the object side, a biconvex lens; and a fourth B lens group G4B including a negative meniscus lens having a surface convex toward the object side.

The fifth lens group G5 includes a cemented lens including a biconvex lens and a negative meniscus lens having a surface convex toward the image side in order from the object side.

In the high power zoom lens of Example 4, during zooming from the wide-angle end to the telephoto end, the distance between the first lens group G1 and the second lens group G2 increases, the distance between the second lens group G2 and the third lens group G3 decreases, the distance between the third lens group G3 and the fourth lens group G4 decreases, and the distance between the fourth lens group G4 and the fifth lens group G5 increases. Further, the fifth lens group G5 remains stationary with respect to the image surface during zooming.

The specification values of the high power zoom lens according to Example 4 are shown below.

Numerical Example 4

Unit: mm
[Surface data]

| Surface number | r | d | nd | vd | PgF |
|---|---|---|---|---|---|
| Object surface | ∞ | (d0) | | | |
| 1 | 116.3748 | 1.5500 | 1.77047 | 29.74 | 0.5951 |
| 2 | 68.3039 | 6.9297 | 1.55032 | 75.50 | 0.5401 |

-continued

| Unit: mm [Surface data] | | | | | |
|---|---|---|---|---|---|
| 3 | −2997.5168 | 0.1500 | | | |
| 4 | 87.1562 | 4.4452 | 1.59282 | 68.62 | |
| 5 | 302.8455 | (d5) | | | |
| 6 | 529.8137 | 0.9000 | 2.00100 | 29.13 | |
| 7 | 17.4115 | 5.9157 | | | |
| 8* | −52.6206 | 1.0000 | 1.59201 | 67.02 | |
| 9* | 43.9475 | 0.3972 | | | |
| 10 | 47.5334 | 6.2138 | 1.84666 | 23.78 | |
| 11 | −24.0353 | 0.7000 | 1.87070 | 40.73 | |
| 12 | −207.0889 | (d12) | | | |
| 13 (diaphragm) | ∞ | 1.0000 | | | |
| 14 | 39.0214 | 2.9898 | 1.56732 | 42.82 | 0.5731 |
| 15 | −56.7981 | 0.1500 | | | |
| 16 | 31.9627 | 3.1470 | 1.43700 | 95.10 | 0.5336 |
| 17 | −49.0264 | 0.9000 | 2.00100 | 29.13 | 0.5995 |
| 18 | −1059.6443 | 2.9815 | | | |
| 19 | −32.2654 | 1.7584 | 1.80518 | 25.46 | |
| 20 | −21.1686 | 0.9000 | 1.59201 | 67.02 | |
| 21* | 72.6089 | (d21) | | | |
| 22* | 25.7264 | 4.0290 | 1.55332 | 71.69 | |
| 23* | −45.7796 | 0.1500 | | | |
| 24 | 63.7008 | 2.4029 | 1.43700 | 95.10 | |
| 25 | −281.8985 | 0.1500 | | | |
| 26 | 80.8058 | 0.9000 | 2.00100 | 29.13 | |
| 27 | 21.0580 | 4.9262 | 1.59410 | 60.47 | |
| 28 | −140.2849 | (d28) | | | |
| 29* | 39.7565 | 0.9000 | 1.59201 | 67.02 | |
| 30* | 17.3521 | (d30) | | | |
| 31 | 147.0748 | 4.7991 | 1.64769 | 33.84 | |
| 32 | −78.3862 | 0.7000 | 2.00069 | 25.46 | |
| 33 | −251.1533 | (BF) | | | |
| Image surface | ∞ | | | | |

[Aspherical surface data]

| | Surface 8 | Surface 9 | Surface 20 | Surface 21 |
|---|---|---|---|---|
| K | 0.00000 | 0.00000 | 0.00000 | 0.00000 |
| A4 | 2.36411E−05 | 4.77811E−06 | 0.00000E+00 | −6.54233E−06 |
| A6 | −4.60758E−07 | −4.51453E−07 | 0.00000E+00 | −7.46116E−09 |
| A8 | 3.04297E−09 | 2.98017E−09 | 0.00000E+00 | 3.43006E−10 |
| A10 | −8.64361E−12 | −8.20791E−12 | 0.00000E+00 | −1.84406E−12 |
| A12 | 0.00000E+00 | 0.00000E+00 | 0.00000E+00 | 0.00000E+00 |

[Aspherical surface data]

| | Surface 22 | Surface 23 | Surface 29 | Surface 30 |
|---|---|---|---|---|
| K | 0.00000 | 0.00000 | 0.00000 | 0.00000 |
| A4 | −1.81016E−05 | 1.29457E−05 | −9.01196E−07 | −9.63943E−06 |
| A6 | −5.68522E−08 | −9.37840E−08 | −8.94787E−10 | −2.05196E−08 |
| A8 | 3.37094E−10 | 4.66364E−10 | 9.63729E−12 | 5.09093E−10 |
| A10 | 0.00000E+00 | 0.00000E+00 | 6.55361E−13 | −1.10749E−11 |
| A12 | 0.00000E+00 | 0.00000E+00 | 0.00000E+00 | 5.50621E−14 |

Zoom ratio 14.71

| | Wide angle | Middle | Telephoto |
|---|---|---|---|
| [Various types of data] | | | |
| Focal length | 16.48 | 64.00 | 242.50 |
| F number | 3.61 | 5.56 | 6.90 |
| Total angle of view 2ω | 86.52 | 23.97 | 6.54 |
| Image height Y 14.20 | 14.20 | 14.20 | 14.20 |
| Total length of lens | 146.00 | 192.15 | 236.33 |
| [Variable distance data] | | | |
| d0 | ∞ | ∞ | ∞ |
| d5 | 1.5716 | 40.7114 | 74.5819 |
| d12 | 33.5376 | 12.5729 | 1.8000 |
| d21 | 13.4937 | 6.6573 | 1.8000 |
| d28 | 1.8556 | 1.8556 | 1.8556 |
| d30 | 12.0037 | 46.8095 | 72.7524 |
| BF | 22.5947 | 22.5548 | 22.5548 |

-continued

| Unit: mm<br>[Surface data] | | |
|---|---|---|
| [Lens group data] | | |
| Group | Starting surface | Focal length |
| G1 | 1 | 119.17 |
| G2 | 6 | −17.06 |
| G3 | 13 | 100.30 |
| G4 | 22 | 37.86 |
| G5 | 31 | 256.97 |
| G3A | 13 | 35.56 |
| G3B | 19 | −43.37 |
| G4A | 22 | 26.13 |
| G4B | 28 | −52.80 |

Example 5

Figure 41:
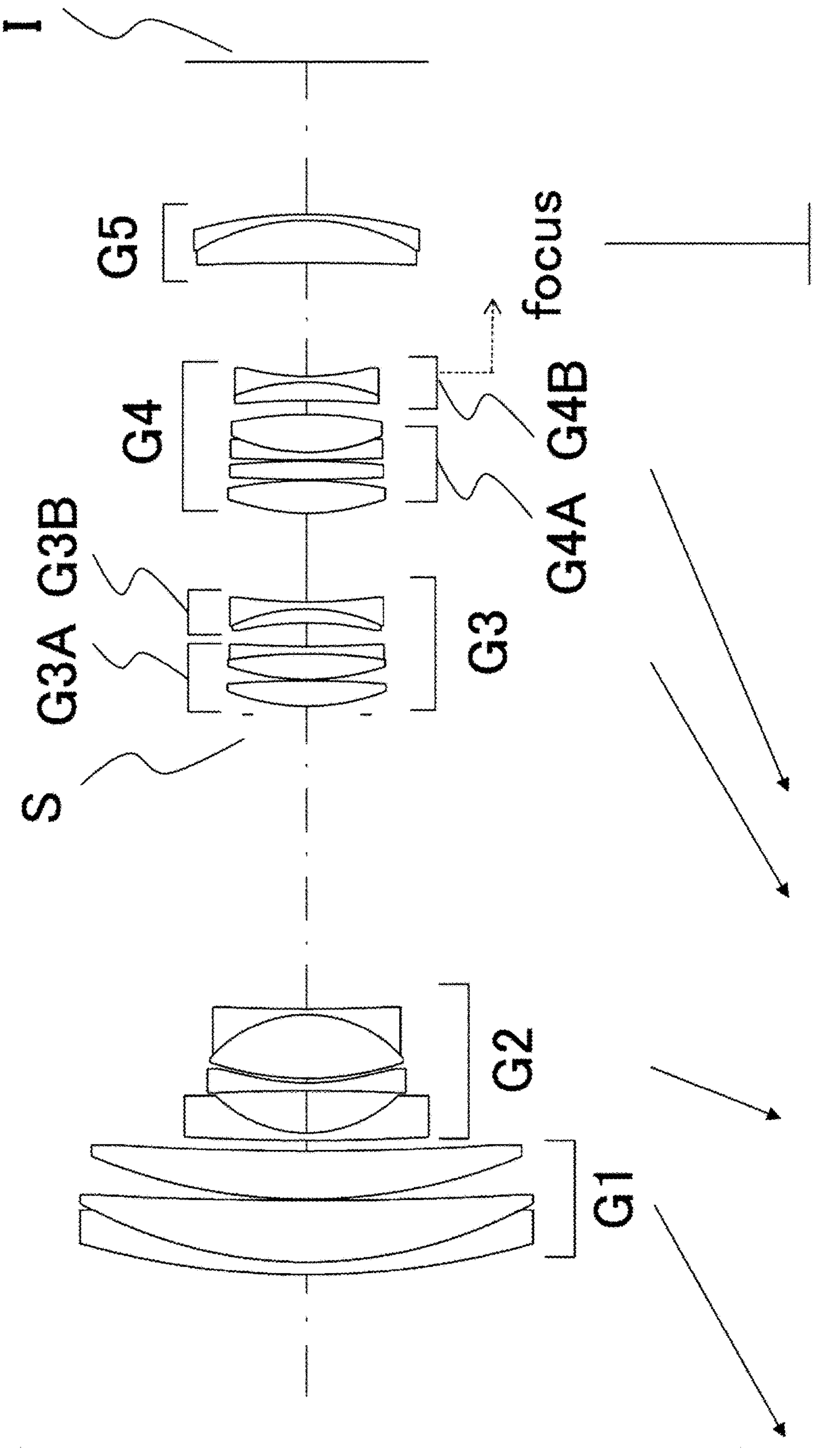
FIG. 41 is a lens configuration diagram at the wide-angle end at infinity according to Example 5 of the high power zoom lens of the present invention.
Figure 42:
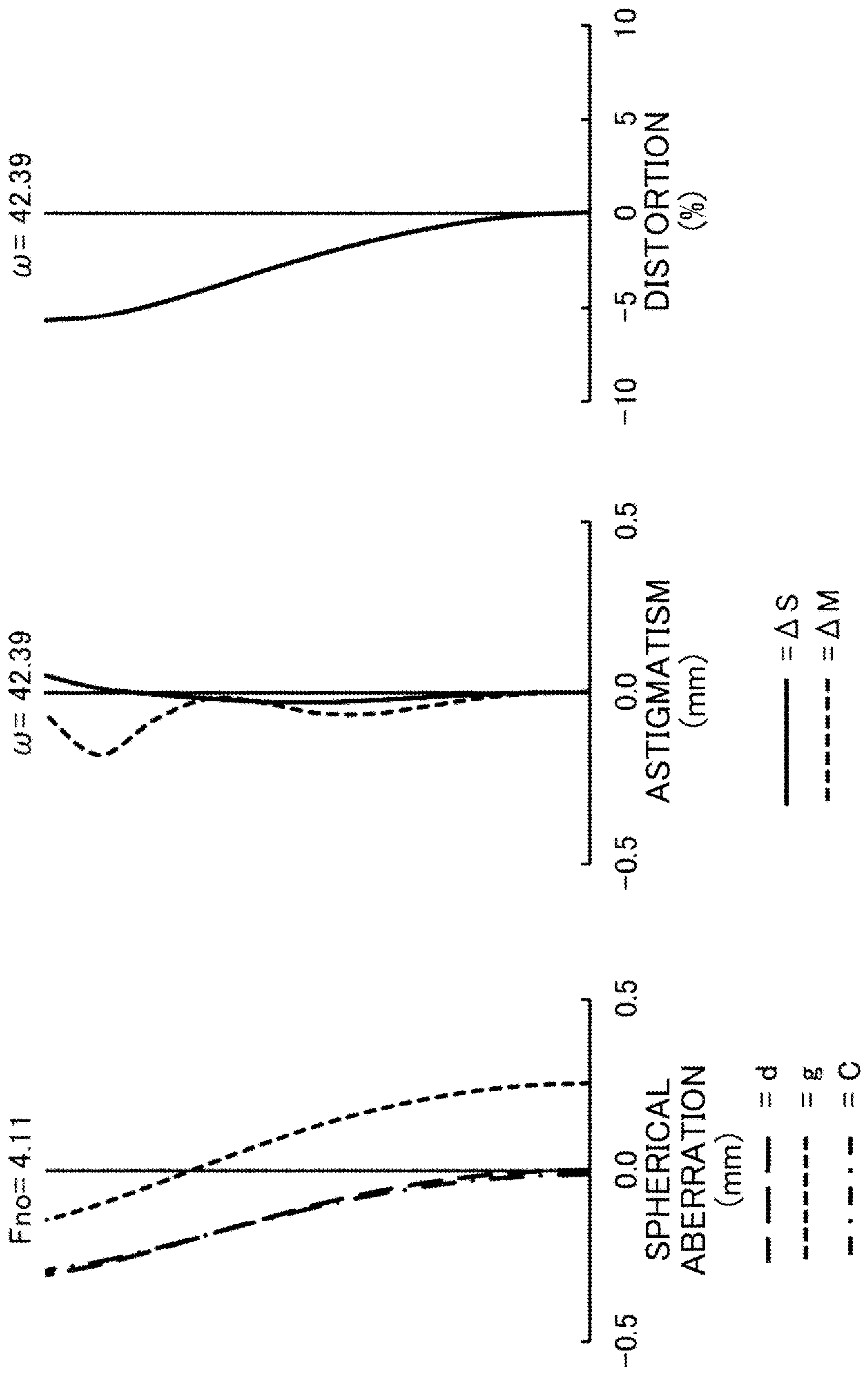
FIG. 42 is a longitudinal aberration diagram at the wide-angle end of the high power zoom lens of Example 5 at infinity.
Figure 43:
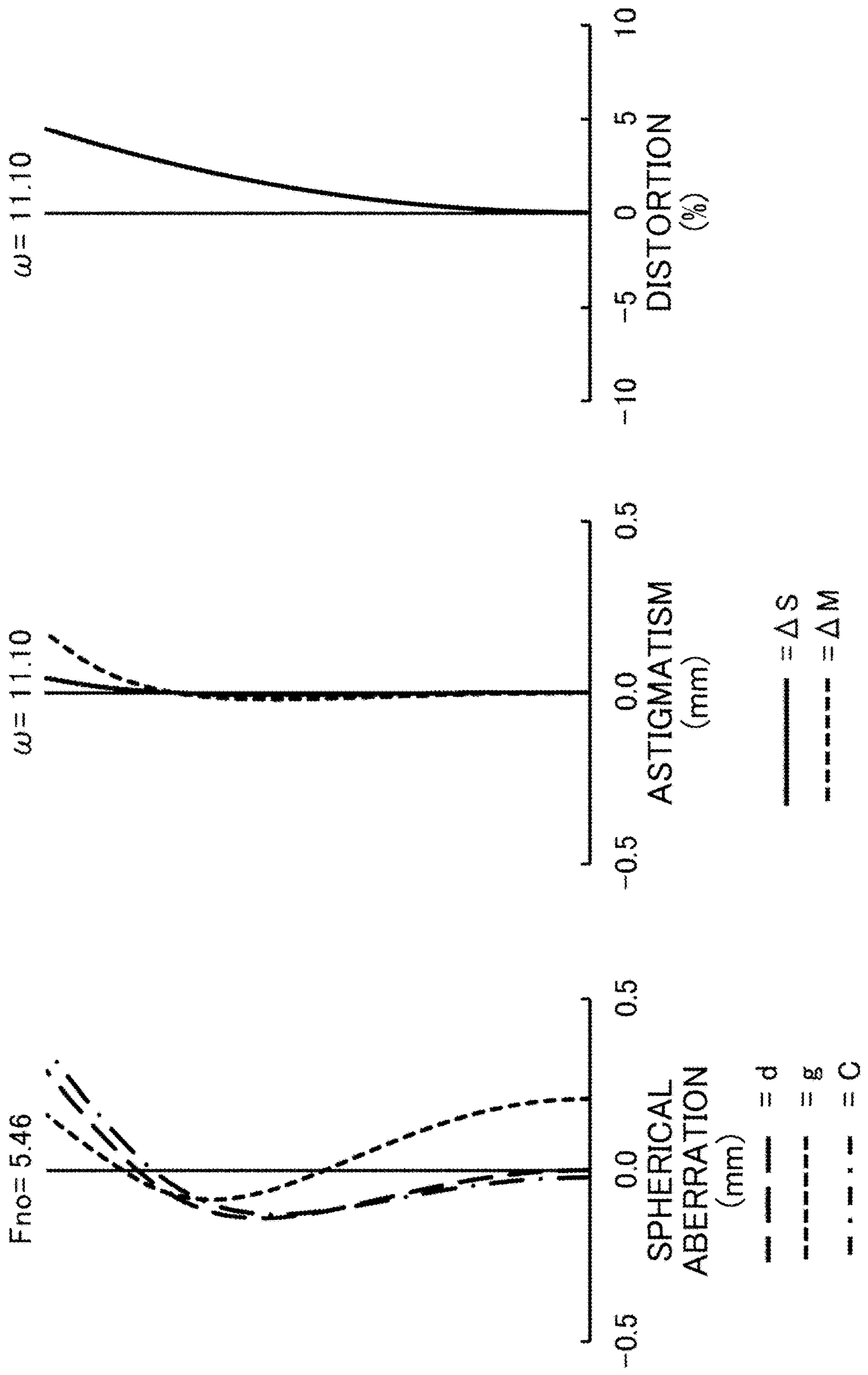
FIG. 43 is a longitudinal aberration diagram of the high power zoom lens of Example 5 at an intermediate focal length at infinity.
Figure 44:
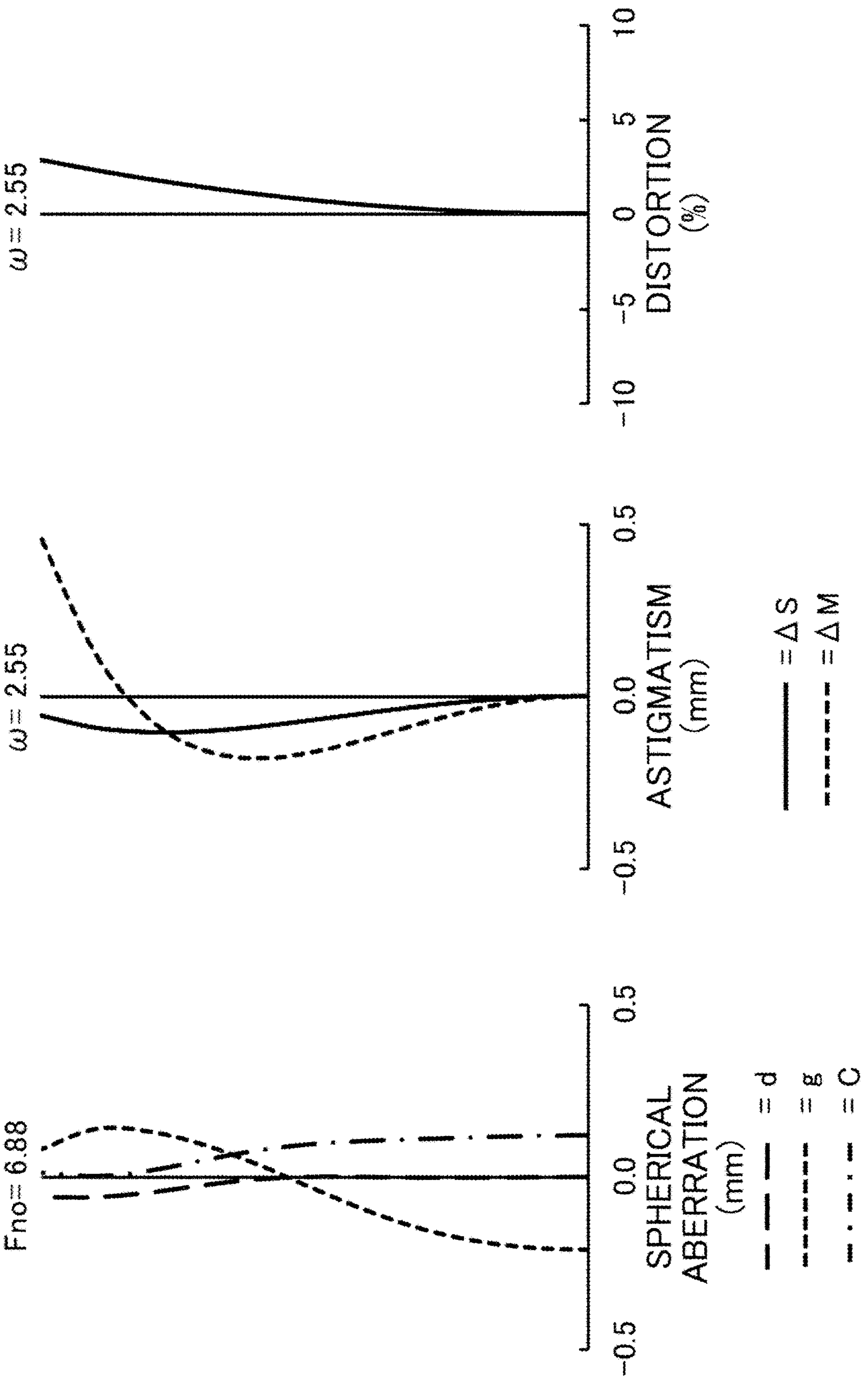
FIG. 44 is a longitudinal aberration diagram at the telephoto end of the high power zoom lens of Example 5 at infinity.
Figure 45:
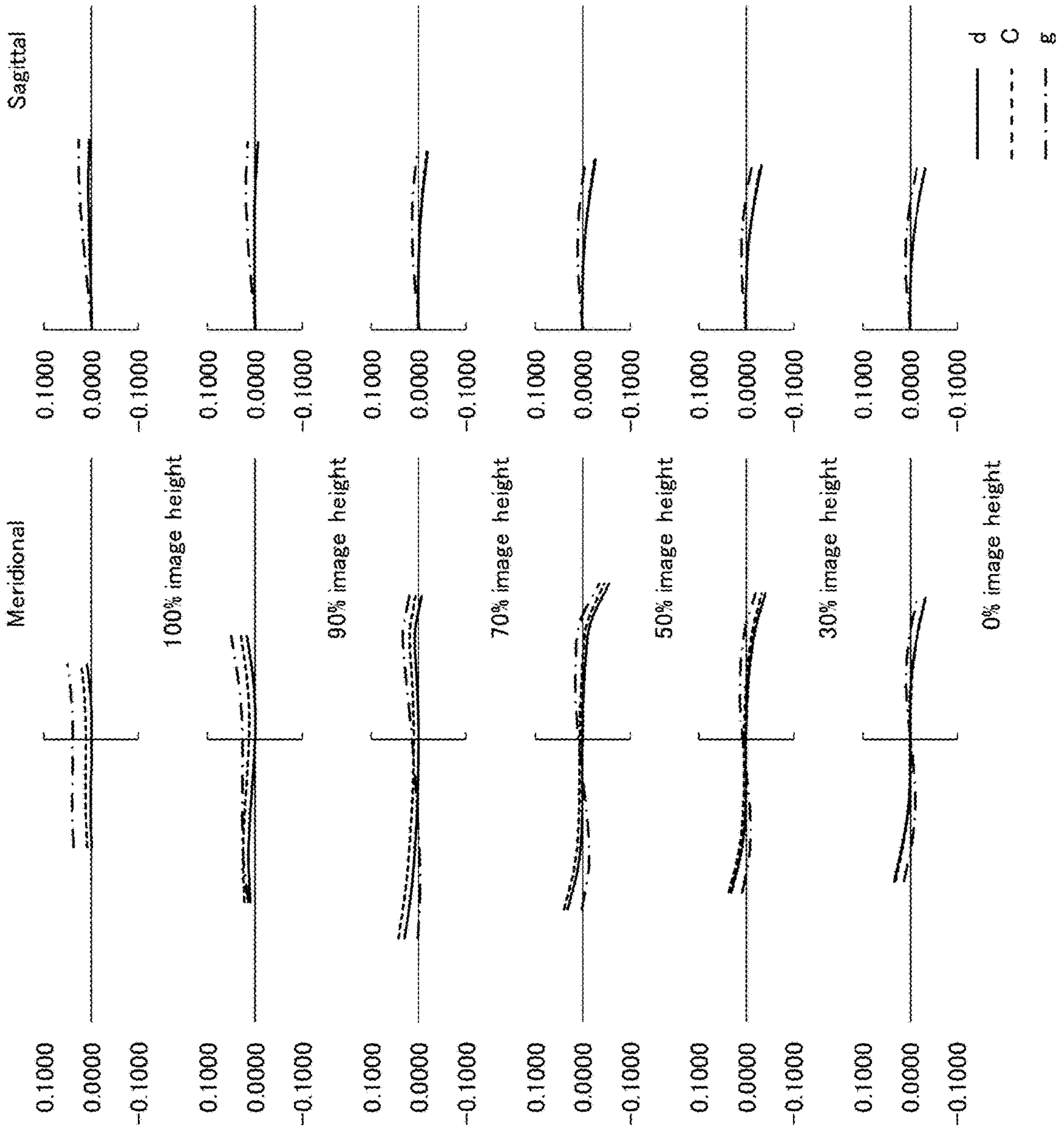
FIG. 45 is a lateral aberration diagram at the wide angle end of the high power zoom lens of Example 5 at infinity.
Figure 46:
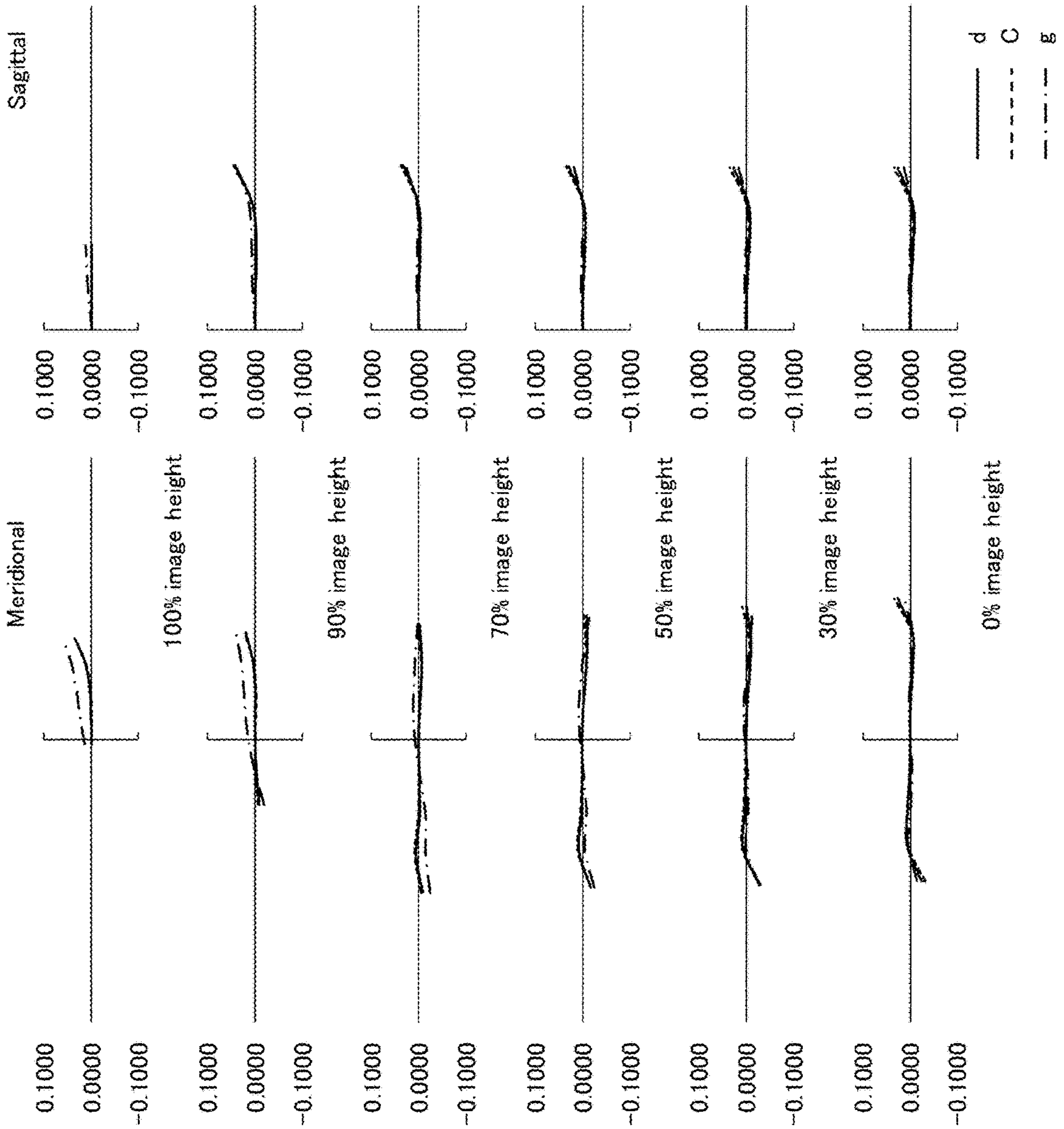
FIG. 46 is a lateral aberration diagram at an intermediate focal length of the high power zoom lens of Example 5 at infinity.
Figure 47:
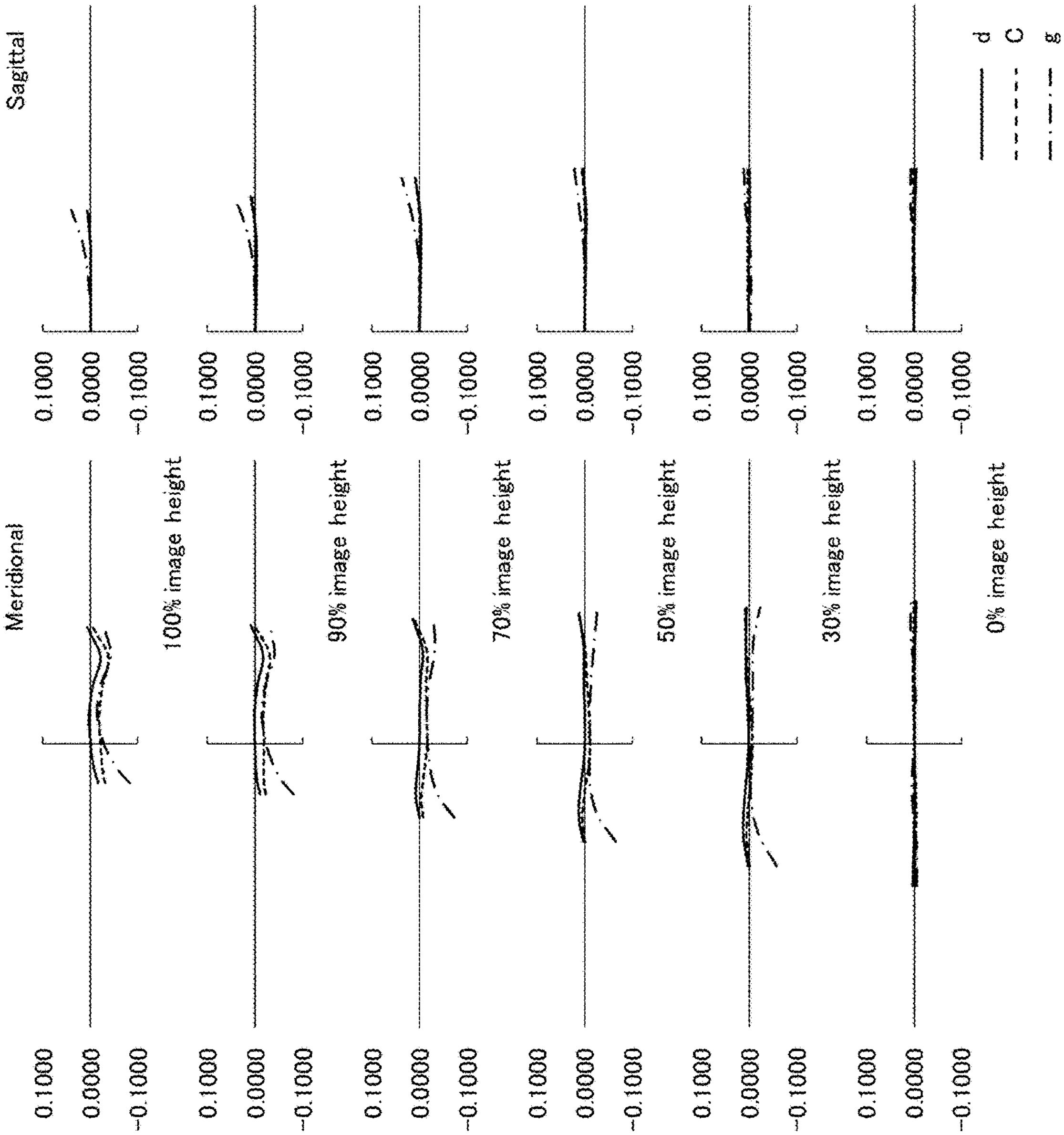
FIG. 47 is a lateral aberration diagram at the telephoto end of the high power zoom lens of Example 5 at infinity.
Figure 48:
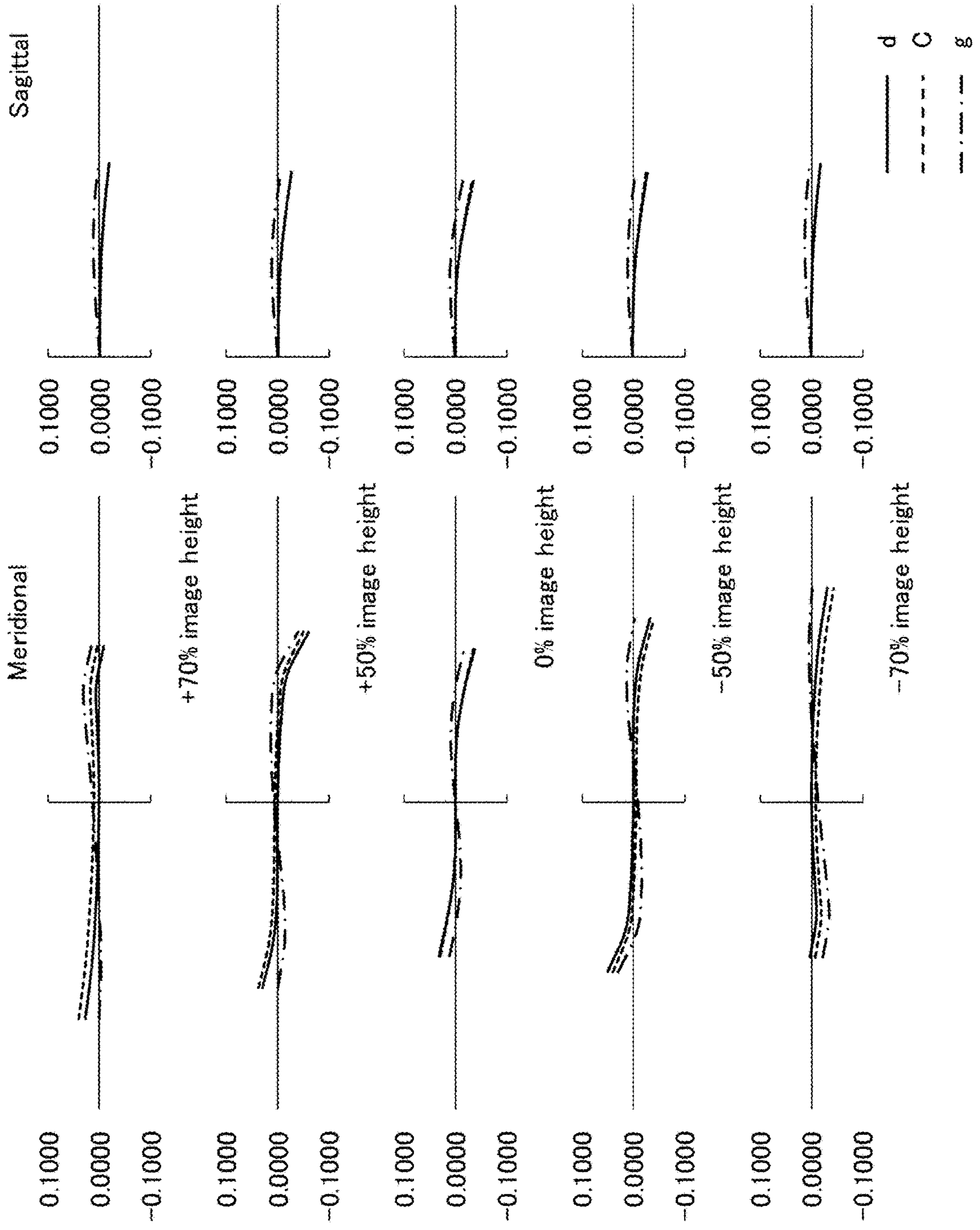
FIG. 48 is a lateral aberration diagram in a case where a deflection angle of 0.3 degrees is corrected at the wide angle end of the high power zoom lens of Example 5 at infinity during vibration reduction.
Figure 49:
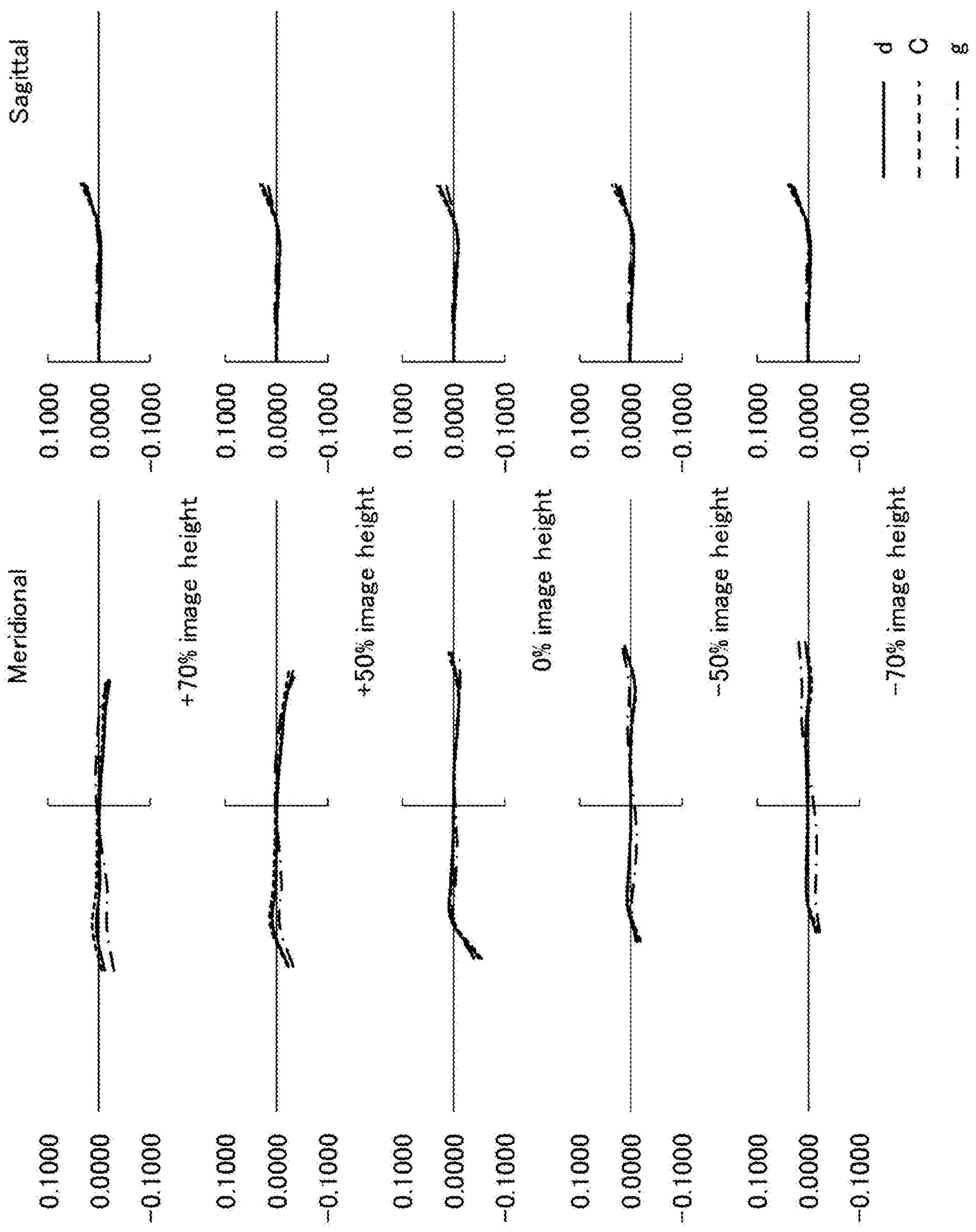
FIG. 49 is a lateral aberration diagram in a case where a deflection angle of 0.3 degrees is corrected at the intermediate focal length of the high power zoom lens of Example 5 at infinity during vibration reduction.
Figure 50:
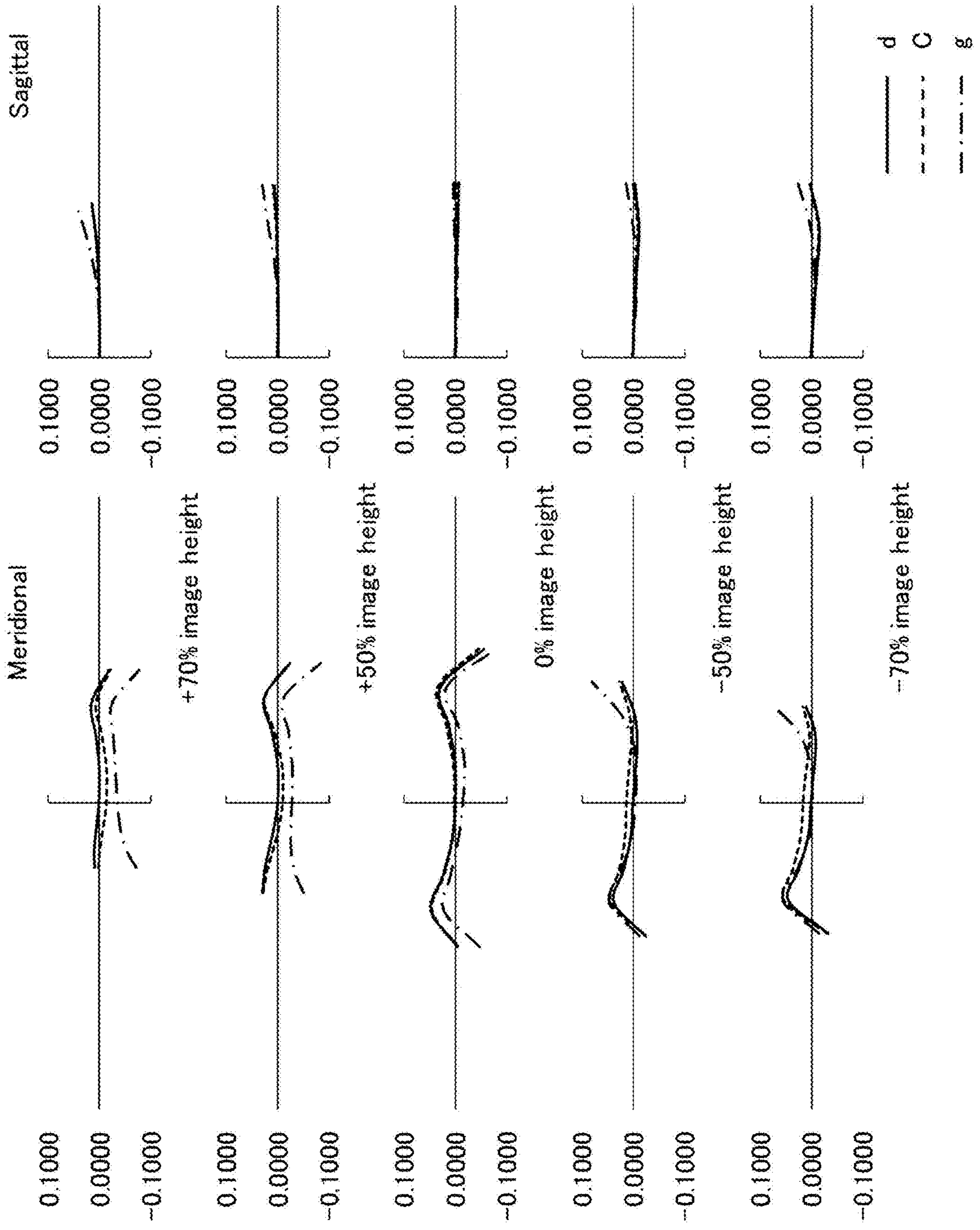
FIG. 50 is a lateral aberration diagram in a case where a deflection angle of 0.3 degrees is corrected at the telephoto end of the high power zoom lens of Example 5 at infinity during vibration reduction.

FIG. 41 is a lens configuration diagram of a high power zoom lens of Example 5 of the invention.

Example 5 includes, in order from the object side, the first lens group G1 having a positive refractive power, the second lens group G2 having a negative refractive power, the aperture diaphragm S, the third lens group G3 having a positive refractive power, the fourth lens group G4 having a positive refractive power, and the fifth lens group G5 having a positive refractive power. Further, the third lens group G3 includes a 3A lens group G3A having a positive refractive power and a 3B lens group G3B having a negative refractive power, in order from the object side. Further, the fourth lens group G4 includes a 4A lens group G4A having a positive refractive power and a 4B lens group G4B having a negative refractive power, in order from the object side. In addition, during the image blur correction during the vibration reduction, the 3B lens group G3B moves in a direction substantially perpendicular to the optical axis. Further, during focusing from the infinity to the short distance, the 4B lens group G4B moves to the image surface side. The fifth lens group G5 corresponds to the L-th lens group GL positioned closest to the image side.

The first lens group G1 includes, in order from the object side, a negative meniscus lens having a surface convex toward the object side, a positive meniscus lens having a surface convex toward the object side, and a positive meniscus lens having a surface convex toward the object side.

The second lens group G2 includes, in order from the object side, a negative meniscus lens having a surface having a surface convex toward the object side, a biconcave lens, and a cemented lens including a biconvex lens and a biconcave lens.

The third lens group G3 includes, in order from the object side: a 3A lens group G3A including a biconvex lens and a cemented lens including a biconvex lens and a biconcave lens; and a 3B lens group G3B including a cemented lens including a positive meniscus lens having a surface convex toward the image side and a biconcave lens.

The fourth lens group G4 includes, in order from the object side: a 4A lens group G4A including a biconvex lens, a biconvex lens, and a cemented lens including a negative meniscus lens having a surface convex toward the object side, and a biconvex lens; and a 4B lens group G4B including a cemented lens including a positive meniscus lens having a surface convex toward the image side and a biconcave lens.

The fifth lens group G5 includes a cemented lens including a positive meniscus lens having a surface convex toward the image side and a negative meniscus lens having a surface convex toward the image side in order from the object side.

In the high power zoom lens of Example 5, during zooming from the wide-angle end to the telephoto end, the distance between the first lens group G1 and the second lens group G2 increases, the distance between the second lens group G2 and the third lens group G3 decreases, the distance between the third lens group G3 and the fourth lens group G4 decreases, and the distance between the fourth lens group G4 and the fifth lens group G5 increases. Further, the fifth lens group G5 remains stationary with respect to the image surface during zooming.

The specification values of the high power zoom lens according to Example 5 are shown below.

Numerical Example 5

| Unit: mm<br>[Surface data] | | | | | |
|---|---|---|---|---|---|
| Surface number | r | d | nd | vd | PgF |
| Object surface | ∞ | (d0) | | | |
| 1 | 106.8386 | 1.5500 | 1.80610 | 33.27 | 0.5884 |
| 2 | 59.4803 | 7.4150 | 1.55032 | 75.50 | 0.5401 |
| 3 | 522.9275 | 0.1500 | | | |
| 4 | 72.0349 | 5.7699 | 1.59282 | 68.62 | 0.5440 |
| 5 | 373.5800 | (d5) | | | |
| 6 | 269.1183 | 0.9000 | 2.05090 | 26.94 | |
| 7 | 16.6261 | 5.0616 | | | |
| 8* | −135.4091 | 1.0000 | 1.59201 | 67.02 | |
| 9* | 32.4548 | 0.5198 | | | |
| 10 | 38.8520 | 7.6536 | 1.84666 | 23.78 | |
| 11 | −16.2500 | 0.7000 | 1.87070 | 40.73 | |

-continued

Unit: mm
[Surface data]

| | | | | | |
|---|---|---|---|---|---|
| 12 | 239.2102 | (d12) | | | |
| 13 (diaphragm) | ∞ | 1.0000 | | | |
| 14 | 27.5698 | 3.0480 | 1.61772 | 49.81 | 0.5603 |
| 15 | −125.3575 | 0.1500 | | | |
| 16 | 31.3132 | 3.1224 | 1.49700 | 81.61 | 0.5389 |
| 17 | −67.3797 | 0.9000 | 1.92119 | 23.96 | 0.6202 |
| 18 | 158.1299 | 2.7973 | | | |
| 19 | −39.1978 | 1.6622 | 1.69895 | 30.05 | |
| 20* | −22.3292 | 0.9000 | 1.59201 | 67.02 | |
| 21* | 63.5739 | (d21) | | | |
| 22* | 25.9286 | 3.9242 | 1.55332 | 71.69 | |
| 23* | −45.2119 | 0.1500 | | | |
| 24 | 170.7771 | 2.2122 | 1.49700 | 81.61 | |
| 25 | −98.7406 | 0.1500 | | | |
| 26 | 253.4673 | 0.9000 | 2.00100 | 29.13 | |
| 27 | 23.2142 | 4.5718 | 1.59282 | 68.62 | |
| 28 | −45.6031 | (d28) | | | |
| 29 | −95.6450 | 2.1788 | 1.72825 | 28.32 | |
| 30 | −25.5817 | 0.7000 | 1.59349 | 67.00 | |
| 31 | 31.3175 | (d31) | | | |
| 32 | −390.7541 | 5.1449 | 1.54814 | 45.82 | |
| 33 | −26.9478 | 0.7000 | 2.00100 | 29.13 | |
| 34 | −53.8103 | (BF) | | | |
| Image surface | ∞ | | | | |

[Aspherical surface data]

| | Surface 8 | Surface 9 | Surface 20 | Surface21 | Surface 22 | Surface 23 |
|---|---|---|---|---|---|---|
| K | 0.00000 | 0.00000 | 0.00000 | 0.00000 | 0.00000 | 0.00000 |
| A4 | 7.14491E−05 | 4.55732E−05 | 0.00000E+00 | −6.65377E−06 | −2.01094E−05 | 2.11553E−05 |
| A6 | 9.70874E−07 | −1.03416E−06 | 0.00000E+00 | −3.73114E−08 | −4.52995E−08 | −4.39308E−08 |
| A8 | 5.48008E−09 | 5.80657E−09 | 0.00000E+00 | 4.11200E−10 | −5.20971E−10 | −6.17686E−10 |
| A10 | −1.21178E−11 | −1.32370E−11 | 0.00000E+00 | −4.62914E−13 | 0.00000E+00 | 0.00000E+00 |

Zoom ratio 18.81

| | Wide angle | Middle | Telephoto |
|---|---|---|---|
| [Various types of data] | | | |
| Focal length | 16.50 | 69.25 | 310.35 |
| F number | 4.11 | 5.46 | 6.88 |
| Total angle of view 2ω | 84.80 | 22.20 | 5.09 |
| Image height Y | 14.20 | 14.20 | 14.20 |
| Total length of lens | 146.00 | 196.20 | 235.00 |
| [Variable distance data] | | | |
| d0 | ∞ | ∞ | ∞ |
| d5 | 1.3000 | 42.4639 | 75.5228 |
| d12 | 35.4332 | 14.2582 | 1.9297 |
| d21 | 10.6484 | 6.5999 | 1.8000 |
| d28 | 1.6708 | 1.6708 | 1.6708 |
| d31 | 13.6658 | 47.9249 | 70.7963 |
| BF | 18.3800 | 18.3493 | 18.3487 |

[Lens group data]

| Group | Starting surface | Focal length |
|---|---|---|
| G1 | 1 | 113.68 |
| G2 | 6 | −14.81 |
| G3 | 13 | 66.24 |
| G4 | 22 | 41.30 |
| G5 | 32 | 1916.27 |
| G3A | 13 | 31.38 |
| G3B | 19 | −44.44 |
| G4A | 22 | 25.91 |
| G4B | 28 | −46.63 |

The following shows a list of corresponding values of the conditional expressions in each of the above examples.

| [Conditional Expression Corresponding Value] | | | | | |
|---|---|---|---|---|---|
| Conditional Expressions | EX1 | EX2 | EX3 | EX4 | EX5 |
| (1) | 0.43 | 0.43 | 0.42 | 0.49 | 0.37 |
| (2) | 0.58 | 0.57 | 0.59 | 0.61 | 0.57 |
| (3) | 1.06 | 1.06 | 1.00 | 1.39 | 1.13 |
| (4) | 0.12 | 0.11 | 0.12 | 0.15 | 0.13 |
| (5) | 1.21 | 1.46 | 1.77 | 2.65 | 1.60 |
| (6) | 0.037 | 0.056 | 0.056 | 0.027 | 0.027 |
| (7) | 0.056 | 0.037 | 0.037 | 0.056 | 0.037 |

OTHER EMBODIMENTS

The technology disclosed in the present example is not limited to the description of the above-described embodiment and examples, and various modification implementations can be made. The shape and numerical value of each part shown in each of the above-described numerical examples are merely an example for carrying out the present technology, and the technical scope of the present technology is not limited thereto.

The present technology can have the following configuration.

[1]

A high power zoom lens including, in order from an object side: a first lens group G1 that has a positive refractive power; a second lens group G2 that has a negative refractive power; a third lens group G3 that has a positive refractive power; a fourth lens group G4 that has a positive refractive power; an Loth lens group GL that has a positive refractive power and is positioned at a position which is closest to an image side; in which, in a case of zooming from a wide angle end to a telephoto end, a distance between the lens groups changes, the third lens group G3 includes a 3A lens group G3A having a positive refractive power and a 3B lens group G3B having a negative refractive power, image blur correction is performed by moving the 3B lens group G3B in a direction substantially perpendicular to an optical axis, the fourth lens group G4 includes a 4A lens group G4A having a positive refractive power and a 4B lens group G4B having a negative refractive power, a focusing operation from an infinity state to a short distance is performed by moving the 4B lens group G4B from an object side to an image side in an optical axis direction, and the following conditional expressions are satisfied.

$$0.25 < f1/fT < 0.66 \qquad (1)$$

$$0.35 < |ff/fr| < 0.80 \qquad (2)$$

f1: focal length of first lens group G1 fr: focal length of entire system in infinity state at telephoto end ff: combined focal length of the first lens group G1 and the second lens group G2 in the infinity state at the wide angle end fr: combined focal length from the third lens group G3 to the L-th lens group GL in the infinity state at the wide-angle end

[2]

The high power zoom lens according to [1], in which a distance between the 4A lens group G4A and the 4B lens group G4B in the infinity state is constant during zooming.

[3]

The high power zoom lens according to [1] or [2], in which a distance between the 3A lens group G3A and the 3B lens group G3B is constant during zooming.

[4]

The high power zoom lens according to any one of [1] to [3], in which each of the three B lens groups G3B is a cemented lens including one positive lens and one negative lens.

[5]

The high power zoom lens according to any one of [1] to [4], in which the 4B lens group G4B is one negative lens or a cemented lens including one positive lens and one negative lens.

[6]

The high power zoom lens according to any one of [1] to [5], in which the L-th lens group GL positioned closest to the image side is fixed with respect to an image surface.

[7]

The high power zoom lens according to any one of [1] to [6], in which the first lens group G1 includes one negative lens and two positive lenses in order from the object side.

[8]

The high power zoom lens according to any one of [1] to [7], in which the 4A lens group G4A further includes at least two positive lenses and one negative lens.

[9]

The high power zoom lens according to any one of [1] to [8], in which the high power zoom lens further satisfies the following conditional expression.

$$0.60 < |f4B/f4| < 1.80 \qquad (3)$$

f4B: focal length of 4B lens group G4B f4: focal length of fourth lens group G4

[10]

The high power zoom lens according to any one of [1] to [9], in which the high power zoom lens further satisfies the following conditional expression.

$$0.08 < FB/LT < 0.20 \qquad (4)$$

FB: back focus in air equivalent at wide-angle end

LT: total lens length at wide-angle end

[11]

The high power zoom lens according to any one of [1] to [10], in which the high power zoom lens further satisfies the following conditional expression.

$$0.50 < f3/f4 < 5.00 \qquad (5)$$

f3: focal length of the third lens group G3 f4: focal length of the fourth lens group G4

[12]

The high power zoom lens according to any one of [1] to [11], in which the high power zoom lens further satisfies the following conditional expression.

$$0.010 < \Delta PgF\_3A < 0.073 \qquad (6)$$

$\Delta PgF\_3A$: largest one of anomalous dispersions of a g line and an F line of the positive lens included in the 3A lens group G3A

[13]

The high power zoom lens according to any one of [1] to [12], in which the high power zoom lens further satisfies the following conditional expression.

$$0.010 < \Delta PgF\_1 < 0.073 \quad (7)$$

$\Delta PgF\_1$: largest one of the abnormal dispersions of a g line and an F line of the positive lens included in the first lens group G1

DESCRIPTION OF REFERENCE NUMERALS AND SIGNS

G1: first lens group
G2: second lens group
G3: third lens group
G4: fourth lens group
G5: fifth lens group
GL: L-th lens group
S: aperture diaphragm
I: image surface

What is claimed is:

1. A high power zoom lens comprising, in order from an object side:

a first lens group G1 that has a positive refractive power;

a second lens group G2 that has a negative refractive power;

a third lens group G3 that has a positive refractive power;

a fourth lens group G4 that has a positive refractive power;

an L-th lens group GL that has a positive refractive power and is positioned at a position which is closest to an image side; wherein in a case of zooming from a wide-angle end to a telephoto end, a distance between the lens groups changes, the third lens group G3 includes a 3A lens group G3A having a positive refractive power, and a 3B lens group G3B having a negative refractive power, image blur correction is performed by moving the 3B lens group G3B in a direction substantially perpendicular to an optical axis, the fourth lens group G4 includes a 4A lens group G4A having a positive refractive power, and a 4B lens group G4B having a negative refractive power, a focusing operation from an infinity state to a short distance is performed by moving the 4B lens group G4B from an object side to an image side in an optical axis direction, and the following conditional expressions are satisfied:

$$0.25 < f1/fT < 0.66 \quad (1)$$

$$0.35 < |ff/fr| < 0.80 \quad (2)$$

f1: focal length of first lens group G1 fT: focal length of entire system in infinity state at telephoto end ff: combined focal length of the first lens group G1 and the second lens group G2 in the infinity state at the wide-angle end fr: combined focal length from the third lens group G3 to the L-th lens group GL in the infinity state at the wide-angle end.

2. The high power zoom lens according to claim 1, wherein a distance between the 4A lens group G4A and the 4B lens group G4B in the infinity state is constant during zooming.

3. The high power zoom lens according to claim 1, wherein a distance between the 3A lens group G3A and the 3B lens group G3B is constant during zooming.

4. The high power zoom lens according to claim 1, wherein each of the three B lens groups G3B is a cemented lens including one positive lens and one negative lens.

5. The high power zoom lens according to claim 1, wherein the 4B lens group G4B is one negative lens or a cemented lens including one positive lens and one negative lens.

6. The high power zoom lens according to claim 1, wherein the L-th lens group GL positioned closest to the image side is fixed with respect to an image surface.

7. The high power zoom lens according to claim 1, wherein the first lens group G1 includes one negative lens and two positive lenses in order from the object side.

8. The high power zoom lens according to claim 1, wherein the 4A lens group G4A further includes at least two positive lenses and one negative lens.

9. The high power zoom lens according to claim 1, wherein the high power zoom lens further satisfies the following conditional expression:

$$0.60 < |f4B/f4| < 1.80 \quad (3)$$

f4B: focal length of the 4B lens group G4B f4: focal length of the fourth lens group G4.

10. The high power zoom lens according to claim 1, wherein the high power zoom lens further satisfies the following conditional expression:

$$0.08 < FB/LT < 0.20 \quad (4)$$

FB: back focus in air equivalent at wide-angle end

LT: total lens length at wide-angle end.

11. The high power zoom lens according to claim 1, wherein the high power zoom lens further satisfies the following conditional expression:

$$0.50 < f3/f4 < 5.00 \quad (5)$$

f3: focal length of the third lens group G3 f4: focal length of the fourth lens group G4.

12. The high power zoom lens according to claim 1, wherein the high power zoom lens further satisfies the following conditional expression:

$$0.010 < PgF\_3A < 0.073 \quad (6)$$

ΔPgF_3A: largest one of anomalous dispersions of a g line and an F line of the positive lens included in the 3A lens group G3A.

13. The high power zoom lens according to claim 1, wherein the high power zoom lens further satisfies the following conditional expression:

$$0.010 < \Delta PgF\_1 < 0.073 \quad (7)$$

ΔPgF_1: largest one of the abnormal dispersions of a g line and an F line of the positive lens included in the first lens group G1.

* * * * *